United States Patent
Gilstad et al.

(10) Patent No.: US 9,027,636 B2
(45) Date of Patent: May 12, 2015

(54) TUNABLE DOWN-HOLE STIMULATION SYSTEM

(71) Applicants: Dennis W. Gilstad, San Antonio, TX (US); Barbara C. Gilstad, San Antonio, TX (US)

(72) Inventors: Dennis W. Gilstad, San Antonio, TX (US); Barbara C. Gilstad, San Antonio, TX (US)

( * ) Notice: Subject to any disclaimer, the term of this patent is extended or adjusted under 35 U.S.C. 154(b) by 0 days.

(21) Appl. No.: 14/340,634

(22) Filed: Jul. 25, 2014

(65) Prior Publication Data

US 2014/0332199 A1 Nov. 13, 2014

Related U.S. Application Data

(63) Continuation-in-part of application No. 14/248,360, filed on Apr. 9, 2014, now Pat. No. 8,939,200, and a continuation-in-part of application No. 14/047,046, filed on Oct. 7, 2013, now Pat. No. 8,746,654, and a (Continued)

(51) Int. Cl.
| | |
|---|---|
| *E21B 43/00* | (2006.01) |
| *E21B 43/26* | (2006.01) |
| *E21B 43/267* | (2006.01) |
| *E21B 28/00* | (2006.01) |
| *E21B 4/14* | (2006.01) |
| *G01V 1/155* | (2006.01) |
| *E21B 43/25* | (2006.01) |

(52) U.S. Cl.
CPC .............. *E21B 43/267* (2013.01); *E21B 28/00* (2013.01); *E21B 4/14* (2013.01); *E21B 43/25* (2013.01); *G01V 1/155* (2013.01)

(58) Field of Classification Search
CPC ........... E21B 43/25; E21B 4/14; E21B 28/00; E21B 43/267; G01V 1/155; G01V 1/159
USPC ................. 166/249, 177.6, 53; 175/296, 297; 181/121
See application file for complete search history.

(56) References Cited

U.S. PATENT DOCUMENTS

| | | |
|---|---|---|
| 432,744 A | 7/1890 | Adams |
| 767,118 A | 8/1904 | Popham et al. |

(Continued)

OTHER PUBLICATIONS

Introduction to Impulse Hammers, Internet download Sep. 2011 from Dytran Instruments, Inc.

*Primary Examiner* — Jennifer H Gay
*Assistant Examiner* — George Gray
(74) *Attorney, Agent, or Firm* — Dennis W. Gilstad

(57) ABSTRACT

Tunable down-hole stimulation systems feature closed-loop control of pumps and tunable down-hole stimulators. Stimulators generate and hydraulically transmit broad vibration spectra tuned for resonance excitation and fracturing of geologic materials adjacent to the wellbore. Feedback data for controlling stimulation includes backscatter vibration originating in stimulated geologic material and detected at the stimulator(s). For initial fracturing with relatively large particle sizes, the power spectral density (PSD) of each stimulator output is down-shifted toward the lower resonant frequencies of large particles. As fracturing proceeds to smaller (proppant-sized) fragments having higher resonant frequencies, backscatter vibration guides progressive up-shifting of stimulator PSD to higher vibration frequencies. Stimulator power requirements are minimized by concentrating vibration energy efficiently in frequency bands to which geologic materials are most sensitive at every stage of stimulation. Geologic fragmentation efficiency is thus optimized, with inherent potential for plain-water fracs completed with self-generated proppant.

4 Claims, 17 Drawing Sheets

Related U.S. Application Data continuation-in-part of application No. 13/711,644, filed on Dec. 12, 2012, now Pat. No. 8,567,753, and a continuation-in-part of application No. 13/296,251, filed on Nov. 15, 2011, now abandoned, and a continuation-in-part of application No. 13/228,475, filed on Sep. 9, 2011, now abandoned, and a continuation-in-part of application No. 13/228,474, filed on Sep. 9, 2011, now abandoned, and a continuation-in-part of application No. 13/210,407, filed on Aug. 16, 2011, now Pat. No. 8,292,260, and a continuation-in-part of application No. 13/196,916, filed on Aug. 3, 2011, now Pat. No. 8,267,371, and a continuation-in-part of application No. 13/616,098, filed on Sep. 14, 2012, now Pat. No. 8,403,337, and a continuation-in-part of application No. 13/525,391, filed on Jun. 18, 2012, now Pat. No. 8,292,301, and a continuation-in-part of application No. 13/456,235, filed on Apr. 26, 2012, now Pat. No. 8,276,918, and a continuation-in-part of application No. 13/184,965, filed on Jul. 18, 2011, now Pat. No. 8,210,542, and a continuation-in-part of application No. 14/038,819, filed on Sep. 27, 2013, now Pat. No. 8,708,306, and a continuation-in-part of application No. 13/525,374, filed on Jun. 18, 2012, now Pat. No. 8,550,425, and a continuation-in-part of application No. 13/228,475, filed on Sep. 9, 2011, now abandoned.

(56) References Cited

U.S. PATENT DOCUMENTS

| | | | | |
|---|---|---|---|---|
| 829,546 | A | 8/1906 | Schou | |
| 1,705,800 | A | 3/1929 | Akeyson | |
| 1,716,896 | A | 6/1929 | Miller | |
| 1,733,180 | A | 10/1929 | Biedermann | |
| 2,002,672 | A | 5/1935 | Melott | |
| 2,011,547 | A | 8/1935 | Campbell | |
| 2,018,288 | A | 10/1935 | Steirly | |
| 2,178,876 | A | 11/1939 | MacClatchie | |
| 2,298,632 | A | 10/1942 | Thorner | |
| 2,329,576 | A | 9/1943 | Anderson | |
| 2,446,196 | A | 8/1948 | Sitney | |
| 2,792,016 | A * | 5/1957 | Shellman et al. | 137/516.29 |
| 3,004,633 | A | 10/1961 | Hobson | |
| 3,047,007 | A | 7/1962 | Lunken | |
| 3,053,500 | A | 9/1962 | Atkinson | |
| 3,053,501 | A | 9/1962 | Varga | |
| 3,054,452 | A | 9/1962 | Clark, Jr. et al. | |
| 3,172,424 | A | 3/1965 | Stillwagon | |
| 3,540,472 | A | 11/1970 | Brady et al. | |
| 3,617,589 | A | 11/1971 | Jones-Hinton et al. | |
| 3,687,464 | A | 8/1972 | Jackson et al. | |
| 3,827,671 | A | 8/1974 | Bolden et al. | |
| 3,951,849 | A | 4/1976 | Vickery et al. | |
| 4,088,301 | A | 5/1978 | Ehmig | |
| 4,103,909 | A | 8/1978 | Hoffman et al. | |
| 4,181,027 | A | 1/1980 | Talbott, Jr. | |
| 4,254,792 | A | 3/1981 | Schadel | |
| 4,269,419 | A | 5/1981 | Brant | |
| 4,300,775 | A | 11/1981 | Ringel | |
| 4,572,519 | A | 2/1986 | Cameron et al. | |
| 4,602,762 | A | 7/1986 | Koch et al. | |
| 4,687,421 | A | 8/1987 | Cameron et al. | |
| 4,759,428 | A | 7/1988 | Seshimo | |
| 4,852,533 | A | 8/1989 | Doncker et al. | |
| 4,860,995 | A | 8/1989 | Rogers | |
| 4,951,707 | A | 8/1990 | Johnson | |
| 4,991,685 | A * | 2/1991 | Airhart | 181/106 |
| 5,073,096 | A | 12/1991 | King et al. | |
| 5,088,521 | A | 2/1992 | Johnson | |
| 5,091,455 | A | 2/1992 | Blank et al. | |
| 5,158,162 | A | 10/1992 | Fink et al. | |
| 5,183,863 | A | 2/1993 | Nakamura et al. | |
| 5,226,445 | A | 7/1993 | Surjaatmadja | |
| 5,238,744 | A | 8/1993 | Williams et al. | |
| 5,249,600 | A | 10/1993 | Blume | |
| 5,262,232 | A | 11/1993 | Wilfong et al. | |
| 5,275,204 | A | 1/1994 | Rogers et al. | |
| 5,370,150 | A | 12/1994 | Nehm | |
| 5,431,186 | A | 7/1995 | Blume | |
| 5,507,477 | A | 4/1996 | Manning et al. | |
| 5,580,068 | A | 12/1996 | Gundy | |
| 5,629,503 | A | 5/1997 | Thomasen | |
| 5,639,098 | A | 6/1997 | MacDonald | |
| 5,670,006 | A | 9/1997 | Wilfong et al. | |
| 5,799,953 | A | 9/1998 | Henderson | |
| 5,836,393 | A * | 11/1998 | Johnson | 166/308.1 |
| 5,979,242 | A | 11/1999 | Hobbs | |
| 6,000,677 | A | 12/1999 | Cook et al. | |
| 6,026,776 | A | 2/2000 | Winberg | |
| 6,056,270 | A | 5/2000 | Zimmerly | |
| 6,290,205 | B1 | 9/2001 | Haga et al. | |
| 6,293,514 | B1 | 9/2001 | Pechoux et al. | |
| 6,331,578 | B1 | 12/2001 | Turner et al. | |
| 6,432,320 | B1 | 8/2002 | Bonsignore et al. | |
| 6,701,529 | B1 | 3/2004 | Rhoades et al. | |
| 6,713,438 | B1 | 3/2004 | Baillargeon et al. | |
| 6,811,140 | B1 | 11/2004 | Maini | |
| 6,883,333 | B2 | 4/2005 | Shearer et al. | |
| 6,959,727 | B2 | 11/2005 | Krishnamoorthy et al. | |
| 7,081,223 | B2 | 7/2006 | Khoury | |
| 7,113,876 | B2 | 9/2006 | Zeng et al. | |
| 7,158,162 | B2 | 1/2007 | Kojima | |
| 7,222,837 | B1 | 5/2007 | Blume | |
| 7,264,055 | B2 * | 9/2007 | Mody et al. | 166/301 |
| 7,287,545 | B2 | 10/2007 | Zeison | |
| 7,429,220 | B2 | 9/2008 | Kuntimaddi et al. | |
| 7,513,483 | B1 | 4/2009 | Blume | |
| 7,513,759 | B1 | 4/2009 | Blume | |
| 7,562,740 | B2 | 7/2009 | Ounadjela | |
| 7,591,450 | B2 | 9/2009 | Blume | |
| 7,608,314 | B2 | 10/2009 | Plant | |
| 7,794,827 | B2 | 9/2010 | Palmer et al. | |
| 7,847,057 | B2 | 12/2010 | Muller et al. | |
| 7,859,733 | B2 | 12/2010 | Cannon et al. | |
| 7,942,603 | B2 | 5/2011 | Miller | |
| 8,371,205 | B1 | 2/2013 | Proulx | |
| 8,386,040 | B2 | 2/2013 | Pate et al. | |
| 8,535,250 | B2 | 9/2013 | Owen et al. | |
| 8,540,024 | B2 | 9/2013 | Kosarev et al. | |
| 8,571,829 | B2 | 10/2013 | Atlas et al. | |
| 8,591,196 | B2 | 11/2013 | Hardwicke | |
| 8,616,302 | B2 | 12/2013 | Moeny | |
| 8,677,877 | B2 | 3/2014 | Campbell | |
| 8,731,848 | B2 | 5/2014 | Jones et al. | |
| 8,731,889 | B2 | 5/2014 | Du et al. | |
| 8,760,252 | B2 | 6/2014 | Fullerton et al. | |
| 8,939,200 | B1 * | 1/2015 | Gilstad et al. | 166/177.1 |
| 2004/0105980 | A1 | 6/2004 | Sudarshan et al. | |
| 2004/0226616 | A1 | 11/2004 | Vicars | |
| 2005/0084229 | A1 | 4/2005 | Babbitt et al. | |
| 2005/0206096 | A1 | 9/2005 | Browne et al. | |
| 2007/0025811 | A1 | 2/2007 | Wilhelm | |
| 2007/0138423 | A1 | 6/2007 | Smith | |
| 2008/0135361 | A1 | 6/2008 | Zhou et al. | |
| 2008/0279706 | A1 | 11/2008 | Gambier et al. | |
| 2010/0072413 | A1 | 3/2010 | Koyomogi | |
| 2010/0148452 | A1 | 6/2010 | Westhoff et al. | |
| 2010/0183448 | A1 * | 7/2010 | Leugemors et al. | 417/53 |
| 2010/0264364 | A1 | 10/2010 | Wagner et al. | |
| 2010/0327208 | A1 | 12/2010 | Doutt | |
| 2011/0011576 | A1 * | 1/2011 | Cavender et al. | 166/177.1 |
| 2011/0240064 | A1 | 10/2011 | Wales et al. | |
| 2011/0245378 | A1 | 10/2011 | Russ et al. | |
| 2011/0250084 | A1 | 10/2011 | Marica | |
| 2012/0035309 | A1 | 2/2012 | Zhu et al. | |
| 2012/0136356 | A1 | 5/2012 | Doherty et al. | |

(56) References Cited

U.S. PATENT DOCUMENTS

| | | |
|---|---|---|
| 2013/0019955 A1 | 1/2013 | Bagagli et al. |
| 2014/0000909 A1 | 1/2014 | Neer |
| 2014/0027110 A1 | 1/2014 | Ageev et al. |
| 2014/0041876 A1 | 2/2014 | Fleckenstein et al. |
| 2014/0051612 A1 | 2/2014 | Mazyar et al. |
| 2014/0251623 A1* | 9/2014 | Lestz et al. ............ 166/308.2 |

* cited by examiner

TUNABLE DOWN-HOLE STIMULATION SYSTEM

FIELD OF THE INVENTION

The invention relates generally to oilfield equipment, including reciprocating pump fluid ends and down-hole equipment for well service. Particularly demanding applications include high-pressure hydraulic stimulation on intervals along horizontal wellbores in ultralow-permeability (unconventional) formations.

INTRODUCTION

New designs described herein incorporate innovative applications of well-known technical principles for improved stimulation system performance. Both adverse and beneficial aspects of the technical principles are well-represented in relationships between mechanical shocks and their associated vibration spectra. Adverse aspects of these relationships are strikingly manifest, for example, in the troubling failure rates of even the most modern conventional high-pressure well-stimulation pumps. While analogous relationships can alternatively be beneficially employed to increase pump reliability and enhance well productivity through more efficient and localized stimulation.

Specific examples are cited in the following paragraphs to illustrate how reliability improvements have evolved from a better understanding of causes and effects of shock and vibration in fluid ends. First, remarkably strong and repetitive mechanical shocks commonly originate in fluid ends. Second, the intensity of mechanical shocks that occur with normal closure of conventional fluid end check valves can be reduced through innovative design changes. Third, without such design changes, fatigue-related damage is exacerbated, predisposing fluid ends to premature failures.

It is frequently observed that premature fluid end failures are more common now than they have been in the past. This is true even though the underlying failure mechanisms have remained unchanged in some aspects. One such unchanged aspect is the fact that a mechanical shock is created each time a fluid end check valve closes on a valve seat. But these mechanical shocks are generally much stronger now than they have been in the past. The reason for a strong valve-closing shock is high back pressure, and peak back pressures are much higher now than they have been in the past. *And each strong valve-closing shock inevitably generates high-energy broad-spectrum vibration that propagates throughout the fluid end.*

Broad vibration spectra, in turn, excite a range of destructive resonances in the fluid end or the pump as a whole, predisposing various parts to fatigue-related cracking and ultimate failure. A variety of designs shown and described in the following materials explain how these damaging vibration resonances can be controlled (e.g., suppressed) using a hierarchy of tunable systems, tunable subsystems, tunable components and design elements. Controlling destructive resonance excitation, in turn, limits vibration-induced cracking.

But resonance vibration excitation shouldn't always be limited in well stimulation systems; sometimes it should be enhanced! Specifically, vibration spectra originating in tunable down-hole stimulators can be tailored (i.e., their frequency spectra can be shifted) to maximize stimulation efficiency. Directing such (tuned) stimulation vibration to geologic material adjacent to a wellbore, in the presence of high down-hole hydraulic pressures, typically increases rock fracturing. The combination of high hydraulic pressures plus tuned stimulation vibration thus tends to both: (1) open geologic channels, and (2) prop them open, for improved well production. To optimize these complementary functions, the extent of geologic fracturing (with its associated geologic fragmentation) is periodically assessed in near-real time. Such analysis proceeds continuously as feedback data from the geologic material are processed in programmable controllers running empirically-derived software algorithms (broadly termed herein: frac diagnostics).

The above geologic feedback data, in the form of backscatter vibration, thus allow closed-loop control of geologic stimulation. That is, closed-loop stimulation control incorporates feedback of a portion of the controlled-system output (i.e., stimulated geologic material) to the controlled-system input (i.e., tuned stimulation vibration). Feedback data are used to guide re-tuning of stimulation vibration as needed, with quick convergence on optimal stimulation levels. This process is accomplished in tunable down-hole stimulation systems via closed-loop control of mechanical shocks, the shocks originating in one or more tunable down-hole stimulators.

Closed-loop control of mechanical shocks implies control of the kinetic energy impulses corresponding to a moving hammer (or mass) element striking, and rebounding from, a fluid interface in a tunable vibration generator. At least one such generator resides within each tunable down-hole stimulator. And at least a portion of a generator's initial kinetic energy for each hammer strike is converted to broad-spectrum vibration energy. So with each hammer strike and rebound, the vibration spectrum's power spectral density (PSD) can be detected and adjusted as desired under closed-loop control.

Closed-loop PSD control for tunable down-hole stimulation systems means that transmitted vibration spectra from a tunable vibration generator are tuned at their source (e.g., by altering the rebound cycle time for each hammer element strike). Such tuning effectively shapes a transmitted vibration spectrum's PSD to concentrate stimulation vibration power in predetermined frequency ranges. The predetermined frequency ranges for any stage of stimulation are those that maximize transmission of vibration resonance excitation power to the adjacent geologic materials.

The geologic materials themselves then (after a short time delay) report their actual levels of resonance excitation in the form of backscatter vibration feedback data. Calculated control signals based on the feedback data then close the loop in closed-loop shock control. The control signals are calculated using a programmable controller running frac diagnostic software, and the signals are then applied (e.g., via feedback control link) to one or more tunable stimulation vibration generators to optimize stimulation in near-real time.

Note that evaluation of backscatter vibration data detected in one or more down-hole stimulators may optionally be enhanced in light of corresponding down-hole temperature and/or hydraulic pressure data sensed at one or more down-hole stimulators. Such enhanced evaluation may be carried out, e.g., via frac diagnostics in a programmable controller for the relevant tunable down-hole stimulation system.

An example benefit of such enhanced evaluation relates to estimating the effects of down-hole hydraulic pressure changes on fluid flow (e.g., liquid hydrocarbons) from stimulated geologic material. As stimulation proceeds, channels for such fluid flow are opened, but flow may be blocked by relatively higher down-hole hydraulic pressure. If the hydraulic pressure is sufficiently (temporarily) lowered, fluid flow from the stimulated geologic material ensues, carrying with it, e.g., small particulates that may alter backscatter vibration.

The vibration alteration(s), in turn, may include Doppler shifts secondary to the velocity of the flowing particulates, such velocity being an early indicator of the wellbore stage's productivity potential.

To acquire the benefits of backscatter vibration as described above, tunable down-hole stimulators transmit shock-generated stimulation vibration to geologic materials adjacent to their wellbore stages or location(s). Access is via, e.g., casing perforations and/or slots (i.e., ports or access openings). (See, e.g., U.S. patent application number 2014/0000909 A1, incorporated by reference). Since maximum resonance excitation frequencies necessarily change as stimulation progresses, closed-loop shock control in the stimulator(s) causes the PSD of stimulation vibration energy to be correspondingly shifted in near-real time to optimize stimulation, and thus generate the corresponding backscatter vibration, of individual producing zones or stages within a wellbore. (See, e.g., U.S. patent application number 2014/0041876 A1, incorporated by reference). *Optimization thus means more effective stimulation (i.e., more productive wells) achieved with higher energy efficiency in less time.*

The following background materials discuss the vibration spectrum of an impulse in greater detail, highlighting its importance with examples of the deleterious effects of mechanical shock and vibration in conventional applications. Analogous-in-part vibration-related issues in the automotive industry are also described to illustrate that *positive or negative aspects of vibration in mechanical systems may become economically important, or even evident, only at certain frequencies and/or above certain energy levels.* Building on this background, subsequent sections describe selected alternative designs for high-pressure pump components (e.g., check valves and vibration dampers) and associated well-stimulation equipment (including, e.g., tunable down-hole stimulators) which address current operational issues of reliability, efficiency, and efficacy in well stimulation.

BACKGROUND

The necessity for modified designs (e.g., as described herein and in related patents) may be better appreciated after first considering: (1) the remarkably high failure rates of conventional reciprocating high-pressure pumps (especially fluid ends), and (2) the substantial uncertainties (e.g., in cost/benefit analysis and technical complexity/reproducibility) associated with multistage well stimulation in unconventional formations. Pump-related issues will be considered initially.

Frac pumps (also commonly called fracking or well-service pumps) are typically truck-mounted for easy relocation from well-to-well. And they are usually designed in two sections: the (proximal) power section (herein "power end") and the (distal) fluid section (herein "fluid end"). Each pump fluid end comprises at least one subassembly (and commonly three or more in a single fluid end housing), with each subassembly comprising a suction valve, a discharge valve, a plunger or piston, and a portion of (or substantially the entirety of) a pump fluid end subassembly housing (shortened herein to "pump housing" or "fluid end housing" or "housing", depending on the context).

For each pump fluid end subassembly, its fluid end housing comprises a pumping chamber in fluid communication with a suction bore, a discharge bore, and a piston/plunger bore. A suction valve (i.e., a check valve) within the suction bore, together with a discharge valve (i.e., another check valve) within the discharge bore, control bulk fluid movement from suction bore to discharge bore via the pumping chamber. Note that the term "check valve" as used herein refers to a valve in which a (relatively movable) valve body can cyclically close upon a (relatively stationary) valve seat to achieve substantially unidirectional bulk fluid flow through the valve.

Pulsatile fluid flow results from cyclical pressurization of the pumping chamber by a reciprocating plunger or piston strokes within the plunger/piston bore. Suction and pressure strokes alternately produce wide pressure swings in the pumping chamber (and across the suction and discharge check valves) as the reciprocating plunger or piston is driven by the pump power end.

Such pumps are rated at peak pumped-fluid pressures in current practice up to about 22,000 psi, while simultaneously being weight-limited due to the carrying capacity of the trucks on which they are mounted. (See, e.g., U.S. Pat. No. 7,513,759 B1, incorporated by reference).

Due to high peak pumped-fluid pressures, suction check valves experience particularly wide pressure variations between a suction stroke, when the valve opens, and a pressure stroke, when the valve closes. For example, during a pressure stroke with a rod load up to 350,000 pounds, a conventionally rigid/heavy check valve body may be driven longitudinally (by pressurized fluid behind it) toward metal-to-metal impact on a conventional frusto-conical valve seat at closing forces of about 50,000 to over 250,000 pounds (depending on valve dimensions). A portion of total check-valve closure impulse energy (i.e., the total kinetic energy of the moving valve body and fluid at valve seat impact) is thus converted to a short-duration high-amplitude valve-closure energy impulse (i.e., a mechanical shock). As described below, each such mechanical shock is associated with transmission of broad-spectrum vibration energy, the range of vibration spectrum frequencies being an inverse function of valve-closure energy impulse duration.

Repeated application of dual valve-closure shocks with each pump cycle (i.e., one shock from the suction valve and another shock from the discharge valve) predisposes each check valve, and the pump as a whole, to vibration-induced (e.g., fatigue) damage. Cumulative valve-closure shocks thus significantly degrade frac pump reliability, proportional in part to the rigidity and weight of each check valve body.

The increasing importance of fatigue-related frac pump reliability issues has paralleled the inexorable rise of peak pumped-fluid pressures in new fracking applications. And insight into fatigue-related failure modes has been gained through review of earlier shock and vibration studies, data from which are cited herein. For example, a recent treatise on the subject describes a mechanical shock in terms of its inherent properties in the time domain and in the frequency domain, and also in terms of its effects on structures when the shock acts as the excitation. (see p. 20.5 of *Harris' Shock and Vibration Handbook*, Sixth Edition, ed. Allan G. Piersol and Thomas L. Paez, McGraw Hill (2010), hereinafter *Harris*).

References to time and frequency domains appear frequently in descriptions of acquisition and analysis of shock and vibration data. And these domains are mathematically represented on opposite sides of equations generally termed Fourier transforms. Further, estimates of a shock's structural effects are frequently described in terms of two parameters: (1) the structure's undamped natural frequency and (2) the fraction of critical structural damping or, equivalently, the resonant gain Q (see *Harris* pp. 7.6, 14.9-14.10, 20.10). (See also, e.g., U.S. Pat. No. 7,859,733 B2, incorporated by reference).

Digital representations of time and frequency domain data play important roles in computer-assisted shock and vibration studies. In addition, shock properties are also commonly represented graphically as time domain impulse plots (e.g., acceleration vs. time) and frequency domain vibration plots (e.g., spectrum amplitude vs. frequency). Such graphical presentations readily illustrate the shock effects of metal-to-metal valve-closure, wherein movement of a check valve body is abruptly stopped by a valve seat. Relatively high acceleration values and broad vibration spectra are prominent, because each valve-closure impulse response primarily represents a violent conversion of a portion of kinetic energy (of the moving valve body and fluid) to other energy forms.

Since energy cannot be destroyed, and since a conventional valve can neither store nor convert (i.e., dissipate) more than a small fraction of the valve-closure impulse's kinetic energy, a portion of that energy is necessarily transmitted to the pump housing in the form of broad-spectrum vibration energy. This relationship of (frequency domain) vibration energy to (time domain) kinetic energy, is mathematically represented by a Fourier transform. Such transforms are well-known to those skilled in the art of shock and vibration mechanics. For others, a graphical representation (i.e., plots) rather than a mathematical representation (i.e., equations) may be preferable.

For example, in a time domain plot, the transmitted energy appears as a high-amplitude impulse of short duration. And a corresponding frequency domain plot of transmitted energy reveals a relatively broad-spectrum band of high-amplitude vibration. *The breadth of the vibration spectrum is generally inversely proportional to the impulse duration.*

Thus, as noted above, a portion of the check valve's cyclical valve-closure kinetic energy is converted to relatively broad-spectrum vibration energy. The overall effect of cyclical check valve closures may therefore be compared to the mechanical shocks that would result from repeatedly striking the valve seat with a commercially-available impulse hammer, each hammer strike being followed by a rebound. Such hammers are easily configured to produce relatively broad-spectrum high-amplitude excitation (i.e., vibration) in an object struck by the hammer. (See, e.g., *Introduction to Impulse Hammers* at http://www.dytran.com/img/tech/a11.pdf, and *Harris* p. 20.10).

Summarizing then, relatively broad-spectrum high-amplitude vibration predictably results from a typical high-energy valve-closure impulse. And frac pumps with conventionally-rigid valves can suffer hundreds of these impulses per minute. Note that the number of impulses per minute (for example, 300 impulses per minute) corresponds to pump plunger strokes or cycles, and this number may be converted to impulses-per-second (i.e., 300/60=5). The number 5 is sometimes termed a frequency because it is given the dimensions of cycles/second or Hertz (Hz). But the "frequency" thus attributed to pump cycles themselves differs from the spectrum of vibration frequencies resulting from each individual pump cycle energy impulse. The difference is that impulse-generated (e.g., valve-generated) vibration occurs in bursts having relatively broad spectra (i.e., simultaneously containing many vibration frequencies) ranging from a few Hz to several thousand Hz (kHz).

In conventional frac pumps then, nearly all of the (relatively broad-spectrum) valve-generated vibration energy must be transmitted to proximate areas of the fluid end or pump housing because vibration energy cannot be efficiently dissipated in the (relatively rigid) valves themselves. Based on extensive shock and vibration test data (see *Harris*) it can be expected to excite damaging resonances that predispose the housing to fatigue failures. (See, e.g., U.S. Pat. No. 5,979, 242, incorporated by reference). If, as expected, a natural vibration resonance frequency of the housing coincides with a frequency within the valve-closure vibration spectrum, fluid end vibration amplitude may be substantially increased and the corresponding vibration fatigue damage made much worse. (See *Harris*, p. 1.3).

Opportunities to limit fluid end damage can reasonably begin with experiment-based redesign to control vibration-induced fatigue. For example, a spectrum of vibration frequencies initially applied in the form of a test shock can reveal structural resonance frequencies likely to cause trouble in a particular pump. These revealed frequencies are herein termed critical frequencies. For example, a test shock may comprise a half-sine impulse of duration one millisecond, which has predominant spectral content up to about 2 kHz (see *Harris*, p. 11.22). This spectral content likely overlaps, and thus will excite, a plurality of the pump's structural resonance (i.e., critical) frequencies. Excited critical frequencies are then readily identified with appropriate instrumentation, so attention can be directed to limiting operational vibration at those critical frequencies.

Limiting vibration at critical frequencies through use of the above shock tests can be particularly beneficial in blocking progressive fatigue cracking in a structure. If vibration is not appropriately limited, fatigue cracks may grow to a point where fatigue crack size is no longer limited (i.e., the structure experiences catastrophic fracture). The size of cracks just before the point of fracture has been termed the critical crack size. Note that stronger housings are not necessarily better in such cases, since increasing the housing's yield strength causes a corresponding decrease in critical crack size (with consequent earlier progression to catastrophic fracture). (See *Harris*, p. 33.23).

It might be assumed that certain valve redesigns proposed in the past (including relatively lighter valve bodies) would have alleviated at least some of the above fatigue-related failure modes. (See, e.g., U.S. Pat. No. 7,222,837 B1, incorporated by reference). But such redesigns emerged (e.g., in 2005) when fluid end peak pressures were generally substantially lower than they currently are. In relatively lower pressure applications (e.g., mud pumps), rigid/heavy valve bodies performed well because the valve-closure shocks and associated valve-generated vibration were less severe compared to shock and vibration experienced more recently in higher pressure applications (e.g., fracking). Thus, despite their apparent functional resemblance to impulse hammers, relatively rigid/heavy valves have been pressed into service as candidates for use in frac pump fluid ends. Indeed, they have generally been among the valves most commonly available in commercial quantities during the recent explosive expansion of well-service fracking operations. Substantially increased fluid end failure rates (due, e.g., to cracks near a suction valve seat deck) have been among the unfortunate, and unintended, consequences.

Under these circumstances, it is regrettable but understandable that published data on a modern 9-ton, 3000-hp well-service pump includes a warranty period measured in hours, with no warranty for valves or weld-repaired fluid ends.

Such baleful vibration-related results in fluid ends might usefully be compared with vibration-related problems seen during the transition from slow-turning two-cylinder automobile engines to higher-speed and higher-powered inline six-cylinder engines around the years 1903-1910. Important torsional-vibration failure modes suddenly became evident in the new six-cylinder engines, though they were neither anticipated nor understood at the time. Whereas the earlier engines had been under-powered but relatively reliable, torsional crankshaft vibrations in the six-cylinder engines caused objectionable noise ("octaves of chatter from the quivering crankshaft") and unexpected catastrophic failures (e.g., broken crankshafts). (Quotation cited on p. 13 of Royce and the Vibration Damper, Rolls-Royce Heritage Trust, 2003). Torsional-vibration was eventually identified as the culprit and, though never entirely eliminated, was finally reduced to a relatively minor maintenance issue after several crankshaft redesigns and the development of crankshaft vibration dampers pioneered by Royce and Lanchester.

Reducing the current fluid end failure rates related to valve-generated vibration in frac pumps requires an analogous modern program of intensive study and specific design changes. The problem will be persistent because repeatedly-applied valve-closure energy impulses cannot be entirely eliminated in check-valve-based fluid end technology. So the valve-closing impulses must be modified, and their associated vibrations damped, meaning that at least a portion of the total vibration energy is converted to heat energy and dissipated (i.e., the heat is rejected to the surroundings). A reduction in total vibration energy results in reduced excitation of destructive resonances in valves, pump housings, and related fluid end structures. Alternate materials, applied via innovative designs, illuminate the path forward now as they have in the past. Broad application of such improvements promises higher frac pump reliability, an important near-term goal. Simultaneously, inhibition of corrosion fatigue throughout analogous fluid circuits would be advanced, a longer-term benefit in refineries, hydrocarbon crackers and other industrial venues that are also subjected to shock-related vibration.

Further, when considering vibration in well stimulation systems comprising frac pumps together with down-hole equipment, additional opportunities for increased efficiency arise. Concentration of stimulation resources near wellbore collection sites, together with feedback-controlled application of stimulation energy, conserves time and money. And tailoring the forms of stimulation vibration energy to well-specific geologic parameters contributes to operational flexibility, efficiency, and efficacy.

SUMMARY OF THE INVENTION

Tunable down-hole stimulation system design includes closed-loop control of (generally truck-mounted) pumps and tunable down-hole stimulators. Tunable down-hole stimulators hydraulically transmit broad vibration spectra tuned for maximum resonance excitation and fracturing of targeted geologic materials adjacent to the wellbore. Frequencies and amplitudes of both transmitted stimulation vibration and backscatter vibration data are acquired by one or more detectors in each tunable down-hole stimulator. Closed-loop control of stimulation vibration is exercised using feedback data relevant to progress of the stimulation process, the feedback data including backscatter vibration originating in stimulated geologic material.

For initial (stimulation-induced) geologic fracturing, which is associated with relatively large fragment sizes, the power spectral density (PSD) of tunable down-hole stimulator vibration energy is down-shifted. That is, PSD is tuned to shift the distribution of vibration power toward relatively lower frequencies. A PSD down-shift thus tends to match stimulation vibration frequencies with the relatively-lower resonant frequencies of large geologic fragments. As stimulation progresses to smaller-size fragments, corresponding (higher frequency) backscatter vibration data are fed back (in a closed-loop) to a programmable controller. The controller then creates at least one control signal and transmits it to at least one stimulator to cause progressive up-shifting of the stimulator's transmitted vibration energy. That is, the PSD of the stimulator's transmitted vibration energy is changed by shifting the distribution of vibration power toward relatively higher frequencies). *Stimulator power requirements are minimized because available stimulation vibration energy is efficiently shifted toward (and concentrated in) the bands of resonant frequencies to which the geologic material is most susceptible at every stage of stimulation.* Thus, progressive geologic fragmentation at minimum energy levels is optimized, with inherent production of self-generated proppant as geologic fragments are progressively, and controllably, reduced to proppant-size.

Self-generated proppant may be of considerable importance if it reduces the need for pumping of exogenous proppant (e.g., sand shipped to the drilling site from Wisconsin). And the geologic fragmentation associated with self-generated proppant contributes to wellbore stimulation for increased productivity. Both geologic stimulation and proppant generation are closely related to the manner in which a closed-loop stimulation system generates and modifies broad-spectrum vibration energy within a wellbore.

Stimulation vibration energy is generated and modified in the wellbore to minimize transmission losses as the energy travels to adjacent geologic material. On striking the material, the energy immediately excites resonant vibrations which lead to vibration-induced geologic fractures and fragmentation. Backscatter vibration data originating from the stimulated geologic materials is subsequently captured by detectors on one or more tunable down-hole stimulators. Analysis of this backscatter vibration data in near-real time then ensures that stimulation vibration energy remains efficiently concentrated (i.e., via feedback-controlled PSD's) for creating specific geologic responses (i.e., fractures and fragmentation), rather than being dissipated as wasteful heat. Beneficial geologic stimulation is thus obtained using a combination of minimum applied vibration energy, plus resonance vibration effects assessed via detection of backscatter vibration from the stimulated geologic material.

Note that plasma sources (e.g., an electric arc) are also described as producing wide-band stimulation vibration energy. But such plasma sources do not incorporate the feedback-control of stimulation vibration, and thus the associated benefits of stimulation vibration energy concentration, as described herein.

The size range of geologic fragmentation encountered throughout the above stimulation process is broad, including large chunks through smaller fragments to proppant-sized particles. Efficient stimulation over the entire range therefore requires current feedback data regarding fragment or particle sizes within the geologic material. (See, e.g., U.S. Pat. Nos. 8,535,250 B2 and 8,731,848 B2, incorporated by reference). And various embodiments of the present invention provide for such data to be extracted substantially from band-limited backscatter vibration originating in the geologic fragments themselves.

But the composition of geologic fragments demonstrates wide variations. So supplemental data may usefully be extracted (e.g., via empirically-derived frac diagnostics) from parameters in addition to backscatter vibration, such as ambient (down-hole) pressure and temperature. It is particularly difficult to obtain an accurate description of shale reservoirs, which are substantially different from conventional and other types of unconventional reservoirs. (See, e.g., U.S. Pat. No. 8,731,889 B2, incorporated by reference). Thus various embodiments of the present invention reflect a variety of different functional relationships among the parameters that may bear on necessarily time-dependent modifications of (initially broad-spectrum) stimulation vibration. The manner in which each functional relationship among parameters bears on vibration modifications is determined, as noted above, by one or more frac diagnostic tools (i.e., software) residing in a programmable controller for each tunable down-hole stimulation system.

Frac diagnostics reflect not only different stimulation approaches needed for various types of geologic reservoirs, but also for different configurations of tunable down-hole stimulation systems. Pertinent system parameters include, for example: (1) the number and type of pumps, (2) the presence of optional pressure and/or temperature sensors in tunable down-hole stimulators, and (3) the number of tunable down-hole stimulators present. Notwithstanding differences among the variety of system embodiments however, they all reflect applications of similar technical principles (relating to, e.g., the vibration spectrum of an impulse) to the objective of efficient delivery of effective down-hole stimulation vibration.

Regarding differences mentioned above in the number and type of pumps, certain embodiments of tunable down-hole stimulation systems include one or more pumps comprising a tunable fluid end. In such pumps, valve-generated vibration spectra are suppressed using tunable components to limit fatigue-related fracturing of pump structures aggravated by destructive excitation of pump resonances. Vibration suppression, as described herein, includes damping (i.e., dissipation as heat) and/or shifting of the vibration's PSD. The desired effect in each case is to decrease the amount of vibration power present at a pump's critical frequencies.

Further, certain tunable down-hole stimulation system embodiments may comprise one or more relatively higher-pressure pumps for fluid (e.g., plain water) that contains no proppant (schematically illustrated and labeled herein as frac pumps). One or more such frac pumps may be combined with one or more relatively lower-pressure pumps for fluid containing exogenous proppant (schematically illustrated and labeled herein as proppant pumps). Such system embodiments facilitate pulsed proppant placement or PPP (see below) in previously fractured geologic material.

In an example scenario for initial geologic fracturing (e.g., initially comprising relatively large rock fragments), one or more frac pumps provide relatively high hydraulic down-hole pressure. Simultaneously, the PSD of broad-spectrum tunable down-hole stimulator vibration is down-shifted (i.e., PSD is pre-tuned to shift the distribution of stimulation vibration power toward relatively lower frequencies). The pre-tuned vibration provides relatively lower vibration frequencies for synergistic combination with relatively high pumped-fluid (hydraulic down-hole) pressures to optimize initial stimulation. As stimulation progresses, up-shifting is carried out (i.e., PSD is re-tuned to shift the distribution of stimulation vibration power toward relatively higher frequencies). Such higher frequencies are needed to maintain progressive stimulation as fracturing proceeds to smaller rock fragments (e.g., fragments approaching proppant particles in size).

As noted above, the extent of geologic fragmentation is periodically assessed in real time via analysis in programmable controllers running empirically-derived algorithms (broadly termed herein: frac diagnostics). The diagnostics operate on data including band-limited backscatter vibration energy from the rock fragments themselves, as well as optionally-sensed down-hole pressure, temperature, and/or related parameters. The degree of rock fragmentation for each stimulation stage is thus periodically assessed for optimized flow-back (e.g., through substantial flow equalization within a cluster of analogous stages).

Preplanned stimulation of each fracture stage for self-generation of proppant-sized particles is thus individually controlled via adjustment of: (1) down-hole hydraulic pressures, and/or (2) the magnitudes and frequencies of transmitted tunable down-hole stimulator resonance excitation vibrations. Inherent production of self-generated proppant from the stimulated geologic material is thus facilitated to support long-term stable productivity of each stage and cluster. Effectiveness of proppant placement, including the potential need for supplemental exogenous proppant, are assessed via comparison of transmitted stimulation vibration with its corresponding (time-displaced) backscatter vibration, in combination with associated (conventional) well logging data.

Such combined data may be used to guide intermittent (e.g., pulsed) addition of exogenous proppant to a wellbore (typically under reduced pressure), between proppant-free fracs (under relatively higher pressures). Pulsed-proppant additions minimize the total amount of exogenous proppant needed to supplement in situ or self-generated proppant resulting from tunable down-hole stimulation. Thus, the task of stimulation (including proppant placement) is simplified. The overall frac process thus becomes a series of quickly-executed incremental steps under closed-loop control for fast convergence on an optimal end point.

Note certain differences between pulsed-proppant placement (or PPP) as described herein and the industry practice of pumping different types of slurries or fluids in discrete intervals, that is, as slugs or stages. (See, e.g., U.S. Pat. No. 8,540,024 B2, incorporated by reference). First, proppant addition in PPP is under closed-loop control; it is a function, in part, of backscatter vibration sensed down-hole in near-real time by one or more detectors on each tunable down-hole stimulator. Second, proppant-laden fluid may be injected into a wellbore (via a separate proppant pump) at lower pressures than those associated with the frac pump(s) which otherwise feed the wellbore with a proppant-free fluid stream. And Third, proppant provided via the PPP closed-loop system is supplemental to self-generated proppant which is created anew through stimulation vibration transmitted by one or more tunable down-hole stimulators.

A tunable down-hole stimulation system embodiment to accomplish such PPP is schematically illustrated herein to emphasize certain advantages stemming from separation of the relatively high-pressure frac pump from the (optionally) relatively lower-pressure proppant pump. The absence of proppant in the relatively high-pressure fluid end means longer life for high-pressure valves, with resultant improvements in fluid end reliability. Even in proppant pumps, valve life-cycles and fluid-end reliability would improve because the valves would (optionally) be operating at relatively lower pressures, thereby producing relatively less-energetic valve-generated vibration with narrowed (and less damaging) vibration spectra.

As described herein, control of vibration spectra (particularly their power spectral densities or PSD's) guides the design and operation of both tunable fluid ends and tunable down-hole stimulators. These subsystems, in turn, contribute to the increased reliability and productivity of tunable down-hole stimulation systems. Fundamental principles are invoked throughout this description to explain major benefits of improved vibration suppression (in tunable fluid ends) and improved vibration generation, transmission and analysis (via tunable down-hole stimulators and programmable system controllers).

In the following paragraphs, both generation of broad-spectrum vibration in tunable down-hole stimulators, and incorporation of the stimulators in tunable down-hole stimulation systems, are considered before control of valve-generated vibration in tunable fluid ends. This is to emphasize the role of induced resonance excitation vibration in geologic materials for maximizing well productivity.

Suppression of resonance excitation in tunable fluid ends, on the other hand, limits the destructive effects of valve-generated vibration (for maximizing fluid end reliability). Comparisons will be noted between the related-in-part techniques for inducing or suppressing a desired range of resonance-related power spectral densities in systems comprising both tunable down-hole stimulators and (optionally) tunable fluid ends.

The desirability of tunable down-hole stimulators in tunable down-hole stimulation systems stems from the well-known vertical and horizontal heterogeneity of unconventional reservoirs. Wide variability of geologic materials adjacent to wellbores is common, meaning that consistently-beneficial stimulation design has been difficult to achieve. In current practice, some fracture stages are typically found to be substantially more productive than others, while the cost of fracking varies little from stage-to-stage. Thus, stimulation design currently reflects compromises between the efficiency of a single customized fracture stage and the degraded performance of multiple one-size-fits-all stages that include a variety of geologic materials having different productive potentials.

Such currently unavoidable inefficiencies are substantially reduced by the advent of new tunable down-hole stimulation systems as described herein. With the new systems, progressive series of customized fracture stages can be realized in near-real time through productive integration of: (1) pumps (optionally having tunable fluid ends), (2) tunable down-hole stimulators, and (3) programmable controllers. Each fracture stage is electively customized in turn, through use of near-real time frac diagnostics. Relatively productive stages can be readily identified for optimal stimulation, followed by combination of such stages into strategically important productive clusters.

And the twin keys to creation of productive clusters in horizontal wellbores are (1) gathering backscatter vibration data generated in different portions of a tunable down-hole stimulation system and (2) processing these and related data (e.g., pressure and/or temperature) in the system's programmable controller to create control signals. Control signals, in turn, optimize stimulation; they can also facilitate accurate placement and adjustment of inflow control devices within a tunable down-hole stimulation system.

Embodiments of tunable down-hole systems may comprise a plurality of tunable subsystems, e.g., (optionally) tunable fluid ends and/or tunable down-hole stimulators. And each subsystem may comprise tunable components, e.g., tunable valves, tunable valve seats, and/or tunable vibration generators. Functions of tunable subsystems are coordinated via control elements including, for example, down-hole pressure and/or temperature sensors, detectors for both transmitted and backscatter vibration, and programmable computers running various frac diagnostic software programs. Communication pathways (e.g., the control links schematically illustrated herein) connect control elements, as well as tunable components and subsystems.

Control links carry information (e.g., data, electronic signals for analog or digital encoded variables, and parameters such as frequency, time, amplitude, pressure values, and/or temperature values). Communication pathways include, e.g., mechanical links, electrical cables, wireless links, and/or fluid-filled spaces. While example embodiments of tunable subsystems, tunable components, control elements and control links are described and schematically illustrated herein, the following examples are intended to be merely representative of certain functional groupings to enhance the clarity of overall system description.

One such functional grouping concerns detection, analysis and modification of vibration. In either closed-loop or open-loop embodiments, a single (wide dynamic range) accelerometer can function as a detector of vibration, whether transmitted as broad-spectrum stimulation energy or received in the form of band-limited backscatter vibration energy. But since the typical energy levels of (relatively high-energy) transmitted vibration and (relatively low-energy) backscatter vibration may differ substantially, two or more separate accelerometers may be preferred for greater accuracy. Regardless of their arrangement in a tunable down-hole stimulation system, one or more vibration detectors initiate the flow of feedback information necessary for closed-loop control.

An illustration of such closed-loop control is seen in a first embodiment of a tunable down-hole stimulation system. The system comprises at least one frac pump for creating down-hole hydraulic pressure, together with at least one tunable down-hole stimulator, each stimulator comprising a tunable vibration generator for transmitting vibration hydraulically. The system further comprises a programmable controller for creating a plurality of control signals and transmitting at least one control signal to each frac pump and each tunable down-hole stimulator. Additionally, each tunable down-hole stimulator comprises at least one accelerometer for sensing vibration and for transmitting an electrical signal derived therefrom (i.e., for transmitting an electrical signal which is a function of the vibration as sensed by the accelerometer through change in one or more accelerometer electrical parameters such as capacitance, inductance and/or capacitance). And the programmable controller is responsive to that electrical signal (i.e., the programmable controller creates at least one control signal as a function of that electrical signal).

Each tunable down-hole stimulator comprises a hammer element longitudinally movable within a hollow cylindrical housing having a longitudinal axis, a first end, and a second end, the first end being closed by a fluid interface, and the second end being closed by a driver element. The driver element comprises at least one field emission structure for moving the hammer element to strike, and rebound from, the fluid interface to generate broad-spectrum vibration.

Each of the above field emission structures is responsive to at least one control signal, and the generated broad-spectrum vibration has a predetermined power spectral density responsive to at least one control signal. Additionally, each tunable vibration generator has a characteristic rebound frequency, and each accelerometer is responsive to that characteristic rebound frequency.

The characteristic rebound frequency is substantially influenced by the driver element. And each driver element may comprise one or more magnetic field emission structures and/or one or more electric field emission structures. A hammer element (i.e., a mass) is longitudinally movable within the cylindrical housing between the driver element and the fluid interface. Such movement is influenced (i.e., controlled in an open-loop or closed-loop manner) by forces exerted on the hammer via the magnetic and/or electrical fields of the field emission structure(s). (See, e.g., U.S. Pat. No. 8,760,252 B2, incorporated by reference). To facilitate hammer element movement, the hammer element may comprise, e.g., one or more permanent magnets, and the driver element's field emission structure(s) may comprise, e.g., one or more electromagnets, at least one with reversible polarity and variable field strength. See the '252 patent for other examples of field emission structures.

By design, the hammer element periodically moves toward impact on the fluid interface (analogous in part to the impact of a fluid end valve closure), followed by movement away from the fluid interface (i.e., rebounding from the impact). More specifically, the hammer element moves (under the influence of the driver element's electric and/or magnetic fields) to strike, and rebound from, the fluid interface, thus generating broad-spectrum vibration. In other words, the cylindrical housing, driver element, hammer element, and fluid interface function together as a tunable vibration generator for stimulation.

Note that the hammer element is responsive to the driver element both for striking, and rebounding from, the fluid interface. Responsiveness of the hammer element may be achieved via open-loop control (using empirically-derived predictions of hammer element direction and velocity based, e.g., on field emission strength) or closed-loop control (using, e.g., feedback data on hammer element position to calculate direction and velocity of hammer element movement). The latter data may be obtained, e.g., via an electric field sensor on the fluid interface interacting with an electret electric field emission structure on the hammer element.

Note further that a block diagram of a tunable down-hole stimulator is schematically illustrated herein as having an internal stimulator interconnect which connects two sections: (1) a section comprising an optional down-hole pressure sensor with a tunable vibration generator as described above and (2) a section comprising one or more optional temperature sensors combined with one or more detectors for transmitted and backscatter vibration. The separate (and more numerous) functions of these two sections with their detectors and optional sensors may be compared with the internal structural features shown in the separate schematic illustration of a tunable hydraulic stimulator. Taken together, the two schematic illustrations and the written description herein explain how the relatively less-complex tunable hydraulic stimulator might be used in a relatively-simple open-loop system, while the functionally more-complex tunable down-hole stimulator is adapted to the greater demands of a closed-loop feedback control system.

Regardless of a stimulator's configuration, stimulation vibration energy may preferably be transmitted from down-hole stimulators in relatively short bursts that are spaced apart in time. Time-delayed backscatter vibration energy may then be sensed at the same or different down-hole stimulators in the periods between bursts of transmitted vibration. But both transmitted and backscatter vibration energy can be detected at the fluid interface because they will be present at different times. Thus, one or more accelerometers may provide data on both transmitted and backscatter vibration energy, as well as on the delay time inherent in backscatter vibration.

Delay time, in turn, may be interpreted (e.g., using frac diagnostics) to indicate the stimulation depth or total distance traveled by the backscatter vibration energy. Further, changes in the backscatter vibration's power spectral density (see below) may also (again using frac diagnostics) be used to characterize the geologic material along a wellbore. Thus, vibration information detected by one or more detectors at a fluid interface, as well as estimates of related parameters (e.g., Doppler shift) that can be extracted therefrom, may be particularly useful when determining the preferred directions, depths and lengths of multiple wellbores to be placed in a relatively confined geologic space.

The importance of vibration information is reflected in the schematic illustration herein of a tunable down-hole stimulation system. The illustration includes a block-diagram of a tunable down-hole stimulator, the diagram clearly separating the function of transmitting broad-spectrum vibration for stimulation from the functions of detecting both transmitted vibration energy and band-limited (and time-shifted) backscatter vibration energy. The separated functions emphasize, for example, that changes in backscatter vibration's frequency band limits are reflected as shifts in the vibration energy's power spectral density (or PSD) plot. That is, an up-shift in PSD will reveal that relatively lower frequencies represent a smaller fraction of the plot's total vibration energy. And relatively higher frequencies will be seen to represent a greater portion of the plot's total vibration energy. Such an up-shift could occur naturally as stimulation of geologic material progresses, with backscatter vibration arising in ever-smaller stimulated particles having relatively higher resonant frequencies.

Since backscatter vibration emanates from particles experiencing vibration resonance excitation (i.e., stimulation), changes in the backscatter vibration's PSD can reveal changes in the particles' resonance frequencies. And since particles' resonance frequencies are functions of, among other things, particle size and composition (e.g., hardness), analysis of PSD data can directly indicate the local effects of stimulation. In other words, frac diagnostics applied during the stimulation process can provide near real-time information on the changing nature of the stimulated geologic material. *Specifically, the extent and range of stimulation-generated fragmentation can be estimated through analysis of sequential PSD shifts in band-limited backscatter vibration energy.*

Note that the influence of absolute power levels on backscatter vibration calculations may be substantially reduced through scaling of power measurements (including PSD) to local maxima.

Note also that periodic estimates of the degree of shift in PSD may be used to estimate progress (in near-real time) toward a desired end point for stimulation. Thus, stimulation may be optimized via control of vibration energy to achieve a predetermined degree of fragmentation. If more fragmentation is desired, one may up-shift (or re-tune) the power spectral density of the originally-transmitted vibration to make more total high-frequency stimulation energy available. A tunable down-hole stimulator facilitates this up-shift through responsiveness of its hammer element's rebound cycle time to its driver element's field emission structure(s).

Responsiveness of a hammer element to a driver element of a tunable down-hole stimulator may be achieved via, e.g., a field emission structure comprising an electromagnet/controller having programmable magnetic field polarity reversal and variable magnetic field strength, as seen, e.g., in linear reversible motors. Control of magnetic field strength is optionally via open-loop and/or closed-loop networks associated with the electromagnet/controller. Note that such magnetic field strength control allows the driver to influence hammer element movement before, during and after each impact via attractive or repelling spatial forces. See. e.g., the '252 patent for a discussion of spatial forces.

In practice, cyclical changes in magnetic field strength may be characterized by a polarity reversal frequency responsive to the accelerometer signal mentioned earlier and/or to a signal from a tunable down-hole stimulator system controller. Longitudinal movement of the hammer element is thus responsive in part (e.g., via electromagnetic attraction and repulsion) to the driver element's cyclical magnetic polarity reversal. For example, longitudinal movement of the hammer element striking, and subsequently rebounding from, the fluid interface may be substantially in phase with the polarity reversal frequency to generate vibration transmitted by the fluid interface.

Thus, each hammer strike is at least in part a function of magnetic field polarity and strength, and it is followed by a rebound which is at least in part a function of flexure due to elastic properties (e.g., modulus of elasticity) of the hammer and fluid interface. The rebound may also be a function of the driver element's magnetic field polarity and strength. The duration of the hammer element's entire flexure-rebound cycle is thus controllable; it is termed herein "hammer rebound cycle time" and is measured in seconds. The inverse of hammer rebound cycle time has the same dimensions as frequency (e.g., cycles per second) and is termed "characteristic rebound frequency" herein.

Each hammer strike & rebound applies a mechanical shock to the fluid interface which generates a (relatively-broad) spectrum of stimulation vibration frequencies that are transmitted hydraulically via the fluid interface (and the surrounding down-hole fluid) to the adjacent geologic material. (See the Background section above). The breadth of the generated stimulation vibration spectrum is a reflection of a mechanical shock's duration (i.e., the rebound cycle time). Shortening the rebound cycle time broadens the generated-vibration spectrum (i.e., the spectrum extends to include relatively higher frequencies). The power spectral density is therefore up-shifted, meaning that more of the total power of the transmitted spectrum is represented in the higher frequencies. In this manner, additional stimulation energy (i.e., rock-fracturing energy) may be directed to relatively smaller rock fragments because these fragments have resonances at the relatively-higher stimulation vibration frequencies. Thus, a tunable down-hole stimulator's transmitted stimulation vibration energy may be controlled so as to encourage continued geologic fragmentation to a predetermined fragment size (e.g., to a size for effective function as a proppant).

Summarizing, hammer rebound movement may be either augmented or impeded by the driver element's magnetic field polarity and strength, thereby changing hammer rebound cycle time and thus changing the character of stimulation vibration spectra generated. That is, the driver element's field emission structure comprising an electromagnet/controller can effectively, and in near-real time, tune each stimulation vibration spectrum transmitted by the fluid interface for application to geologic material adjacent to a wellbore. Such tuning may comprise, for example, altering a transmitted vibration spectrum's bandwidth and/or changing the relative magnitudes of the vibration spectrum's frequency components (i.e., changing the spectrum's power spectral density). In other words, stimulation energy in the form of vibration spectra transmitted by a tunable down-hole stimulator's fluid interface may be subject (in near-real time) to alterations in response to ongoing results of frac diagnostic calculations operating on feedback data inherent in backscatter vibration.

Note that alternative embodiments of a down-hole stimulation vibration generator may be described as having the form of a linear electrical motor, the hammer element acting as an armature. One such form is seen in railguns, with the armature providing the conducting connection between (parallel) rails. In this case, opposing currents in the rails (and thus the hammer movement) would be controlled by the driver to achieve the desired characteristic rebound frequency. (See, e.g., U.S. Pat. Nos. 8,371,205 B2 and 8,677,877 B2, both incorporated by reference).

Progressive alterations in the character of stimulation vibration energy applied to down-hole geologic material may include, for example, changes in vibration frequencies present, changes in relative energy levels of vibration frequency components, and/or changes in the total power of a pulse of stimulation vibration. Such changes may be desirable while stimulation proceeds through a continuum of fracturing of the geologic material. Progress of stimulation is reflected in backscatter vibration, the character of which changes with continued fracturing and/or fragmentation of the geologic material. That is, the geologic material's absorption of stimulation vibration energy, and its radiation of backscatter vibration, changes in a time-varying manner. Changes in absorbed stimulation energy, in turn, cause changes in backscatter vibration that may be detected (e.g., by an accelerometer) at the fluid interface. The resulting accelerometer signal may then be fed back to the driver (e.g., by cable or wireless link) as described herein.

The invention thus facilitates a form of closed-loop (feedback) control of the stimulation process that may be optimized (i.e., to yield better results from less stimulation). One might choose, for example, to emphasize relatively higher down-hole pressure and lower frequency stimulation vibration energy initially. One might then choose to adaptively decrease the down-hole pressure and increase relatively higher frequency stimulation vibration spectrum components as stimulation progresses. Individual tunable down-hole stimulators of the invention can support such an optimization strategy inherently because they naturally produce relatively broad vibration spectra (rather than substantially single-frequency vibration like an aviation black-box pinger). Should a greater frequency range be desired than that obtainable from a single tunable down-hole stimulator, a plurality of such stimulators may be interconnected in a *tunable down-hole stimulator array*. Operation of such an array may be controlled via, for example, a programmable controller as part of a tunable down-hole stimulation system, the controller having one or more control links to the driver of each stimulator of a tunable down-hole stimulator array. Such an array may reveal location dependent resonances through cross PSD calculations in the programmable controller. (See, e.g., U.S. Pat. No. 8,571,829 B2, incorporated by reference).

In such a tunable down-hole stimulator array, the driver element polarity reversal frequency of each down-hole stimulator may be made responsive to a band-limited portion of backscatter vibration represented in one accelerometer signal. Alternatively or additionally, stimulation vibration of the array may be subject to control via programmable devices elsewhere in a wellbore and/or at the wellhead.

A second embodiment of tunable down-hole stimulation system is similar in several respects to the above first embodiment, comprising at least one frac pump for creating down-hole hydraulic pressure. But the second embodiment differs in that at least one frac pump is combined with at least one proppant pump connected in parallel with the frac pump for adding exogenous proppant. The system further comprises at least one tunable down-hole stimulator, each stimulator comprising a tunable vibration generator having a characteristic rebound frequency. A programmable controller is included for creating a plurality of control signals and transmitting at least one control signal to each frac pump, each proppant pump, and each tunable down-hole stimulator. Each tunable down-hole stimulator comprises at least one accelerometer for sensing vibration and for transmitting an electrical signal derived therefrom (i.e., for transmitting an electrical signal which is a function of the vibration as sensed by the accelerometer through change in one or more accelerometer electrical parameters such as capacitance, inductance and/or resistance). And each accelerometer is responsive to the characteristic rebound frequency (i.e., the accelerometer transmits at least one electrical signal which is a function of the characteristic rebound frequency). Finally, the programmable controller is responsive to the electrical signal (i.e., the programmable controller creates at least one control signal as a function of that electrical signal). Further, longitudinal hammer element movement, as noted above, is associated with the tunable vibration generator's characteristic rebound frequency. In certain embodiments, the characteristic rebound frequency may be similar to the magnetic field's polarity reversal frequency to aid control of the hammer's longitudinal displacement.

A third embodiment of a tunable down-hole stimulation system differs from the above first and second embodiments in part because it comprises a wellbore which itself comprises a vertical wellbore, a kickoff point, a heel, and a toe. At least one frac pump creates down-hole hydraulic pressure in the wellbore, and at least one tunable down-hole stimulator is located within the wellbore (and between the heel and toe). Each stimulator comprises a tunable vibration generator, and a programmable controller creates a plurality of control signals and transmits at least one control signal to each frac pump and each tunable down-hole stimulator. Each tunable down-hole stimulator comprises at least one accelerometer for sensing vibration and for transmitting an electrical signal derived therefrom, and the programmable controller is responsive to the electrical signal.

As noted above, part of the vibration sensed at the fluid interface typically includes time-delayed backscatter vibration. It also may contain temperature data related to the degree of rock fracturing and/or fragmentation, including the size of rock fragments. Fracturing-related temperature changes may be induced in part by mechanical inefficiencies secondary to vibration earlier transmitted from the fluid interface. (See U.S. Pat. No. 8,535,250 B2, incorporated by reference). Hence, temperature-related well-stimulation data can be used to augment control of fracturing resulting from transmitted stimulation vibration.

Note also that the driver element's polarity and field strength may also or alternatively be directly responsive (e.g., via integrated control electronics and windings of the electromagnet) to the magnetic field strength at the fluid interface. Such responsiveness may be mediated by changes in the magnetic field permeability sensed by the control electronics, the permeability changes being in part functions of the amplitude and frequency of backscatter vibration received by the fluid interface. Reception of the backscatter vibration thus allows (by at least two mechanisms) near-real-time estimation of the degree of stimulation imposed by the tunable down-hole stimulator.

An important determinant of imposed stimulation is the hammer element's striking face, which has a predetermined modulus of elasticity that may be relatively high (approximately that of mild steel, for example) if a relatively broad spectrum of stimulation vibration is desired. Conversely, a lower modulus of elasticity may be chosen to reduce the highest frequency components of stimulation vibration spectra. For convenience, alternate hammer embodiments may comprise one or a plurality of interchangeable striking faces, each having a single value within a predetermined range of modulus choices. Choice of that range will facilitate tuning of the down-hole stimulator to predetermined stimulation vibration spectra, of course, and the range of vibration spectra parameters (e.g., frequency and magnitude) will also be influenced by the fluid interface's modulus of elasticity and the design criteria vibration spectrum frequency range.

The spectra of stimulation vibration desired for a particular application will generally be chosen to encompass one or more of the (estimated) resonant frequencies of the geologic structures being stimulated (including resonant frequencies before, during, and after stimulation). For example, it has been reported that vibration frequencies in the ultrasound range (i.e., >20 kHz) can improve the permeability of certain porous media surrounding a well. On the other hand, vibration frequencies <20 kHz may propagate with less loss, while still significantly increasing well flow rates. (See, e.g., U.S. patent publication number 2014/0027110 A1, incorporated by reference). Optimization of the stimulation process may be facilitated using estimates obtained via (1) one or more programmable microprocessors in the tunable down-hole stimulator and/or (2) one or more programmable microprocessors in the tunable down-hole stimulation system controller. Such estimates may be based in part, e.g., on the portion(s) of the backscatter vibration energy from stimulated porous media.

Note that a tunable down-hole stimulator is intended for down-hole use within a fluid environment maintained in the wellbore via (1) fluids collected through explosively-formed perforations or preformed slots in the wellbore casing from the surrounding geologic formations and/or via (2) addition of fluid at the wellhead to equal or exceed the filtration rate (sometimes termed the leakoff rate). (See U.S. Pat. No. 8,540,024 B2, incorporated by reference). The fluid surrounding a stimulator may comprise water and/or petroleum oil, and it may be passively pressurized by the well's hydraulic head alone, or with additional pressure provided by one or more frac pumps. Since either the tunable down-hole stimulator or the tunable hydraulic stimulator can be completely sealed from internal contact with surrounding fluid, use of either embodiment is not subject to dielectric strength and conductivity limitations (e.g., "compensation dielectric liquid" required in U.S. patent publication number 2014/0027110 A1 cited above) that are common in pulsed power apparatus. (See also U.S. Pat. No. 8,616,302 B2, incorporated by reference).

Note also that tunable resilient circumferential seals are electively provided to isolate predetermined explosively-formed perforations or preformed slots in portions of the wellbore casing (analogous in part to swell packers). (See, e.g., U.S. patent application number 2014/0051612 A1, incorporated by reference). Such tunable seals can provide a tuned coupling of the stimulator to the wellbore casing. The circumferential seal comprises a circular tubular area which may contain at least one shear-thickening fluid to assist tuning to a preferred frequency range. And the fluid may further comprise nanoparticles which, in conjunction with the shear-thickening fluid, also facilitate tuning of the seal as well as heat scavenging.

Having summarized certain improvements in new tunable down-hole stimulation systems as a whole, this description now focuses on subsystems and components (e.g., structures and functions of the frac pump's fluid end and down-hole stimulators). While a tunable down-hole stimulator is intended to generate vibration to augment fracturing of rock formations, the focus in fluid ends is on control of valve-generated vibration for minimizing excitation of fluid end and/or pump resonances to avoid fatigue-mediated fluid end failures.

Tunable fluid ends reduce valve-generated vibration to increase fluid-end reliability. Tunable fluid end embodiments comprise a family, each family member comprising a pump housing with at least one installed tunable component chosen from: tunable check valve assemblies, tunable valve seats, tunable radial arrays and/or tunable plunger seals. Each tunable component, in turn, contributes to blocking excitation of fluid end resonances, thus reducing the likelihood of fluid end failures associated with fatigue cracking and/or corrosion fatigue. By down-shifting the frequency domain of each valve-closing impulse shock, initial excitation of fluid end resonances is minimized. Subsequent damping and/or selective attenuation of vibration likely to excite one or more predetermined (and frequently localized) fluid end resonances represents optimal employment of vibration-control resources.

Frequency domain down-shifting and damping both assist vibration control by converting valve-closure energy to heat and dissipating it in each tunable component present in a tunable fluid end embodiment. Effects of down-shifting on a valve-closure impulse shock include frequency-selective spectrum-narrowing that is easily seen in the frequency domain plot of each shock. That is, down-shifting effectively attenuates and/or limits the bandwidth(s) of valve-generated vibration. Subsequent (coordinated) damping assists in converting a portion of this band-limited vibration to heat.

Both down-shifting and damping are dependent in part on constraints causing shear-stress alteration (that is, "tuning") imposed on one or more viscoelastic and/or shear-thickening materials in each tunable component. Additionally, hysteresis or internal friction (see *Harris*, p. 5.7) associated with mechanical compliance of certain structures (e.g., valve bodies or springs) may aid damping by converting vibration energy to heat (i.e., hysteresis loss). (See *Harris*, p. 2.18).

Tunable component resonant frequencies may be shifted (or tuned) to approximate predetermined values corresponding to measured or estimated pump or fluid end housing resonant frequencies. Such coordinated tuning predisposes valve-generated vibration at critical frequencies to excite the tunable component (and thus be damped and dissipated as heat) rather than exciting the housing itself (and thus predispose it to vibration fatigue-related cracking).

To complement the above coordinated damping, frequency down-shifting functions to reduce the total amount of critical frequency vibration requiring damping. Such down-shifting is activated through designs enhancing mechanical compliance. In continuous pump operation, mechanical compliance is manifest, for example, in elastic valve body flexures secondary to repetitive longitudinal compressive forces (i.e., plunger pressure strokes). Each such flexure is followed by a hysteresis-limited elastic rebound, the duration of the entire flexure-rebound interval being termed herein "rebound cycle time." The inverse of rebound cycle time is termed herein "characteristic rebound frequency." Cumulative rebound cycle energy loss in the form of heat (e.g., hysteresis loss plus friction loss) is continuously transported for redistribution within the valve body and eventual rejection to the valve body surroundings (including, e.g., the pumped fluid). This heat loss represents a reduction in the available energy content (and thus the damage-causing potential) of the valve-closure energy impulse.

Note that lengthening rebound cycle time to beneficially narrow the valve-generated vibration spectrum is accomplished in various invention embodiments using mechanical/ hydraulic/pneumatic analogs of electronic wave-shaping techniques. For example, lengthened rebound cycle time is substantially influenced by the tunable valve assembly's increased longitudinal compliance associated with rolling seal contact (i.e., comprising valve body flexure and rebound) described herein between the valve body's peripheral valve seat interface and the tunable valve seat's mating surface.

Briefly summarizing, as each tunable component present in a tunable fluid end embodiment absorbs, converts and redistributes (i.e., dissipates) a portion of valve closing impulse shock energy, only a fraction of the original closing impulse energy remains at critical frequencies capable of exciting destructive resonant frequencies in the fluid end. Following vibration down-shifting, a significant portion of valve-closure energy has been shifted to lower frequency vibration through structural compliance as described above. This attenuated vibration is then selectively damped (i.e., dissipated as heat) at shifted frequencies via one or more of the tunable components. While tunable components may be relatively sharply tuned (e.g., to act as tuned mass dampers for specific frequencies), they may alternately be more broadly tuned to account for a range of vibration frequencies encountered in certain pump operations. Flexibility in tuning procedures, as described herein with material and adjustment choices, is therefore desirable.

Note that vibration absorption at specific frequencies (e.g., via dynamic or tuned absorbers) may have limited utility in frac pumps because of the varying speeds at which the pumps operate and the relatively broad bandwidths associated with valve-closing impulse shocks. In contrast, the process of down-shifting followed by damping is more easily adapted to changes inherent in the pumps' operational environment. Damping may nevertheless be added to a dynamic absorber to increase its effective frequency range for certain applications. (See, e.g., tuned vibration absorber and tuned mass damper in ch. 6 of *Harris*).

Selective damping of vibration frequencies near the resonant frequencies of fluid ends is desirable for the same reason that soldiers break step when they march over a bridge—because even relatively small amounts of vibration energy applied at the bridge's resonant frequency can cause catastrophic failure. Similar reasoning underlies the functions of selective vibration down-shifting and damping in tunable fluid ends. Various combinations of the tunable components described herein are particularly beneficial because they focus the functions of vibration-limiting resources on minimization of vibration energy present in a fluid end near its housing's critical frequencies. Cost and complexity of tunable components are thus minimized while the efficacy of each tunable component's function (i.e., vibration limitation at particular frequencies) is enhanced. Stated another way, a tunable component's selective vibration down-shifting and damping are optimized using metrics including cost, complexity, and damping factor (or degree of damping).

Note that a variety of optimization strategies for vibration attenuation and damping may be employed in specific cases, depending on parameters such as the Q (or quality) factor attributable to each fluid end resonance. The fluid end response to excitation of a resonance may be represented graphically as, for example, a plot of amplitude vs. frequency. Such a Q response plot typically exhibits a single amplitude maximum at the local fluid end resonance frequency, with decreasing amplitude values at frequencies above and below the resonance. At an amplitude value about 0.707 times the maximum value (i.e., the half-power point), the amplitude plot corresponds not to a single frequency but to a bandwidth between upper and lower frequency values on either side of the local fluid end resonance. The quality factor Q is then estimated as the ratio of the resonance frequency to the bandwidth. (See, e.g., pp. 2-18, 2-19 of *Harris*). (See also U.S. Pat. No. 7,113,876 B2, incorporated by reference).

Lower Q connotes the presence of more damping and a wider bandwidth (i.e., a relatively broader band of near-resonant frequencies). And higher Q connotes less damping and a narrower bandwidth (ideally, zero damping and a single resonant frequency). Since ideal fluid end resonances are not encountered in practice, optimization strategies typically include choice of the peak resonant frequency and Q of the tunable component in light of the peak resonant frequency and Q of the fluid end resonance of interest. Tunable component resonant frequencies identified herein as "similar" to fluid end or pump housing resonances are thus understood to lie generally in the frequency range indicated by the upper and lower frequency values of the relevant Q response half-power bandwidth.

In tunable components of the invention, choice of Q depends on both materials and structure, especially structural compliances and the properties of viscoelastic and/or shear-thickening materials present in the component(s). Further, the peak (or representative) frequency of a tunable component or a fluid end resonance may not be unambiguously obtainable. Thus, optimization of tunable component vibration damping may be an iterative empirical process and may not be characterized by a single-valued solution. Note also that tunable component resonant frequencies may be intentionally "detuned" (i.e., adjusted to slightly different values from nominal resonant or peak frequencies) in pursuit of an overall optimization strategy.

To minimize fluid end fatigue failures then, resonant frequencies of each tunable component of the invention are adjusted (i.e., tuned) using analytical and/or empirical frequency measures. Such measures are considered in light of the resonant frequencies of any other tunable component(s) present, and also in light of critical resonances of the fluid end or pump itself. The objective is optimal attenuation and damping of the most destructive portion(s) of valve-generated vibration. In each case, optimal vibration limitation will be dependent on the component's capacity to dissipate heat generated through hysteresis, friction and/or fluid turbulence. Thus, certain predetermined portion(s) of valve-closure energy are dissipated at one or more predetermined pump housing resonant (critical) frequencies.

Note that the critical frequencies proximate to a fluid end suction bore may differ, for example, from the critical frequencies proximate to the same fluid end's plunger bore due to the different constraints imposed by structures proximate the respective bores. Such differences are accounted for in the adjustment of tunable components, particularly tunable valve seats and tunable plunger seals.

What follows are descriptions of the structure and function of each tunable component that may be present in a tunable fluid end embodiment, the fluid end having at least one fluid end resonant frequency. Each tunable fluid end embodiment comprises at least one subassembly, and each subassembly comprises a housing (e.g., a fluid end housing or pump housing with appropriate bores). Within each housing's respective bores are a suction valve, a discharge valve, and a plunger or piston. When a tunable fluid end comprises multiple subassemblies (which is the general case), the respective subassembly housings are typically combined in a single fluid end housing. And at least one subassembly has at least one tunable component. In specific tunable fluid end embodiments, tunable components may be employed singly or in various combinations, depending on operative requirements.

The first tunable component described herein is a tunable check valve assembly (one being found in each tunable check valve). Installed in a fluid end for high pressure pumping, a tunable check valve assembly comprises at least one vibration damper or, in certain embodiments, a plurality of (radially-spaced) vibration dampers disposed in a valve body. Each vibration damper constitutes at least one tunable structural feature. Since the fluid end has at least a first fluid end resonance frequency, at least one vibration damper has (i.e., is tuned to) at least a first predetermined assembly resonant frequency similar to the first fluid end resonance (i.e., resonant frequency). If, for example, the fluid end has a second fluid end resonance frequency (a common occurrence), a single vibration damper and/or at least one of a plurality of vibration dampers may have (i.e., be tuned to) at least a second predetermined assembly resonant frequency similar to the second fluid end resonance frequency. In general, the specific manner of damping either one or a plurality of fluid end resonance frequencies with either one or a plurality (but not necessarily the same number) of vibration dampers is determined during the optimization process noted above.

Each of the sample embodiments of tunable check valve assemblies schematically illustrated herein comprises a check valve body having guide means (to maintain valve body alignment during longitudinal movement) and a peripheral valve seat interface. A peripheral groove spaced radially apart from a central reservoir is present in certain embodiments, and a viscoelastic structure may be present in the peripheral groove (i.e., the groove damping element). In one such embodiment, the assembly's vibration dampers comprise a plurality of radially-spaced viscoelastic body structures disposed in the groove and reservoir, the viscoelastic groove element comprising a groove circular tubular area. In alternative embodiments, the viscoelastic reservoir (or central) damping element may be replaced by a central spring-mass damper. A viscoelastic central damper may be tuned, for example, via a flange centrally coupled to the valve body. A spring-mass central damper may be tuned, for example, by adjusting spring constant(s) and/or mass(es), and may also or additionally be tuned via the presence of a viscous or shear-thickening liquid in contact with one or more damper elements.

A reservoir (or central) damping element tuning frequency may be, as noted above, a first predetermined assembly resonant frequency similar to a first fluid end resonance. Analogously, the groove circular tubular area may comprise at least one shear thickening material providing the means to tune the groove damping element to at least a second predetermined assembly resonant frequency similar, for example, to either a first or second fluid end resonant frequency. The choice of tuning frequencies for the reservoir and groove damping elements is not fixed, but is based on a chosen optimization strategy for vibration damping in each fluid end.

Note that phase shifts inherent in the (nonlinear) operation of certain vibration dampers described herein create the potential for a plurality of resonant frequencies in a single vibration damper.

Note also that the longitudinal compliance of a tunable check valve assembly affects its rebound cycle time and thus influences vibration attenuation (i.e., downshifting or spectrum narrowing), which constitutes a form of tuning. Further, vibration dampers in alternative tunable check valve assembly embodiments may comprise spring-mass combinations having discrete mechanical components in addition to, or in place of, viscoelastic and/or shear-thickening components. An example of such a spring-mass combination within a valve body central reservoir is schematically illustrated herein.

The second tunable component described herein is a tunable valve seat, certain embodiments of which may be employed with a conventional valve body or, alternatively, may be combined with a tunable check valve assembly to form a tunable check valve. A tunable valve seat in a fluid end for high pressure pumping comprises a concave mating surface and/or a lateral support assembly longitudinally spaced apart from a mating surface. A lateral support assembly, when present, is adjustably secured (e.g., on a lateral support mounting surface) or otherwise coupled to the mating surface. A lateral support assembly is a tunable structural feature for resiliently coupling the tunable valve seat to a fluid end housing (and thus damping vibrations therein). That is, a lateral support assembly (and thus a tunable valve seat of which it is a part) has at least one tunable valve seat resonant frequency similar to at least one fluid end resonant frequency. Further, a lateral support assembly may be combined with a concave mating surface to provide two tunable structural features in a single tunable valve seat. Tunability of the concave mating surface inheres in its influence on rebound cycle time through the predetermined orientation and degree of curvature of the concave mating surface. Since it constitutes a tunable structural feature, a concave mating surface may be present in a tunable valve seat without a lateral support assembly. In the latter case, the concave mating surface will be longitudinally spaced apart from a pump housing interface surface, rather than a lateral support mounting surface (examples of these two surfaces are schematically illustrated herein). In light of a tunable valve seat's potential for embodying either one or two tunable structural features, a plurality of tunable valve seat resonant frequencies may characterize a single tunable valve seat, with the respective frequencies being chosen in light of the fluid end resonance(s) and the valve closure impulse vibration spectrum.

Flexibility in the choice of tunable valve seat resonant frequencies is guided by optimization criteria for vibration control in a tunable fluid end. Such criteria will suggest specifics of a lateral support assembly's structure and/or the concave curvature of a mating surface. For example, a support assembly's one or more suitably-secured circular viscoelastic support elements comprise a highly adaptable support assembly design for resiliently coupling the tunable valve seat to a fluid end housing (and thus damping vibrations therein). At least one such viscoelastic support element comprises a support circular tubular area. And each support circular tubular area, in turn, comprises at least one shear thickening material having (i.e., being tuned to a resonance frequency similar to) at least one seat resonant frequency that may be chosen to be similar to at least one fluid end resonant frequency. As above, the choice of tuning frequency or frequencies for a tunable valve seat is not fixed, but is based on a predetermined optimization strategy for vibration damping in each fluid end Note that in addition to individual tuning of a tunable check valve assembly and a tunable valve seat (forming a tunable check valve), the combination may be tuned as a whole. For example, a tunable check valve in a fluid end for high pressure pumping may alternatively or additionally be tuned for spectrum narrowing by ensuring that its characteristic rebound frequency (i.e., a function of rebound cycle time) is less than at least one fluid end resonant frequency. In such a case, for example, at least one tunable valve seat resonant frequency may be similar to at least one fluid end resonant frequency.

The third tunable component described herein is a tunable radial array disposed in a valve body. In a schematically illustrated embodiment, the valve body comprises guide means, a peripheral valve seat interface, and a fenestrated peripheral groove spaced radially apart from a central reservoir. A viscoelastic body element disposed in the groove (the groove element) is coupled to a viscoelastic body element disposed in the reservoir (the reservoir element) by a plurality of viscoelastic radial tension members passing through a plurality of fenestrations in the peripheral groove. Each radial tension member comprises at least one polymer composite and functions to couple the groove element with the reservoir element, a baseline level of radial tension typically arising due to shrinkage of the viscoelastic elements during curing. The tensioned radial members, as schematically illustrated herein, assist anchoring of the coupled groove element firmly within the peripheral seal-retention groove without the use of adhesives and/or serrations as have been commonly used in anchoring conventional valve seals. Radial tension members also create a damped resilient linkage of groove element to reservoir element (analogous in function to a spring-mass damper linkage). This damped linkage can be "tuned" to approximate (i.e., have a resonance similar to) one or more critical frequencies via choice of the viscoelastic and/or composite materials in the damped linkage. Note that radial tension members also furnish a transverse preload force on the valve body, thereby altering longitudinal compliance, rebound cycle time (and thus characteristic rebound frequency), and vibration attenuation.

The fourth tunable component described herein is a tunable plunger seal comprising at least one lateral support assembly (analogous to that of a tunable valve seat) securably and sealingly positionable along a plunger. Typically, a lateral support assembly will be installed in a packing box (sometimes termed a stuffing box) or analogous structure. The tunable plunger seal's lateral support assembly is analogous in structure and function to that of a tunable valve seat, as are the tuning procedures described above.

Note that the predetermined resonant frequency of each circular viscoelastic element of a lateral support assembly is affected by the viscoelastic material(s) comprising it, as well as by constraints imposed via adjacent structures (e.g., portions of a valve seat, fluid end housing, packing box or plunger). The choice of a variety of viscoelastic element inclusions includes, for example, reinforcing fibers, circular and/or central cavities within the viscoelastic element, and distributions of special-purpose materials (e.g., shear-thickening materials and/or graphene) within or in association with one or more viscoelastic elements.

Note also that the lateral support assembly of either a tunable valve seat or a tunable plunger seal resiliently links the respective valve seat or plunger with adjacent portions of a fluid end housing, effectively creating a spring-mass damper coupled to the housing. This damped linkage can be "tuned" to approximate one or more critical frequencies via, e.g., shear-thickening materials in the respective circular tubular areas as described herein.

Analogous damped linkages between the housing and one or more auxiliary masses may be incorporated in tunable fluid end embodiments for supplemental vibration damping at one or more fluid end resonant frequencies (e.g., auxiliary tuned vibration absorbers and/or tuned-mass dampers). Additionally or alternatively, one or more damping surface layers (applied, e.g., as metallic, ceramic and/or metallic/ceramic coatings) may be employed for dissipating vibration and/or for modifying one or more fluid end resonant frequencies in pursuit of an overall optimization plan for fluid end vibration control. Such damping surface layers may be applied to fluid ends by various methods known to those skilled in the art. These methods may include, for example, cathodic arc, pulsed electron beam physical vapor deposition (EB-PVD), slurry deposition, electrolytic deposition, sol-gel deposition, spinning, thermal spray deposition such as high velocity oxy-fuel (HVOF), vacuum plasma spray (VPS) and air plasma spray (APS). The surface layers may be applied to the desired fluid end surfaces in their entirety or applied only to specified areas. Each surface layer may comprise a plurality of sublayers, at least one of which may comprise, for example, titanium, nickel, cobalt, iron, chromium, silicon, germanium, platinum, palladium and/or ruthenium. An additional sublayer may comprise, for example, aluminum, titanium, nickel, chromium, iron, platinum, palladium and/or ruthenium. One or more sublayers may also comprise, for example, metal oxide (e.g., zirconium oxide and/or aluminum oxide) and/or a nickel-based, cobalt-based or iron-based superalloy. (See e.g., U.S. Pat. No. 8,591,196 B2, incorporated by reference).

Further as noted above, constraints on viscoelastic elements due to adjacent structures can function as a control mechanism by altering tunable component resonant frequencies. Examples of such effects are seen in embodiments comprising an adjustable flange coupled to the valve body for imposing a predetermined shear preload by further constraining a viscoelastic element already partially constrained in the reservoir. One or more tunable check valve assembly resonant frequencies may thus be predictably altered. Consequently, the associated valve-generated vibration spectrum transmissible to a housing may be narrowed, and its amplitude reduced, through hysteresis loss of valve-closure impulse energy at each predetermined assembly resonant frequency (e.g., by conversion of valve-closure impulse energy to heat energy, rather than vibration energy).

In addition to composite viscoelastic element inclusions, control mechanisms for alteration of tunable component resonant frequencies further include the number, size and spacing of peripheral groove fenestrations. When fenestrations are present, they increase valve assembly responsiveness to longitudinal compressive force while stabilizing viscoelastic and/or composite peripheral groove elements. Such responsiveness includes, but is not limited to, variations in the width of the peripheral groove which facilitate "tuning" of the groove together with its viscoelastic element(s).

Briefly summarizing, each embodiment of a tunable component attenuates and/or damps valve-generated vibration at one or more fluid end critical frequencies. The transmitted vibration spectrum is thus narrowed and its amplitude reduced through conversion and dissipation of valve-closure impulse (kinetic) energy as heat. One or more tunable component structural features are thus tunable to one or more frequencies similar to at least one fluid end resonant frequency to facilitate redistribution/dissipation of impulse kinetic energy, following its conversion to heat energy.

Continuing in greater detail, valve-closure impulse energy conversion in a tunable component primarily arises from hysteresis loss (e.g., heat loss) in viscoelastic and/or discrete-mechanical elements, but may also occur in related structures (e.g., in the valve body itself). Hysteresis loss in a particular structural feature is related in-part to that feature's compliance (i.e., the feature's structural distortion as a function of applied force).

Compliance arises in structural features of a tunable component, such as one or more viscoelastic elements, plus at least one other compliant portion. For example, a tunable check valve body distorts substantially elastically under the influence of a closing energy impulse, and its associated viscoelastic element(s) simultaneously experience(s) shear stress in accommodating the distortion. The resulting viscoelastic shear strain, however, is at least partially time-delayed. And the time delay introduces a phase-shift useful in damping valve-generated vibration (i.e., reducing its amplitude). Analogous time-delay phase shift occurs in a mass-spring damper comprising discrete mechanical elements.

In addition to vibration damping, a complementary function of a tunable component is narrowing of the spectrum of valve-generated vibration. Spectrum narrowing (or vibration down-shifting) is associated with compliance in the form of deformation over time in response to an applied force. Since each instance of compliance takes place over a finite time interval, the duration of a closing energy impulse is effectively increased (and the vibration spectrum correspondingly narrowed) as a function of compliance.

A narrowed valve-generated vibration spectrum, in turn, is less likely to generate destructive sympathetic vibration in adjacent regions of a fluid end housing. For this reason, compliant portions of a valve body are designed to elastically distort under the influence of the closing energy impulse (in contrast to earlier substantially-rigid valve designs). Compliance-related distortions are prominent in, but not limited to, the shapes of both the (peripheral) groove and the (relatively central) reservoir. Viscoelastic elements in the groove and reservoir resist (and therefore slow) the distortions, thus tending to beneficially increase the closing energy impulse's duration while narrowing the corresponding vibration spectrum.

Distortions of both groove and reservoir viscoelastic body elements result in viscoelastic stress and its associated time-dependent strain. But the mechanisms differ in the underlying distortions. In a peripheral groove, for example, proximal and distal groove walls respond differently to longitudinal compressive force on the tunable check valve assembly. They generally move out-of-phase longitudinally, thereby imposing time-varying compressive loads on the groove viscoelastic element. Thus the shape of the groove (and the overall compliance of the groove and its viscoelastic element) changes with time, making the groove as a whole responsive to longitudinal force on the assembly.

Peripheral groove fenestrations increase groove responsiveness to longitudinal force. As schematically illustrated herein, fenestrations increase groove responsiveness by changing the coupling of the proximal groove wall to the remainder of the valve body (see Detailed Description herein).

In the reservoir, in contrast, responsiveness to longitudinal force may be modulated by an adjustable preload flange centrally coupled to the valve body. The flange imposes a shear preload on the viscoelastic reservoir element (i.e., shear in addition to that imposed by the reservoir itself and/or by the closing energy impulse acting on the viscoelastic element via the pumped fluid). The amount of shear preload varies with the (adjustable) radial and longitudinal positions of the flange within the reservoir. The overall compliance and resonances of the reservoir and its viscoelastic element may be predictably altered by such a shear preload, which is imposed by the flange's partial constraint of the viscoelastic reservoir element. Note that when reservoir and groove viscoelastic body elements are coupled by a plurality of radial tension members, as in a tunable radial array, the radial tension members lying in groove wall fenestrations allow transmission of shear stress between the groove and reservoir viscoelastic elements.

Thus, in tunable radial array embodiments, at least a first predetermined resonant frequency may substantially replicate a (similar) pump housing resonant frequency via adjustment of shear preload on the reservoir viscoelastic element. The plurality of fenestration elements coupling the reservoir element with the groove element may have at least a second predetermined resonant frequency related to the first predetermined resonant frequency and optionally achieved through choice of tensile strength of the radial tension members (i.e., fenestration elements). And at least a third predetermined resonant frequency related to the first and second predetermined resonant frequencies may be achieved through choice of at least one shear thickening material in circular tubular areas of the groove viscoelastic element and/or one or more support circular tubular areas.

Note that any structural feature of a tunable check valve assembly or tunable radial array (e.g., a valve body or a viscoelastic element) may be supplemented with one or more reinforcement components to form a composite feature. Reinforcement materials tend to alter compliance and may comprise, for example, a flexible fibrous material (e.g., carbon nanotubes, graphene), a shear-thickening material, and/or other materials as described herein.

As noted above, alterations in compliance (with its associated hysteresis loss) contribute to predetermined vibration spectrum narrowing. Such compliance changes (i.e., changes in displacement as a function of force) may be achieved through adjustment of constraint. Constraint, in turn, may be achieved, e.g., via compression applied substantially longitudinally by the adjustable preload flange to a constrained area of the viscoelastic reservoir element. In embodiments comprising a central longitudinal guide stem, the constrained area may be annular. And adjacent to such an annular constrained area may be another annular area of the viscoelastic reservoir element which is not in contact with the adjustable preload flange (i.e., an annular unconstrained area). This annular unconstrained area is typically open to pumped fluid pressure.

Preload flange adjustment may change the longitudinal compliance of the tunable check valve assembly by changing the effective flange radius and/or the longitudinal position of the flange as it constrains the viscoelastic reservoir element. Effective flange radius will generally exceed actual flange radius due to slowing of (viscous) viscoelastic flow near the flange edge. This allows tuning of the check valve assembly to a first predetermined assembly resonant frequency for maximizing hysteresis loss. Stated another way, by constraining a vibrating structure (e.g., an area of the viscoelastic reservoir element), it is possible to force the vibrational energy into different modes and/or frequencies. See, e.g., U.S. Pat. No. 4,181,027, incorporated by reference.

The invention thus includes means for constraining one or more separate viscoelastic elements of a valve assembly, as well as means for constraining a plurality of areas of a single viscoelastic element. And such constraint may be substantially constant or time-varying, with correspondingly different effects on resonant frequencies. Peripherally, time-varying viscoelastic element constraint may be provided by out-of-phase longitudinal movement of peripheral groove walls. In contrast, time-varying viscoelastic element constraint may be applied centrally by a flange coupled to the valve body.

Flange radial adjustment is facilitated, e.g., via a choice among effective flange radii and/or flange periphery configurations (e.g., cylindrical or non-cylindrical). Flange longitudinal movement may be adjusted, for example, by (1) use of mechanical screws or springs, (2) actuation via pneumatic, hydraulic or electrostrictive transducers, or (3) heat-mediated expansion or contraction. Flange longitudinal movement may thus be designed to be responsive to operational pump parameters such as temperature, acceleration, or pressure. Since pump housing resonant frequencies may also respond to such parameters, tunable check valve assemblies and tunable check valves may be made at least partially self-adjusting (i.e., operationally adaptive or auto-adjusting) so as to change their energy-absorbing and spectrum-narrowing characteristics to optimally extend pump service life.

Note that in certain embodiments, the preload flange may comprise a substantially cylindrical periphery associated with substantially longitudinal shear. Other embodiments may comprise a non-cylindrical periphery for facilitating annular shear preload having both longitudinal and transverse components associated with viscoelastic flow past the flange. Such an invention embodiment provides for damping of transverse as well as longitudinal vibration. Transverse vibration may originate, for example, when slight valve body misalignment with a valve seat causes abrupt lateral valve body movement during valve closing.

Note also that one or more flanges may or may not be longitudinally fixed to the guide stem for achieving one or more predetermined assembly resonant frequencies.

And note further that the first predetermined assembly resonant frequency of greatest interest, of course, will typically approximate one of the natural resonances of the pump and/or pump housing. Complementary hysteresis loss and vibration spectrum narrowing may be added via a second predetermined assembly resonant frequency achieved via the viscoelastic groove element (which may comprise at least one circular tubular area containing at least one shear-thickening material). The time-varying viscosity of the shear-thickening material(s), if present, furnishes a non-linear constraint of the vibrating structure analogous in part to that provided by the adjustable preload flange. The result is a predetermined shift of the tunable check valve assembly's vibrating mode analogous to that described above.

Note that when a nonlinear system is driven by a periodic function, such as can occur with harmonic excitation, chaotic dynamic behavior is possible. Depending on the nature of the nonlinear system, as well as the frequency and amplitude of the driving force, the chaotic behavior may comprise periodic oscillations, almost periodic oscillations, and/or coexisting (multistable) periodic oscillations and nonperiodic-nonstable trajectories (see *Harris*, p. 4-28).

In addition to a shift in the tunable check valve assembly's vibrating mode, incorporation of at least one circular tubular area containing at least one shear-thickening material within the viscoelastic groove element increases impulse duration by slightly slowing valve closure due to reinforcement of the viscoelastic groove element. Increased impulse duration, in turn, narrows the closing energy impulse vibration spectrum. And shear-thickening material itself is effectively constrained by its circular location within the viscoelastic groove element(s).

The shear-thickening material (sometimes termed dilatant material) is relatively stiff near the time of impact and relatively fluid at other times. Since the viscoelastic groove element strikes a valve seat before the valve body, complete valve closure is slightly delayed by the shear-thickening action. The delay effectively increases the valve-closure energy impulse's duration, which means that vibration which is transmitted from the tunable check valve assembly to its (optionally tunable) valve seat and pump housing has a relatively narrower spectrum and is less likely to excite vibrations that predispose a pump housing to early fatigue failure. The degree of spectrum narrowing can be tuned to minimize excitation of known pump housing resonances by appropriate choice of the shear-thickening material. Such vibration attenuation, and the associated reductions in metal fatigue and corrosion susceptibility, are especially beneficial in cases where the fluid being pumped is corrosive.

The functions of the viscoelastic groove element, with its circular shear-thickening material, are thus seen to include those of a conventional valve seal as well as those of a tunable vibration attenuator and a tunable vibration damper. See, e.g., U.S. Pat. No. 6,026,776, incorporated by reference. Further, the viscoelastic reservoir element, functioning with a predetermined annular shear preload provided via an adjustable preload flange, can dissipate an additional portion of valve-closure impulse energy as heat while also attenuating and damping vibration. And viscoelastic fenestration elements, when present, may contribute further to hysteresis loss as they elastically retain the groove element in the seal-retention groove via coupling to the reservoir element. Overall hysteresis loss in the viscoelastic elements combines with hysteresis loss in the valve body to selectively reduce the bandwidth, amplitude and duration of vibrations that the closing impulse energy would otherwise tend to excite in the valve and/or pump housing.

Examples of mechanisms for such selective vibration reductions are seen in the interactions of the viscoelastic reservoir element with the adjustable preload flange. The interactions contribute to hysteresis loss in a tunable check valve assembly by, for example, creating what has been termed shear damping (see, e.g., U.S. Pat. No. 5,670,006, incorporated by reference). With the preload flange adjustably fixed centrally to the check valve body (e.g., fixed to a central guide stem), valve-closure impact causes both the preload flange and guide stem to temporarily move distally with respect to the (peripheral) valve seat interface (i.e., the valve body experiences a concave-shaped flexure). The impact energy associated with valve closure causes temporary deformation of the check valve body; that is, the valve body periphery (e.g., the valve seat interface) is stopped by contact with a valve seat while the central portion of the valve body continues (under inertial forces and pumped-fluid pressure) to elastically move distally. Thus, the annular constrained area of the viscoelastic reservoir element (shown constrained by the preload flange in the schematic illustrations herein) moves substantially countercurrent (i.e., in shear) relative to the annular unconstrained area (shown radially farther from the guide stem and peripheral to the preload flange). That is, relative distal movement of the preload flange thus tends to extrude the (more peripheral) annular unconstrained area proximally. Energy lost (i.e., dissipated) in connection with the resulting shear strain in the viscoelastic element is subtracted from the total closing impulse energy otherwise available to excite destructive flow-induced vibration resonances in a valve, valve seat and/or pump housing. See, e.g., U.S. Pat. No. 5,158,162, incorporated by reference.

Note that in viscoelastic and shear-thickening materials, the relationship between stress and strain (and thus the effect of material constraint on resonant frequency) is generally time-dependent and non-linear. So a desired degree of non-linearity in "tuning" may be predetermined by appropriate choice of viscoelastic and shear-thickening materials in a tunable check valve assembly or tunable check valve.

Another aspect of the interaction of the viscoelastic reservoir element with an adjustable preload flange contributes to vibration damping and/or absorption in a tunable check valve assembly. As a result of compliance in the viscoelastic element, longitudinal movement of a guide stem and a coupled preload flange results in a phase lag as shear stress develops within the viscoelastic material. This is analogous to the phase lag seen in the outer ring movement in an automotive torsional vibration damper or the antiphase movement of small masses in an automotive pendulum vibration damper. See, e.g., the '776 patent cited above. Adjusting the shear preload flange as described above effectively changes the tunable check valve assembly's compliance and thus the degree of phase lag. One may thus, in one or more limited operational ranges, tune viscoelastic element preload to achieve effective vibration damping plus dynamic vibration absorption at specific frequencies of interest (e.g., pump housing resonant frequencies).

To achieve the desired hysteresis loss associated with attenuation and vibration damping effects described herein, different viscoelastic and/or composite elements may be constructed to have specific elastic and/or viscoelastic properties. Note that the term elastic herein implies substantial characterization by a storage modulus, whereas the term viscoelastic herein implies substantial characterization by a storage modulus and a loss modulus. See, e.g., the '006 patent cited above.

Specific desired properties for each viscoelastic element arise from a design concept requiring coordinated functions depending on the location of each element. The viscoelastic reservoir element affects hysteresis associated with longitudinal compliance of the tunable check valve assembly because it viscoelasticly accommodates longitudinal deformation of the valve body toward a concave shape. Hysteresis in the viscoelastic groove element (related, e.g., to its valve seal and vibration damping functions) and the valve body itself further reduces closing energy impulse amplitude through dissipation of portions of closing impulse energy as heat.

Elastic longitudinal compliance of a tunable check valve assembly results in part from elastic properties of the materials comprising the tunable check valve assembly. Such elastic properties may be achieved through use of composites comprising reinforcement materials as, for example, in an elastic valve body comprising steel, carbon fiber reinforced polymer, carbon nanotube/graphene reinforced polymer, and/or carbon nanotube/graphene reinforced metal matrix. The polymer may comprise a polyaryletherketone (PAEK), for example, polyetheretherketone (PEEK). See, e.g., U.S. Pat. No. 7,847,057 B2, incorporated by reference.

Note that the description herein of valve body flexure as concave-shaped refers to a view from the proximal or high-pressure side of the valve body. Such flexure is substantially elastic and may be associated with slight circular rotation (i.e., a circular rolling contact) of the valve body's valve seat interface with the valve seat itself. When the degree of rolling contact is sufficient to justify conversion of the valve seat interface from a conventional frusto-conical shape to a convex curved shape (which may include, e.g., circular, elliptic and/or parabolic portions), a curved concave tunable valve seat mating surface may be used. In such cases, the valve seat interface has correspondingly greater curvature than the concave tunable valve seat mating surface (see Detailed Description herein). Such rolling contact, when present, augments elastic formation of the concave valve body flexure on the pump pressure stroke, reversing the process on the suction stroke.

The circular rolling contact described herein may be visualized by considering the behavior of the convex valve seat interface as the valve body experiences concave flexure (i.e., the transformation from a relatively flat shape to a concave shape). During such flexure the periphery of the valve seat interface rotates slightly inwardly and translates slightly proximally (relative to the valve body's center of gravity) to become the proximal rim of the concave-shaped flexure.

While substantially elastic, each such valve body flexure is associated with energy loss from the closing energy impulse due to hysteresis in the valve body. Frictional heat loss (and any wear secondary to friction) associated with any circular rolling contact of the convex valve seat interface with the concave tunable valve seat mating surface is intentionally relatively low. Thus, the rolling action, when present, minimizes wear that might otherwise be associated with substantially sliding contact of these surfaces. Further, when rolling contact between valve body and tunable valve seat is present during both longitudinal valve body flexure and the elastic rebound which follows, trapping of particulate matter from the pumped fluid between the rolling surfaces tends to be minimized.

Since rolling contact takes place over a finite time interval, it also assists in smoothly redirecting pumped fluid momentum laterally and proximally. Forces due to oppositely directed radial components of the resultant fluid flow tend to cancel, and energy lost in pumped fluid turbulence is subtracted (as heat) from that of the valve-closure energy impulse, thus decreasing both its amplitude and the amplitude of associated vibration.

In addition to the above described energy dissipation (associated with hysteresis secondary to valve body flexure), hysteresis loss will also occur during pressure-induced movements of the viscoelastic groove element (in association with the valve seal function). Note that pumped fluid pressure acting on a valve comprising an embodiment of the invention's tunable check valve assembly may hydraulically pressurize substantially all of the viscoelastic elements in a tunable check valve assembly. Although polymers suitable for use in the viscoelastic elements generally are relatively stiff at room ambient pressures and temperatures, the higher pressures and temperatures experienced during pump pressure strokes tend to cause even relatively stiff polymers to behave like fluids which can transmit pressure hydraulically. Thus, a viscoelastic element in a peripheral seal-retention groove is periodically hydraulically pressurized, thereby increasing its sealing function during the high-pressure portion of the pump cycle. Hydraulic pressurization of the same viscoelastic element is reduced during the low-pressure portion of the pump cycle when the sealing function is not needed.

Because of the above-described energy loss and the time required for valve body longitudinal deformation to take place, with the associated dissipation of closing impulse energy described above, a valve-closure energy impulse applied to a tunable check valve assembly or tunable radial array is relatively lower in amplitude and longer in duration (e.g., secondary to having a longer rise time) than an analogous valve-closure energy impulse applied to a conventionally stiff valve body which closes on a conventional frusto-conical valve seat. The combination of lower amplitude and increased duration of the valve-closure energy impulse results in a narrowed characteristic vibration bandwidth having reduced potential for induction of damaging resonances in the valve, valve seat, and adjacent portions of the pump housing. See, e.g., the above-cited '242 patent.

Note that in describing the fluid-like behavior of certain polymers herein under elevated heat and pressure, the term "polymer" includes relatively homogeneous materials (e.g., a single-species fluid polymer) as well as composites and combination materials containing one or more of such relatively homogenous materials plus finely divided particulate matter (e.g., nanoparticles) and/or other dispersed species (e.g., species in colloidal suspension, graphene) to improve heat scavenging and/or other properties. See, e.g., U.S. Pat. No. 6,432,320 B1, incorporated by reference.

In addition to heat scavenging, damping is a function of the viscoelastic elements in various embodiments of the invention. Optimal damping is associated with relatively high storage modulus and loss tangent values, and is obtained over various temperature ranges in multicomponent systems described as having macroscopically phase-separated morphology, microheterogeneous morphology, and/or at least one interpenetrating polymer network. See, e.g., the above-cited '006 patent and U.S. Pat. Nos. 5,091,455; 5,238,744; 6,331,578 B1; and 7,429,220 B2, all incorporated by reference.

Summarizing salient points of the above description, recall that vibration attenuation and damping in a tunable check valve assembly, tunable valve seat, tunable plunger seal, or tunable radial array of the invention operate via four interacting mechanisms. First, impulse amplitude is reduced by converting a portion of total closing impulse energy to heat (e.g., via hysteresis and fluid turbulence), which is then ultimately rejected to the check valve body surroundings (e.g., the pumped fluid). Each such reduction of impulse amplitude means lower amplitudes in the characteristic vibration spectrum transmitted to the pump housing.

Second, the closing energy impulse as sensed at the valve seat is reshaped in part by lengthening the rebound cycle time (estimated as the total time associated with peripheral valve seal compression, concave valve body flexure and elastic rebound). Such reshaping may in general be accomplished using mechanical/hydraulic/pneumatic analogs of electronic wave-shaping techniques. In particular, lengthened rebound cycle time is substantially influenced by the valve body's increased longitudinal compliance associated with the rolling contact/seal and concave valve body flexure described herein between valve body and valve seat. The units of lengthened cycle times are seconds, so their inverse functions have dimensions of per second (or 1/sec), the same dimensions as frequency. Thus, as noted above, the inverse function is termed herein characteristic rebound frequency.

Lowered characteristic rebound frequency (i.e., increased rebound cycle time) corresponds to slower rebound, with a corresponding reduction of the impulse's characteristic bandwidth due to loss of higher frequency content. This condition is created during impulse hammer testing by adding to hammer head inertia and by use of softer impact tips (e.g., plastic tips instead of the metal tips used when higher frequency excitation is desired). In contrast, tunable check valve assemblies and tunable radial arrays achieve bandwidth narrowing (and thus reduction of the damage potential of induced higher-frequency vibrations) at least in part through increased longitudinal compliance. In other words, bandwidth narrowing is achieved in embodiments of the invention through an increase of the effective impulse duration (as by, e.g., slowing the impulse's rise time and/or fall time as the valve assembly's components flex and relax over a finite time interval).

Third, induced vibration resonances of the tunable check valve assembly, tunable valve seat, and/or other tunable components are effectively damped by interactions generating structural hysteresis loss. Associated fluid turbulence further assists in dissipating heat energy via the pumped fluid.

And fourth, the potential for excitation of damaging resonances in pump vibration induced by a closing energy impulse is further reduced through narrowing of the impulse's characteristic vibration bandwidth by increasing the check valve body's effective inertia without increasing its actual mass. Such an increase of effective inertia is possible because a portion of pumped fluid moves with the valve body as it flexes and/or longitudinally compresses. The mass of this portion of pumped fluid is effectively added to the valve body's mass during the period of flexure/rebound, thereby increasing the valve body's effective inertia to create a low-pass filter effect (i.e., tending to block higher frequencies in the manner of an engine mount).

To increase understanding of the invention, certain aspects of tunable components (e.g., alternate embodiments and multiple functions of structural features) are considered in greater detail. Alternate embodiments are available, for example, in guide means known to those skilled in the art for maintaining valve body alignment within a (suction or discharge) bore. Guide means thus include, e.g., a central guide stem and/or a full-open or wing-guided design (i.e., having a distal crowfoot guide).

Similarly, alteration of a viscoelastic element's vibration pattern(s) in a tunable fluid end is addressed (i.e., tuned) via adjustable and/or time-varying constraints. Magnitude and timing of the constraints are determined in part by closing-impulse-related distortions and/or the associated vibration. For example, a viscoelastic reservoir (or central) element is at least partially constrained as it is disposed in the central annular reservoir, an unconstrained area optionally being open to pumped fluid pressure. That is, the viscoelastic reservoir element is at least partially constrained by relative movement of the interior surface(s) of the (optionally annular) reservoir, and further constrained by one or more structures (e.g., flanges) coupled to such surface(s). Analogously, a viscoelastic groove (or peripheral) element is at least partially constrained by relative movement of the groove walls, and further constrained by shear-thickening material within one or more circular tubular areas of the element (any of which may comprise a plurality of lumens).

Since the magnitude and timing of closing-impulse-related distortions are directly related to each closing energy impulse, the tunable fluid end's overall response is adaptive to changing pump operating pressures and speeds on a stroke-by-stroke basis. So for each set of operating parameters (e.g. cycle time and peak pressure for each pressure/suction stroke cycle), one or more of the constrained viscoelastic elements has at least a first predetermined assembly resonant frequency substantially similar to an instantaneous pump resonant frequency (e.g., a resonant frequency measured or estimated proximate the suction valve seat deck). And for optimal damping, one or more of the constrained viscoelastic elements may have, for example, at least a second predetermined assembly resonant frequency similar to the first predetermined assembly resonant frequency.

Note that the adaptive behavior of viscoelastic elements is beneficially designed to complement both the time-varying behavior of valves generating vibration with each pump pressure stroke, and the time-varying response of the fluid end as a whole to that vibration.

Note also that a tunable check valve assembly and/or tunable valve seat analogous to those designed for use in a tunable suction check valve may be incorporated in a tunable discharge check valve as well. Either a tunable suction check valve or a tunable discharge check valve or both may be installed in a pump fluid end housing. Additionally, one or more other tunable components may be combined with tunable suction and/or discharge check valves. A pump housing resonant frequency may be chosen as substantially equal to a first predetermined resonant frequency of each of the tunable components installed, or of any combination of the installed tunable components. Or the predetermined component resonant frequencies may be tuned to approximate different pump housing resonant frequencies as determined for optimal vibration damping.

For increased flexibility in accomplishing the above tuning, fenestrations may be present in the groove wall to accommodate radial tension members. At least a portion of each fenestration may have a transverse area which increases with decreasing radial distance to said longitudinal axis. That is, each fenestration flares to greater transverse areas in portions closer to the longitudinal axis, relative to the transverse areas of portions of the fenestration which are more distant from the longitudinal axis. Thus, a flared fenestration is partly analogous to a conventionally flared tube, with possible differences arising from the facts that (1) fenestrations are not limited to circular cross-sections, and (2) the degree of flare may differ in different portions of a fenestration. Such flares assist in stabilizing a viscoelastic groove element via a plurality of radial tension members.

Note that in addition to the example alternate embodiments described herein, still other alternative invention embodiments exist, including valves, pump housings and pumps comprising one or more of the example embodiments or equivalents thereof. Additionally, use of a variety of fabrication techniques known to those skilled in the art may lead to embodiments differing in detail from those schematically illustrated herein. For example, internal valve body spaces may be formed during fabrication by welding (e.g., inertial welding or laser welding) valve body portions together as in the above-cited '837 patent, or by separately machining such spaces with separate coverings. Valve body fabrication may also be by rapid-prototyping (i.e., layer-wise) techniques. See, e.g., the above-cited '057 patent. Viscoelastic elements may be cast and cured separately or in place in a valve body as described herein. See, e.g., U.S. Pat. No. 7,513,483 B1, incorporated by reference.

DETAILED DESCRIPTION

Tunable equipment associated with high-pressure well-stimulation comprises a first family of tunable down-hole stimulators (plus associated controllers, power supplies, etc.), a second family of (frac) pumps optionally comprising tunable fluid ends (which include but are not limited to, e.g., tunable valve assemblies and/or vibration dampers), and a third family of closed-loop tunable down-hole stimulation systems. An example tunable down-hole stimulation system comprises at least one frac pump, at least one tunable down-hole stimulator, and at least one tunable down-hole stimulation system programmable controller. The controller has control links to at least one frac pump and at least one tunable down-hole stimulator. Note that each frac pump in a tunable down-hole stimulation system may optionally comprise one or more components of a tunable fluid end.

The above three equipment families have strikingly different operational characteristics. In the first family, tunable down-hole stimulators operate within the wellbore, generating and transmitting vibration tailored to enhance stimulation of geologic materials for higher hydrocarbon yields. In contrast, fluid ends of the second family may have one or more installed tunable components which facilitate selective attenuation of valve-generated vibration at or near its source to reduce fluid end fatigue failures. The third family of closed-loop tunable down-hole stimulation systems includes system controllers plus elaborations of the first family's tunable hydraulic stimulators, with optional inclusion of the second family's tunable fluid ends. Structures related to the first and second families are shown in FIGS. 1-16, while FIG. 17 schematically illustrates various structures and functions of third-family systems.

FIGS. 1-14 relate generally to the above second tunable equipment family. They schematically illustrate how adding tunable valve seats, tunable radial arrays and/or plunger seals to tunable check valve assemblies in a fluid end further facilitates optimal damping and/or selective attenuation of vibration at one or more predetermined (and frequently-localized)

fluid end resonant frequencies. Optimized vibration attenuation (via, e.g., optimized fluid end damping) is provided by altering resonant frequencies in each tunable component in relation to one or more (measured or estimated) fluid end resonant frequencies and/or tunable component resonant frequencies.

Figure 7:
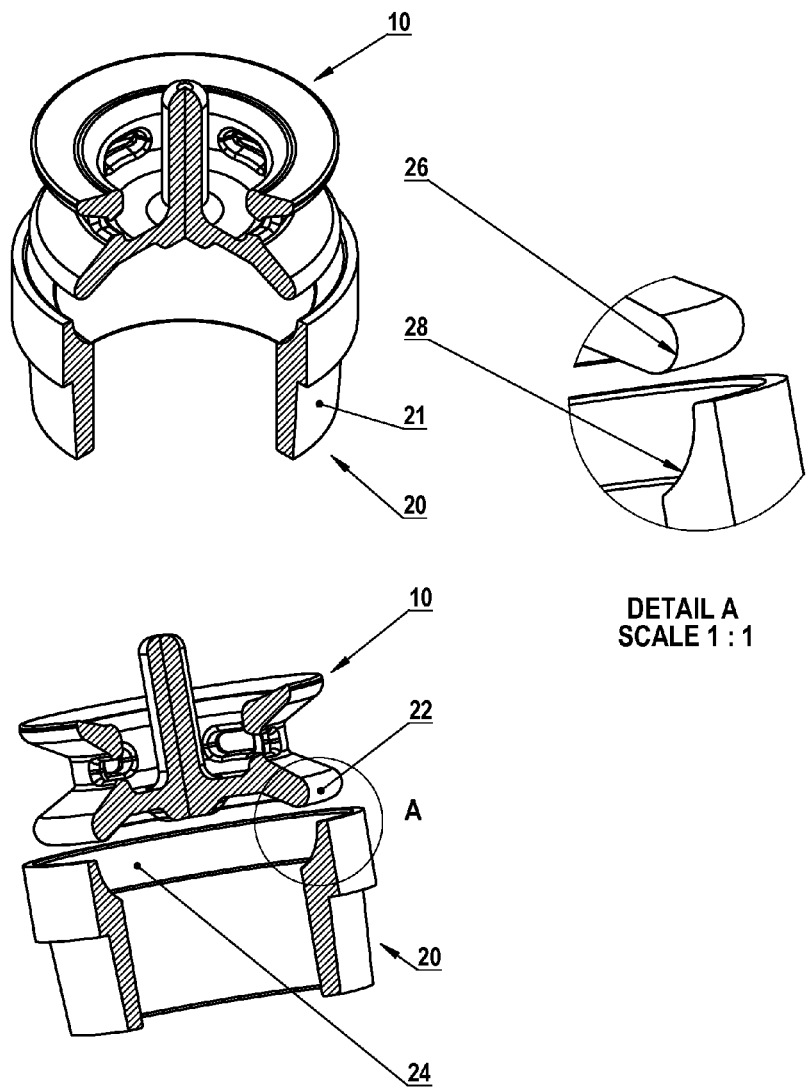
FIG. 7 is a schematic illustration of two views of an exploded partially-sectioned 3-dimensional view of a valve body and tunable valve seat embodiment. Curved longitudinal section edges of the valve body's convex valve seat interface and corresponding concave mating portions of the tunable valve seat are shown schematically in a detail breakout view to aid description herein of a rolling valve seal along a circular line. A tunable (suction or discharge) check valve embodiment of the invention may comprise a combination of a tunable check valve assembly/tunable radial array (see, e.g., FIGS. 1 and 2) and a tunable valve seat (see, e.g., FIGS. 7 and 8).
Figure 11:
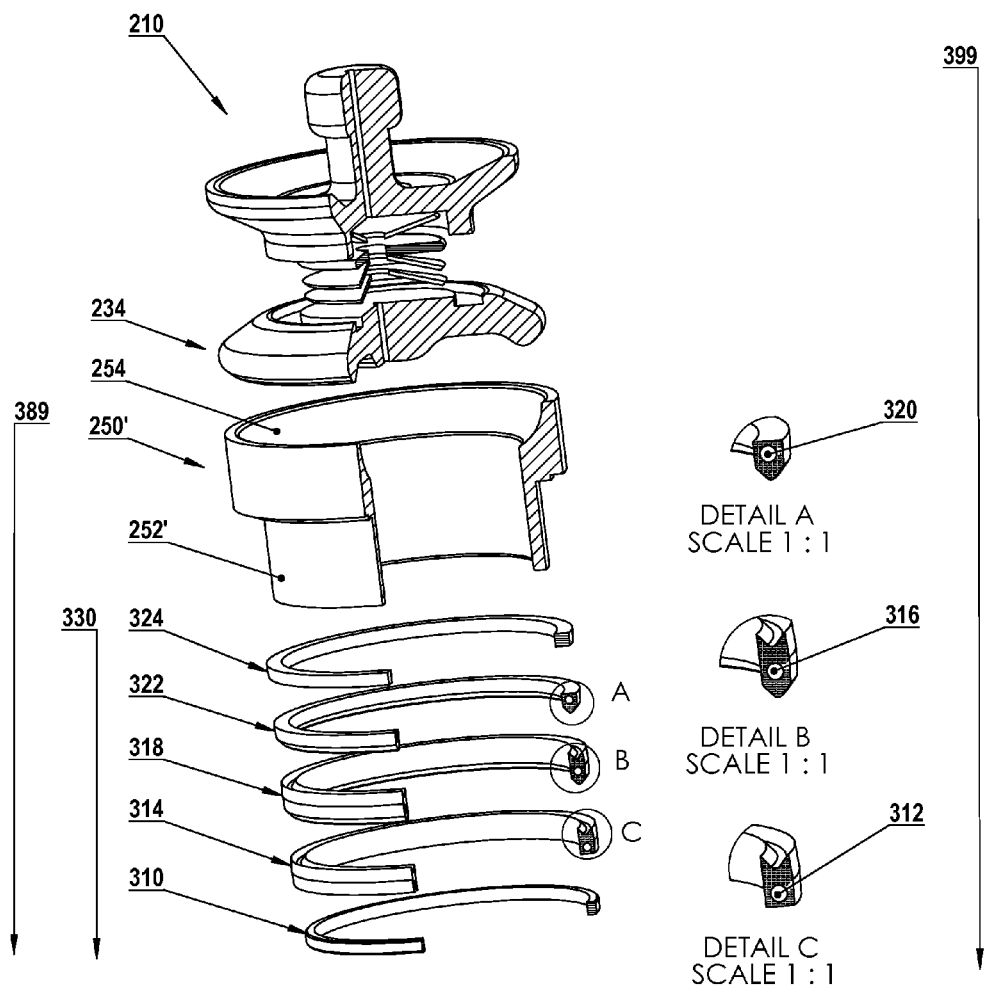
FIG. 11 is a schematic 3-dimensional exploded view of an alternate tunable check valve embodiment comprising the tunable check valve assembly of FIG. 9 together with a tunable valve seat, the tunable check valve embodiment including structures to facilitate a rolling seal along a circular line between the check valve body's peripheral valve seat interface and the tunable valve seat's mating surface. An adjustable lateral support assembly is shown with the tunable valve seat, the assembly comprising first and second securable end spacers in combination with a plurality of circular viscoelastic support elements, each support element shown in a detail breakout view as comprising a support circular tubular area.

A tunable (suction or discharge) check valve of the invention may comprise, for example, a combination of a tunable check valve assembly/tunable radial array 99 (see, e.g., FIG. 1) and a tunable valve seat 20 or a tunable valve seat 389 (see, e.g., FIGS. 7 and 11). Details of the structure and functions of each component are provided herein both separately and as combined with other components to obtain synergistic benefits contributing to longer pump service life.

Figure 1:
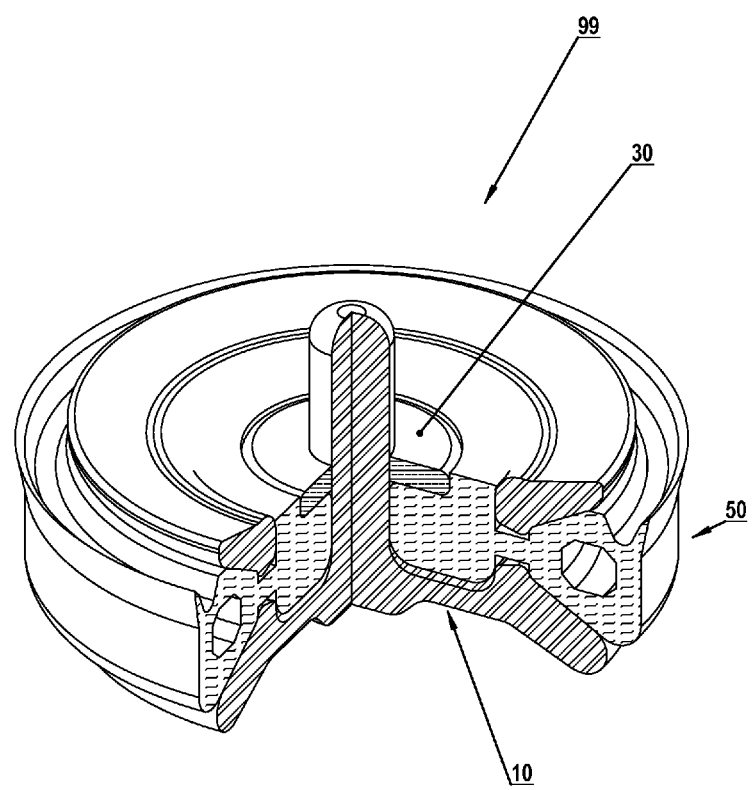
FIG. 1 is a schematic 3-dimensional view of a partially sectioned tunable check valve assembly/tunable radial array embodiment showing how an adjustable preload flange constrains an area of the viscoelastic reservoir element as described herein.
Figure 2:
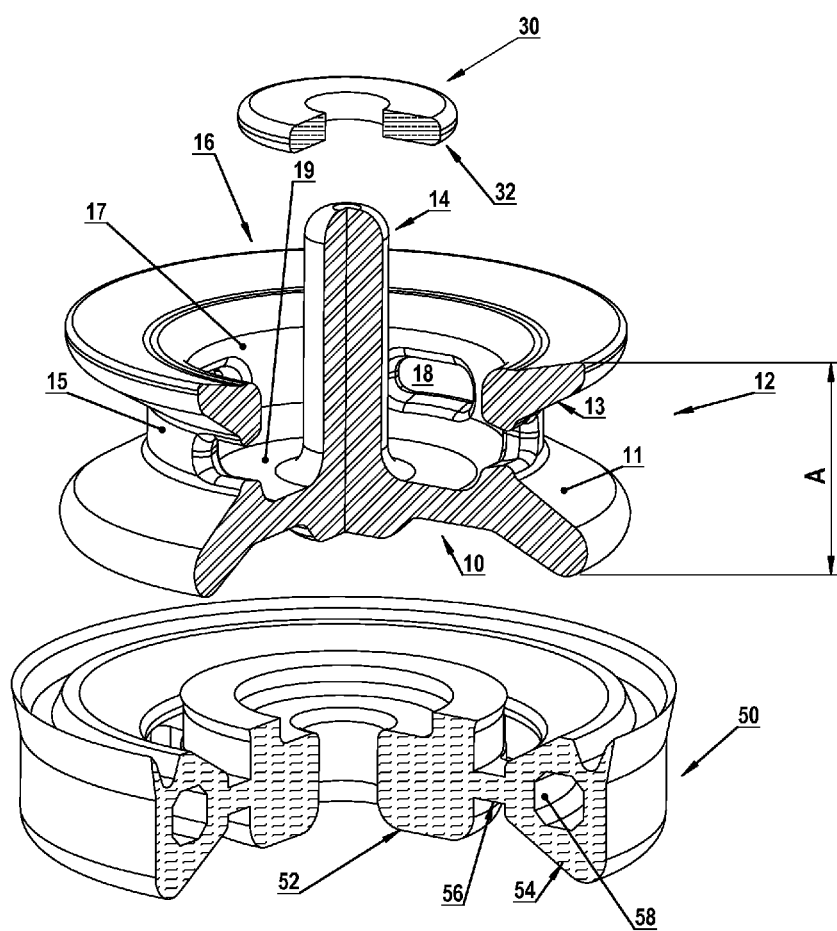
FIG. 2 includes a schematic 3-dimensional exploded view of the tunable check valve assembly/tunable radial array embodiment of FIG. 1 showing viscoelastic body elements, the valve body, and the adjustable preload flange.

FIGS. 1 and 2 schematically illustrate an invention embodiment of a tunable check valve assembly/tunable radial array 99 substantially symmetrical about a longitudinal axis. Illustrated components include a valve body 10, an adjustable preload flange 30, and a plurality of viscoelastic body elements 50. Check valve body 10, in turn, comprises a peripheral groove 12 (see FIG. 2) spaced apart by an annular (central) reservoir 16 from a longitudinal guide stem 14, groove 12 being responsive to longitudinal compressive force. A plurality of viscoelastic body elements 50 comprises an annular (central) reservoir element 52 coupled to a (peripheral) groove element 54 by a plurality of (optional) radial fenestration elements 56 (in fenestrations 18) to form a tunable radial array. Groove element 54 functions as a vibration damper and valve seal, comprising at least one circular tubular area 58.

Responsiveness of groove 12 to longitudinal compressive force is characterized in part by damping of groove wall 11/13/15 vibrations. Such damping is due in part to out-of-phase vibrations in proximal groove wall 13 and distal groove wall 11 which are induced by longitudinal compressive force. Such out-of-phase vibrations will cause various groove-related dimensions to vary with longitudinal compressive force, thereby indicating the responsiveness of groove 12 to such force (see, for example, the dimension labeled A in FIG. 2). Each phase shift, in turn, is associated with differences in the coupling of proximal groove wall 13 to guide stem 14 (indirectly via longitudinal groove wall 15 and radial reservoir floor 19) and the coupling of distal groove wall 11 to guide stem 14 (directly via radial reservoir floor 19). Note that longitudinal groove wall 15 may comprise fenestrations 18, thereby increasing the responsiveness of groove 12 to longitudinal compressive force on tunable check valve assembly 99.

Figure 3:
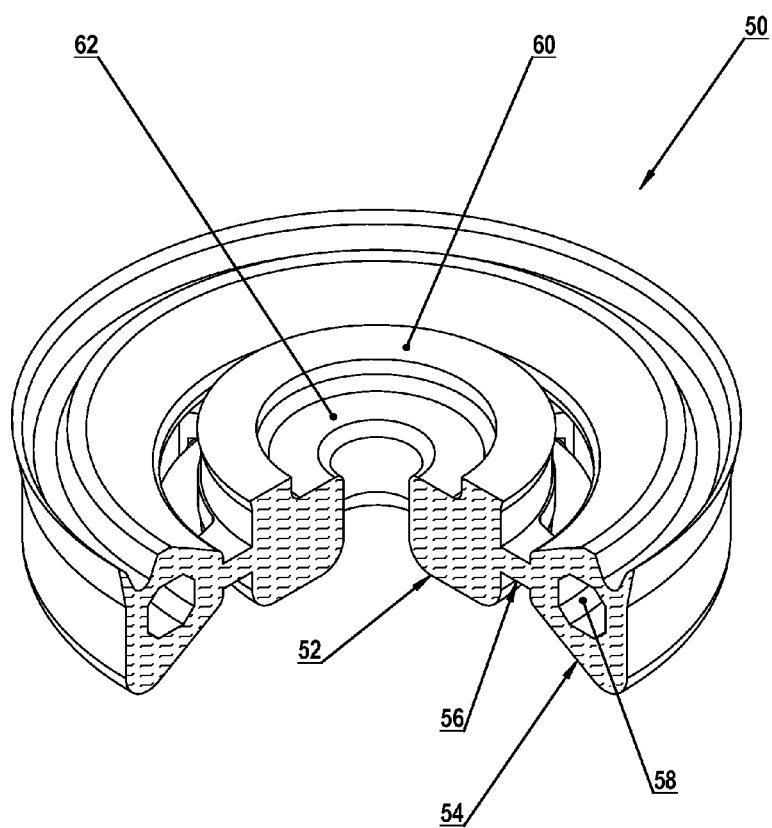
FIG. 3 is a schematic 3-dimensional partially-sectioned view of viscoelastic reservoir, groove and fenestration elements (i.e., viscoelastic body elements) of FIGS. 1 and 2 showing the constrained area of the reservoir element where it contacts an adjustable preload flange, as well as an adjacent unconstrained area.

Referring to FIGS. 1-3, adjustable preload flange 30 extends radially from guide stem 14 (toward peripheral reservoir wall 17) over, for example, about 20% to about 80% of viscoelastic reservoir element 52 (see FIG. 3). Adjustable preload flange 30 thus imposes an adjustable annular shear preload over an annular constrained area 62 of viscoelastic reservoir element 52 to achieve at least a first predetermined assembly resonant frequency substantially replicating a (similar) measured or estimated resonant frequency (e.g., a pump housing resonant frequency). Note that an adjacent annular unconstrained area 60 of viscoelastic reservoir element 52 remains open to pumped fluid pressure. Note also that adjustable preload flange 30 may be adjusted in effective radial extent and/or longitudinal position.

Note further that annular constrained area 62 and annular unconstrained area 60 are substantially concentric and adjacent. Thus, for a tunable suction valve subject to longitudinal (i.e., distally-directed) compressive constraint applied via preload flange 30 to annular constrained area 62, annular unconstrained area 60 will tend to move (i.e., extrude) proximally relative to area 62. The oppositely-directed (i.e., countercurrent) movements of constrained and unconstrained annular areas of viscoelastic reservoir element 52 create a substantially annular area of shear stress.

Figure 5:
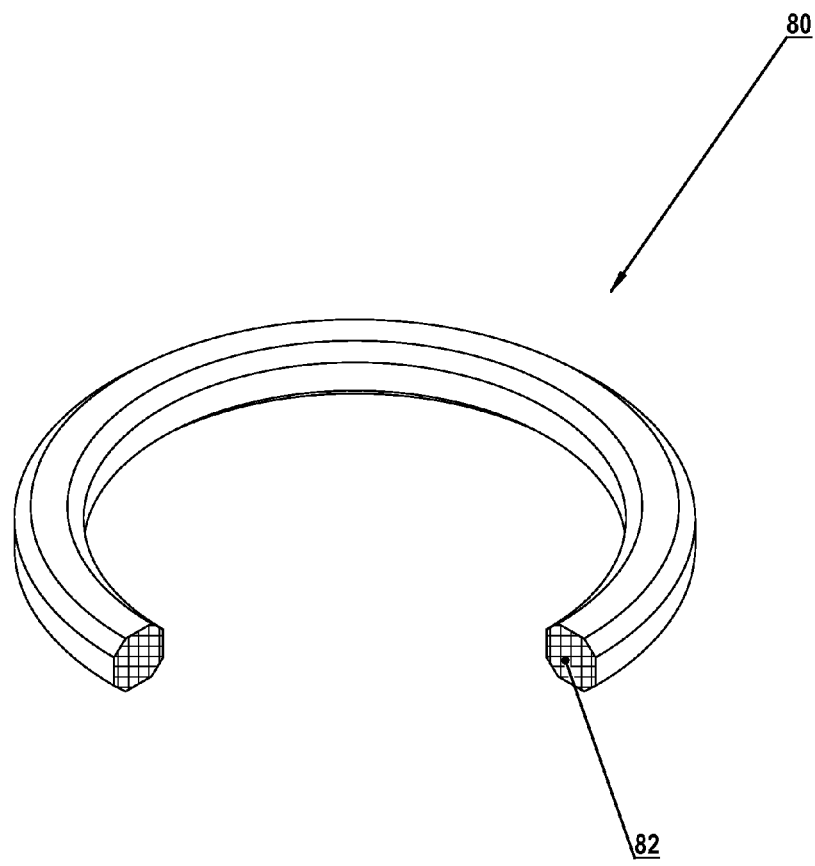
FIG. 5 is a schematic 3-dimensional instantaneous partially-sectioned view of shear-thickening material which would, e.g., substantially fill a circular tubular area in a viscoelastic groove element, a support circular tubular area of a tunable valve seat, a tunable plunger seal, or a tunable resilient circumferential seal.

Finally, each circular tubular area 58 is substantially filled with at least one shear-thickening material 80 (see FIG. 5) chosen to achieve at least a second predetermined assembly resonant frequency similar, for example, to the first predetermined assembly resonant frequency). Note that FIG. 5 schematically represents a partially-sectioned view of an instantaneous configuration of the shear-thickening material 80 within circular tubular area 58.

Referring to FIGS. 1 and 2 in greater detail, a tunable check valve assembly/tunable radial array embodiment 99 comprises viscoelastic body elements 50 which comprise, in turn, reservoir (central) element 52 coupled to groove (peripheral) element 54 via radial fenestration (tension) elements 56. Elements 52, 54 and 56 are disposed in (i.e., integrated with and/or lie substantially in) reservoir 16, groove 12 and fenestrations 18 respectively to provide a tuned radial array having at least a third predetermined resonant frequency. An adjustable preload flange 30 is coupled to guide stem 14 and contacts viscoelastic reservoir element 52 in reservoir 16 to impose an adjustable annular constraint on viscoelastic reservoir element 52 for achieving at least a first predetermined assembly resonant frequency substantially similar to, for example, a measured resonant frequency (e.g., a pump housing resonant frequency). Such adjustable annular constraint imposes an adjustable shear preload between constrained annular area 62 and unconstrained annular area 60. Tunable check valve assembly 99 may additionally comprise at least one circular tubular area 58 in groove element 54 residing in groove 12, each tubular area 58 being substantially filled with at least one shear-thickening material 80 chosen to achieve at least a second predetermined assembly resonant frequency similar, for example, to the first predetermined assembly resonant frequency).

The above embodiment may be installed in a pump housing having a measured housing resonant frequency; the measured housing resonant frequency may then be substantially replicated in the (similar) first predetermined resonant frequency of the tunable check valve assembly. Such a combination would be an application of an alternate embodiment. An analogous tuning procedure may be followed if the tunable check valve assembly of the second embodiment is installed in a pump having a (similar or different) resonant frequency substantially equal to the second predetermined resonant frequency. This synergistic combination would broaden the scope of the valve assembly's beneficial effects, being yet another application of the invention's alternate embodiment.

Note that preload flange 30 may have a non-cylindrical periphery 32 for imposing on viscoelastic reservoir element 52 an adjustable annular shear preload having both longitudinal and transverse components.

Figure 4:
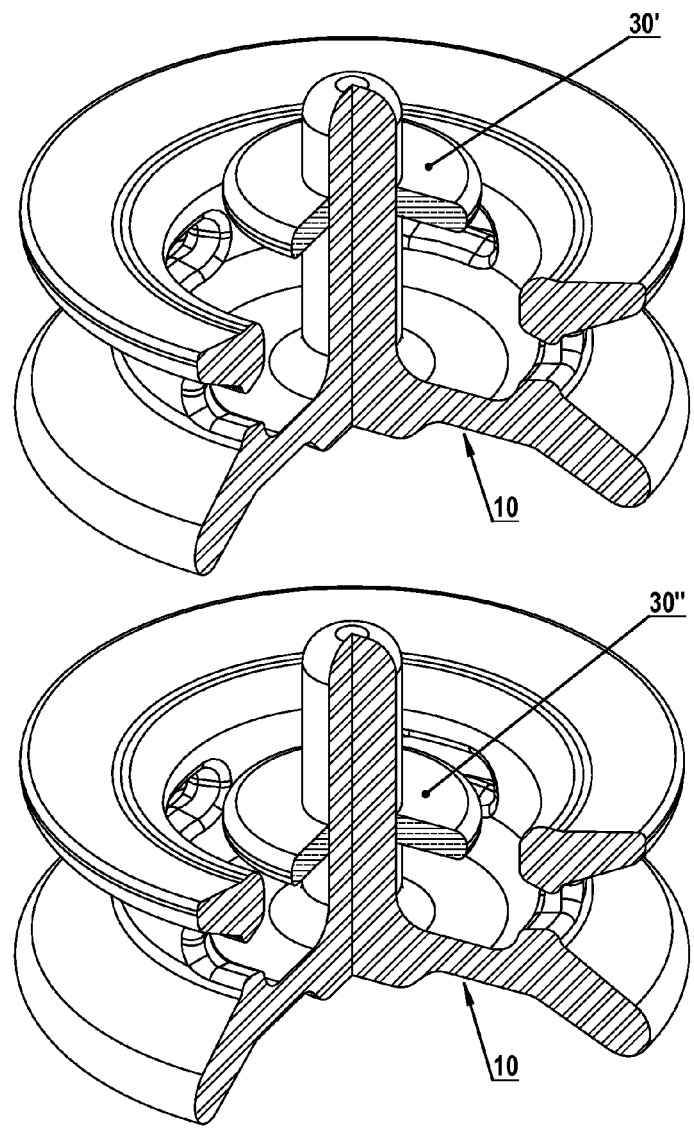
FIG. 4 is a schematic 3-dimensional partially-sectioned view of two check valve bodies with an adjustable preload flange located at different longitudinal positions on a central guide stem.

Note further that the periphery of adjustable preload flange 30, if cylindrical, predisposes a tunable check valve assembly to substantially longitudinal shear damping with each longitudinal distortion of check valve body 10 associated with valve closure. The character of such shear damping depends, in part, on the longitudinal position of the preload flange. Examples of different longitudinal positions are seen in FIG. 4, which schematically illustrates the flange 30' longitudinally displaced from flange 30". Further, as shown in FIG. 4, the convex periphery of a longitudinally adjusted preload flange 30' or 30" may introduce shear damping of variable magnitude and having both longitudinal and transverse components. Such damping may be beneficial in cases where significant transverse valve-generated vibration occurs.

To clarify the placement of viscoelastic body elements 50, labels indicating the portions are placed on a sectional view in FIGS. 2 and 3. Actual placement of viscoelastic body elements 50 in valve body 10 (see FIG. 1) may be by, for example, casting viscoelastic body elements 50 in place, or placing viscoelastic body elements 50 (which have been pre-cast) in place during layer-built or welded fabrication. The tunable check valve assembly embodiment of the invention is intended to represent check valve body 10 and viscoelastic body elements 50 as complementary components at any stage of manufacture leading to functional integration of the two components.

To enhance scavenging of heat due to friction loss and/or hysteresis loss, shear-thickening material 80 and/or viscoelastic body elements 50 may comprise one or more polymers which have been augmented with nanoparticles and/or graphene 82 (see, e.g., FIG. 5). Nanoparticles and/or graphene may be invisible to the eye as they are typically dispersed in a colloidal suspension. Hence, they are schematically represented by cross-hatching 82 in FIG. 5. Nanoparticles may comprise, for example, carbon forms (e.g., graphene) and/or metallic materials such as copper, beryllium, titanium, nickel, iron, alloys or blends thereof. The term nanoparticle may conveniently be defined as including particles having an average size of up to about 2000 nm. See, e.g., the '320 patent.

Figure 6:
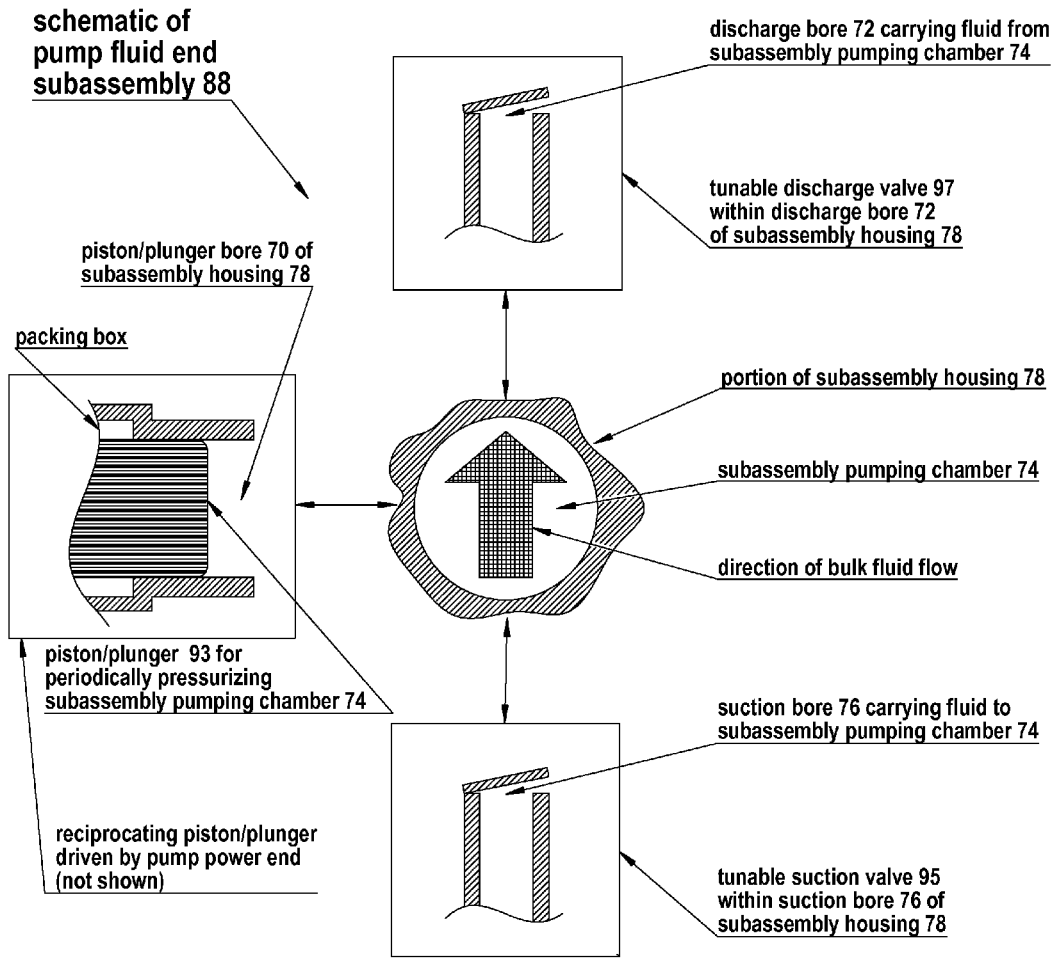
FIG. 6 is a schematic illustration of an exploded partially-sectioned 2-dimensional view of major components of a pump fluid end subassembly, together with brief explanatory comments on component functions. The schematically-illustrated subassembly comprises a pumping chamber within a subassembly pump housing, the pumping chamber being in fluid communication with a suction bore, a discharge bore, and a piston/plunger bore. Schematic representations of a suction check valve, a discharge check valve, and a piston/plunger are shown in their respective bores, together with brief annotations and graphical aids outlining the structural relationships.

FIG. 6 is a schematic illustration of an exploded partially-sectioned 2-dimensional view of major components of a pump fluid end subassembly 88, together with graphical aids and brief explanatory comments on component functions. The schematically-illustrated subassembly 88 comprises a pumping chamber 74 within a subassembly (pump) housing 78, the pumping chamber 74 being in fluid communication with a suction bore 76, a discharge bore 72, and a piston/plunger bore 70. Note that piston/plunger bore 70 comprises at least one recess (analogous to that labeled "packing box" in FIG. 6) in which at least one lateral support assembly 130 (see FIG. 8) may be sealingly positionable along the plunger as part of a tunable plunger seal embodiment. Schematic representations of a tunable suction valve 95 (illustrated for simplicity as a hinged check valve), a tunable discharge valve 97 (also illustrated for simplicity as a hinged check valve), and a piston/plunger 93 (illustrated for simplicity as a plunger) are shown in their respective bores. Note that longitudinally-moving valve bodies in check valve embodiments schematically illustrated herein (e.g., valve body 10) are associated with certain operational phenomena analogous to phenomena seen in hinged check valves (including, e.g., structural compliance secondary to closing energy impulses).

Regarding the graphical aids of FIG. 6, the double-ended arrows that signify fluid communication between the bores (suction, discharge and piston/plunger) and the pumping chamber are double-ended to represent the fluid flow reversals that occur in each bore during each transition between pressure stroke and suction stroke of the piston/plunger. The large single-ended arrow within the pumping chamber is intended to represent the periodic and relatively large, substantially unidirectional fluid flow from suction bore through discharge bore during pump operation.

Further regarding the graphical aids of FIG. 6, tunable suction (check) valve 95 and tunable discharge (check) valve 97 are shown schematically as hinged check valves in FIG. 6 because of the relative complexity of check valve embodiments having longitudinally-moving valve bodies. More detailed schematics of several check valve assemblies and elements are shown in FIGS. 1-11, certain tunable check valve embodiments comprising a tunable check valve assembly and a tunable valve seat. In general, the tunable check valve assemblies/tunable radial arrays of tunable suction and discharge valves will typically be tuned to different assembly resonant frequencies because of their different positions in a subassembly housing 78 (and thus in a pump housing as described herein). Pump housing resonant frequencies that are measured proximate the tunable suction and discharge valves will differ in general, depending on the overall pump housing design. In each case they serve to guide the choices of the respective assembly resonant frequencies for the valves.

Note that the combination of major components labeled in FIG. 6 as a pump fluid end subassembly 88 is so labeled (i.e., is labeled as a subassembly) because typical fluid end configurations comprise a plurality of such subassemblies combined in a single machined block. Thus, in such typical (multi-subassembly) pump fluid end designs, as well as in less-common single-subassembly pump fluid end configurations, the housing is simply termed a "pump housing" rather than the "subassembly housing 78" terminology of FIG. 6.

Further as schematically-illustrated and described herein for clarity, each pump fluid end subassembly 88 comprises only major components: a pumping chamber 74, with its associated tunable suction valve 95, tunable discharge valve 97, and piston/plunger 93 in their respective bores 76, 72 and 70 of subassembly housing 78. For greater clarity of description, common fluid end features well-known to those skilled in the art (such as access bores, plugs, seals, and miscellaneous fixtures) are not shown. Similarly, a common suction manifold through which incoming pumped fluid is distributed to each suction bore 76, and a common discharge manifold for collecting and combining discharged pumped fluid from each discharge bore 72, are also well-known to those skilled in the art and thus are not shown.

Note that the desired check-valve function of tunable check valves 95 and 97 schematically-illustrated in FIG. 6 requires interaction of the respective tunable check valve assemblies (see, e.g., FIGS. 1-5) with a corresponding (schematically-illustrated) tunable valve seat (see, e.g., FIGS. 7, 8, 10 and 11). The schematic illustrations of FIG. 6 are only intended to convey general ideas of relationships and functions of the major components of a pump fluid end subassembly. Structural details of the tunable check valve assemblies that are in turn part of tunable check valves 95 and 97 of the invention (including their respective tunable valve seats) are illustrated in greater detail in other figures as noted above. Such structural details facilitate a plurality of complementary functions that are best understood through reference to FIGS. 1-5 and 7-11.

The above complementary functions of tunable check valves include, but are not limited to, closing energy conversion to heat via structural compliance, energy redistribution through rejection of heat to the pumped fluid and pump housing, vibration damping and/or selective vibration spectrum narrowing through changes in tunable check valve assembly compliance, vibration frequency down-shifting (via decrease in characteristic rebound frequency) through increase of rebound cycle time, and selective vibration attenuation through energy dissipation (i.e., via redistribution) at predetermined assembly resonant frequencies.

FIG. 7 is a schematic illustration of two views of an exploded partially-sectioned 3-dimensional view including a check valve body 10 and its convex valve seat interface 22, together with concave mating surface 24 of tunable valve seat 20. Mating surface 24 is longitudinally spaced apart from a pump housing interface surface 21. A curved longitudinal section edge 28 of the tunable valve seat's mating surface 24, together with a correspondingly greater curved longitudinal section edge 26 of the valve body's valve seat interface 22, are shown schematically in detail view A to aid description herein of a rolling valve seal.

The correspondingly greater curvature of valve seat interface 22, as compared to the curvature of mating surface 24, effectively provides a rolling seal against fluid leakage which reduces wear on the surfaces in contact. The rolling seal also increases longitudinal compliance of a tunable suction or discharge valve of the invention, with the added benefit of increasing the rise and fall times of the closing energy impulse (thus narrowing the associated vibration spectrum). Widening the closing energy impulse increases rebound cycle time and correspondingly decreases characteristic rebound frequency.

Further regarding the terms "correspondingly greater curvature" or "correspondingly less curvature" as used herein, note that the curvatures of the schematically illustrated longitudinal section edges (i.e., 26 and 28) and the surfaces of which they are a part (i.e., valve seat interface 22 and mating surface 24 respectively) are chosen so that the degree of longitudinal curvature of valve seat interface 22 (including edge 26) exceeds that of (i.e., has correspondingly greater curvature than) mating surface 24 (including edge 28) at any point of rolling contact. In other words, mating surface 24 (including edge 28) has correspondingly less curvature than valve seat interface 22 (including edge 26). Hence, rolling contact (i.e., a rolling valve seal) between valve seat interface 22 and mating surface 24 is along a substantially circular line (i.e., mating surface 24 is a curved mating surface for providing decreased contract area along the circular line). The plane of the circular line is generally transverse to the (substantially coaxial) longitudinal axes of valve body 10 and tunable valve seat 20. And the decreased contract area along the circular line is so described because it is small relative to the nominal contact area otherwise provided by conventional (frusto-conical) valve seat interfaces and valve seat mating surfaces.

Note that the nominal frusto-conical contact area mentioned above is customarily shown in engineering drawings as broad and smooth. But the actual contact area is subject to unpredictable variation in practice due to uneven distortions (e.g., wrinkling) of the respective closely-aligned frusto-conical surfaces under longitudinal forces that may exceed 250,000 pounds. An advantage of the rolling valve seal along a substantially circular line as described herein is minimization of the unpredictable effects of such uneven distortions of valve seat interfaces and their corresponding mating surfaces.

Note also that although valve seat interface 22 and mating surface 24 (and other valve seat interface/mating surface combinations described herein) are schematically illustrated as curved, either may be frusto-conical (at least in part) in certain tuned component embodiments. Such frusto-conical embodiments may have lower fabrication costs and may exhibit suboptimal distortion, down-shifting performance and/or wear characteristics. They may be employed in relatively lower-pressure applications where other tunable component characteristics provide sufficient operational advantages in vibration control.

Figure 8:
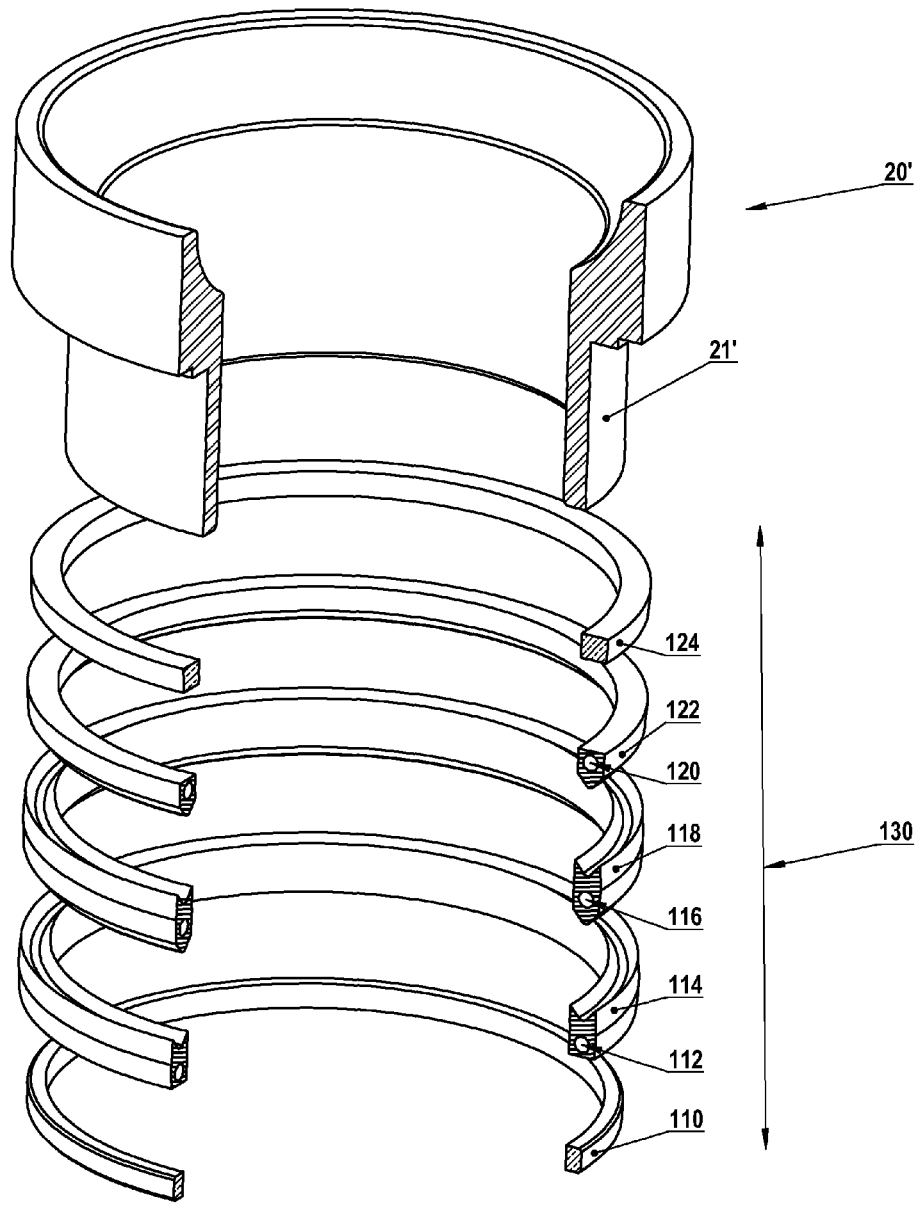
FIG. 8 is a schematic 3-dimensional exploded and partially-sectioned view of a tunable valve seat embodiment showing a concave mating surface longitudinally spaced apart from a lateral support mounting surface, and an adjustable lateral support assembly comprising first and second securable end spacers in combination with a plurality of circular viscoelastic support elements, each support element comprising a support circular tubular area.

The above discussion of rolling contact applies to the alternate tunable valve seat 20' of FIG. 8, as it does to the tunable valve seat 20 of FIG. 7. FIG. 8 schematically illustrates a 3-dimensional exploded and partially-sectioned view of a tunable valve seat showing a mating surface (analogous to mating surface 24 of FIG. 7) longitudinally spaced apart from a lateral support mounting surface 21'. But the lateral support mounting surface 21' in FIG. 8 differs from pump housing interface surface 21 of FIG. 7 in that it facilitates adjustably securing a lateral support assembly 130 to alternate tunable valve seat 20'. Lateral support assembly 130 comprises first and second securable end spacers (110 and 124 respectively) in combination with a plurality of circular viscoelastic support elements (114, 118 and 122), each support element comprising a support circular tubular area (see areas 112, 116 and 120 respectively). Shear-thickening material in each support circular tubular area 112, 116 and 120 is chosen so each lateral support assembly 130 has at least one predetermined resonant frequency. Lateral support assemblies thus configured may be part of each tunable valve seat and each tunable plunger seal. When part of a tunable plunger seal, one or more lateral support assemblies 130 reside in at least one recess analogous to the packing box schematically illustrated adjacent to piston/plunger 93 (i.e., as a portion of piston/plunger bore 70) in FIG. 6.

Note also that in general, a tunable (suction or discharge) check valve of the invention may comprise a combination of a tunable check valve assembly 99 (see, e.g., FIG. 1) and a tunable valve seat 20 (see, e.g., FIG. 7) or a tunable valve seat 20' (see, e.g., FIG. 8). Referring more specifically to FIG. 6, tunable suction check valve 95 is distinguished from tunable discharge check valve 97 by one or more factors, including each measured resonant frequency to which each tunable check valve is tuned so as to optimize the overall effectiveness of valve-generated vibration attenuation in the associated pump housing 78.

Figure 9:
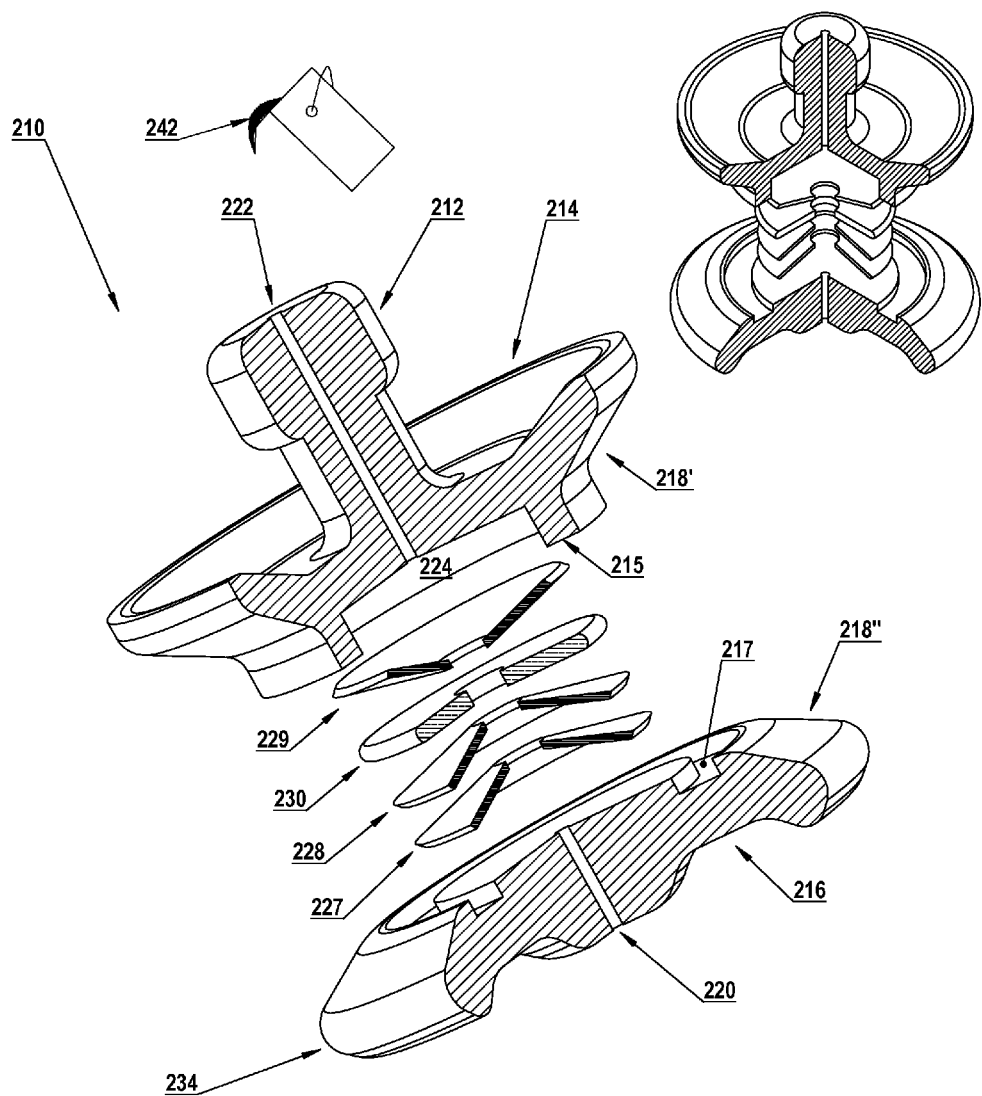
FIG. 9 is a schematic 3-dimensional exploded view of a partially sectioned tunable check valve assembly embodiment. A dilatant (i.e., shear-thickening) liquid is schematically shown being added to a check valve body's internal cavity, the cavity being shown as enclosing a tuned vibration damper comprising discrete mechanical elements (e.g., a mass and three springs).
Figure 10:
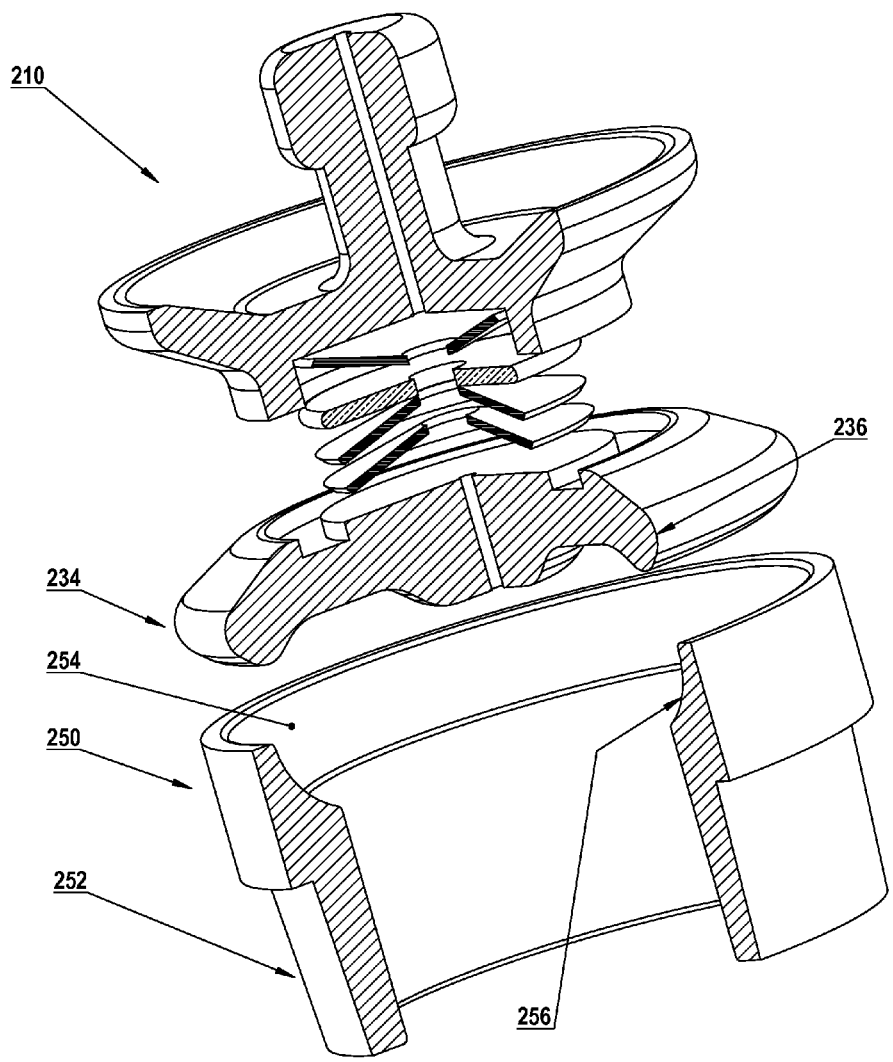
FIG. 10 is a schematic 3-dimensional exploded view of a tunable check valve embodiment comprising the tunable check valve assembly of FIG. 9 together with a tunable valve seat, the tunable check valve embodiment including structures to facilitate a rolling seal along a circular line between the valve body's valve seat interface and the tunable valve seat's mating surface. Note that the (convex) valve seat interface has correspondingly greater curvature than the (concave) mating surface, and the mating surface has correspondingly less curvature than the valve seat interface.

FIGS. 9-11 show schematic exploded views of a nonlinear spring-mass damper 227/228/229/230, which may be incorporated in a tunable check valve assembly embodiment 210. FIGS. 9-11 can each be understood as schematically illustrating a tunable check valve assembly with or without a peripheral groove viscoelastic element. That is, each figure may also be understood to additionally comprise a viscoelastic groove element analogous to groove element 54 (see FIG. 2) residing in groove 218'/218" (see FIG. 9)—this groove element is not shown in exploded FIGS. 9-11 for clarity, but may be considered to comprise at least one circular tubular area analogous to tubular area 58 in groove element 54 (see FIG. 2), each tubular area 58 being substantially filled with at least one shear-thickening material 80 chosen to achieve at least one predetermined assembly resonant frequency.

Referring to FIG. 9, Belleville springs 227/228/229 are nonlinear, and they couple mass 230 to the valve body base plate 216 and the proximal valve body portion 214. Additionally, dilatant liquid 242 is optionally added (via sealable ports 222 and/or 220) to central internal cavity 224 to immerse nonlinear spring-mass damper 227/228/229/230. The nonlinear behavior of dilatant liquid 242 in shear (as, e.g., between Belleville springs 227 and 228) expands the range of tuning the nonlinear spring-mass damper 227/228/229/230 to a larger plurality of predetermined frequencies to reduce "ringing" of valve body 214/216 in response to a closing energy impulse.

To clarify the function of nonlinear spring-mass damper 227/228/229/230, mass 230 is shown perforated centrally to form a washer shape and thus provide a passage for flow of dilatant liquid 242 during longitudinal movement of mass 230. This passage is analogous to that provided by each of the Belleville springs 227/228/229 by reason of their washer-like shape.

FIG. 10 shows an exploded view of an alternate embodiment of a tunable check valve comprising the tunable check valve assembly 210 of FIG. 9, plus a tunable valve seat 250. FIGS. 10 and 11 schematically illustrate two views of an exploded partially-sectioned 3-dimensional view including a valve body 214/216 and its valve seat interface 234, together with mating surface 254 of tunable valve seats 250 and 250'. Mating surface 254 is longitudinally spaced apart from pump housing interface surface 252 in FIG. 10, and from lateral support mounting surface 252' in FIG. 11. In FIG. 10, a curved longitudinal section edge 256 of the tunable valve seat's mating surface 254, together with a correspondingly greater curved longitudinal section edge 236 of valve seat interface 234, are shown schematically to aid description herein of a rolling valve seal along a substantially circular line.

Note that valve body 214/216 may be fabricated by several methods, including that schematically illustrated in FIGS. 9-11. For example, circular boss 215 on proximal valve body portion 214 may be inertia welded or otherwise joined to circular groove 217 on valve body base plate 216. Such joining results in the creation of peripheral seal-retention groove 218'/218" having proximal groove wall 218' and distal groove wall 218".

To enhance scavenging of heat due to friction loss and/or hysteresis loss, liquid polymer(s) 242 may be augmented by adding nanoparticles which are generally invisible to the eye as they are typically dispersed in a colloidal suspension. Nanoparticles comprise, for example, carbon and/or metallic materials such as copper, beryllium, titanium, nickel, iron, alloys or blends thereof. The term nanoparticle may conveniently be defined as including particles having an average size of up to about 2000 nm. See, e.g., the '320 patent.

The correspondingly greater curvature of valve seat interface 234, as compared to the curvature of mating surface 254, effectively provides a rolling seal against fluid leakage which reduces frictional wear on the surfaces in contact. The rolling seal also increases longitudinal compliance of a tunable suction or discharge valve of the invention, with the added benefit of increasing the rise and fall times of the closing energy impulse (thus narrowing the associated vibration spectrum).

Further regarding the term "correspondingly greater curvature" as used herein, note that the curvatures of the schematically illustrated longitudinal section edges (i.e., 236 and 256) and the surfaces of which they are a part (i.e., valve seat interface 234 and mating surface 254 respectively) are chosen so that the degree of longitudinal curvature of valve seat interface 234 (including edge 236) exceeds that of (i.e., has correspondingly greater curvature than) mating surface 254 (including edge 256) at any point of rolling contact. Hence, rolling contact between valve seat interface 234 and mating surface 254 is always along a substantially circular line that decreases contact area relative to the (potentially variable) contact area of a (potentially distorted) conventional frusto-conical valve body/valve seat interface (see discussion above). The plane of the circular line is generally transverse to the (substantially coaxial) longitudinal axes of valve body 214/216 and tunable valve seat 250. (See notes above re frusto-conical valve seat interface shapes and mating surfaces).

The above discussion of rolling contact applies to the alternate tunable valve seat 250' of FIG. 11, as it does to the tunable valve seat 250 of FIG. 10. But the lateral support mounting surface 252' in tunable check valve 399 of FIG. 11 differs from pump housing interface surface 252 of FIG. 10 in that it facilitates adjustably securing a lateral support assembly 330 to alternate tunable valve seat 250' to form tunable valve seat 389. Lateral support assembly 330 comprises first and second securable end spacers (310 and 324 respectively) in combination with a plurality of circular viscoelastic support elements (314, 318 and 322), each support element comprising a support circular tubular area (312, 316 and 320 respectively).

Note that in general, a tunable (suction or discharge) check valve of the invention may comprise a combination of a tunable check valve assembly 210 (see, e.g., FIG. 9) and a tunable valve seat 250 (see, e.g., FIG. 10) or a tunable valve seat 250' (see, e.g., FIG. 11). Referring more specifically to FIG. 6, tunable suction valve 95 is distinguished from tunable discharge check valve 97 by one or more factors, including each measured or estimated resonant frequency to which each tunable check valve is tuned so as to optimize the overall effectiveness of valve-generated vibration attenuation in the associated pump housing 78.

Figure 12:
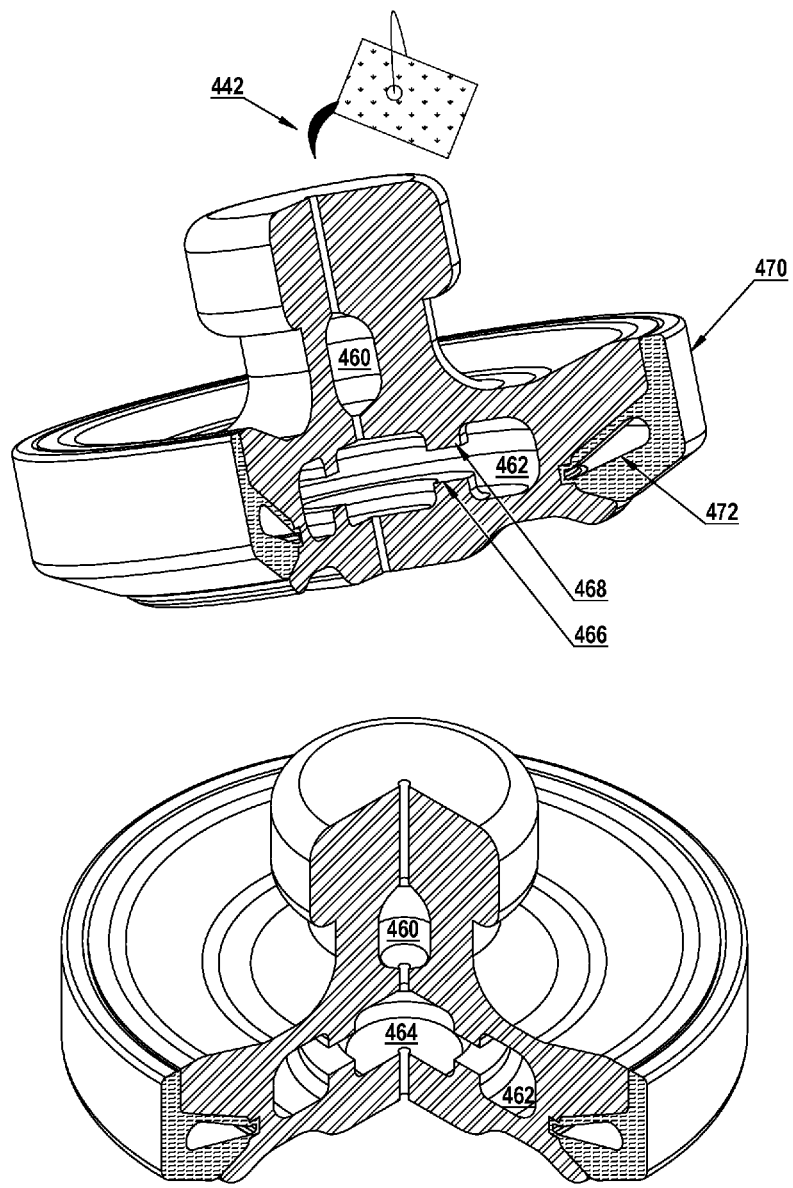
FIG. 12 illustrates two schematic 3-dimensional views of an alternate tunable check valve assembly embodiment comprising a plurality of radially-spaced vibration dampers disposed in a valve body having a peripheral seal. Each vibration damper comprises a circular tubular area, and at least one vibration damper is tunable via a fluid medium (shown schematically being added) in a tubular area.

FIG. 12 illustrates two schematic 3-dimensional views of an alternate tunable check valve assembly embodiment 410/470/480 (see exploded view in FIG. 13) which is symmetrical about a longitudinal axis and comprises a plurality of radially-spaced vibration dampers. One such damper is in the peripheral seal 470 with its peripheral circular tubular area 472 and enclosed fluid tuning medium 482, tubular area 472 being responsive to longitudinal compression of the assembly. A second damper is in valve body 410 with enclosed spaces 460/464 in fluid communication with central circular tubular area 462 via fluid flow restrictors 466/468 in the presence of fluid tuning medium 442. Tubular area 462 and fluid flow restrictors 466/468 are also responsive to longitudinal to compression of the assembly, thereby prompting fluid flow through the flow restrictors in association with valve closure shock and/or vibration.

Thus, each vibration damper comprises a circular tubular area (462/472), and at least one vibration damper is tunable to a predetermined frequency (e.g., a resonant frequency of a fluid end in which the assembly is installed). The tuning mechanisms may differ: e.g., via a fluid medium 442 (shown schematically being added in FIG. 12 via a sealable port 422 in valve body 410) in a tubular area 462 and/or via a fluid medium 482 (shown as an instantaneous shape 480) within tubular area 472. Control of variable fluid flow resistance and/or fluid stiffness (in the case of shear-thickening fluids) facilitates predetermination of resonant frequency or frequencies in the central and peripheral dampers.

In either case, tuning is function of responsiveness of the respective dampers to vibration secondary to valve closure impact (see above discussion of such impact and vibration). For example, longitudinal force on the closed valve will tend to reduce the distance between opposing fluid flow restrictors 466/468, simultaneously prompting flow of fluid tuning medium 442 from circular tubular area 462 to areas 464 and/or 460 (460 acting as a surge chamber). Flow resistance will be a function of fluid flow restrictors 466/468 and the fluid viscosity. Note that viscosity may vary with time in a shear-thickening liquid 442, thereby introducing nonlinearly for predictably altering center frequency and/or Q of the damper. Analogous predetermined viscosity variation in fluid tuning medium 482 is available for predictably altering the center frequency and/or Q (i.e., altering the tuning) of the peripheral damper 470/472/482 as the seal 470 distorts under the longitudinal load of valve closure.

Note that the peripheral seal vibration damper 470/472/482 comprises a medial flange 479 sized to closely fit within flange channel 419 of valve body 410, and medial flange 419 partially surrounds circular tubular area 472 within said seal 470. Those skilled in the art know that conventional peripheral seals tend to rotate within their retaining groove. The illustrated seal embodiment herein shows that such rotation will tend to be resisted by the combined action of medial flange 479 and flange channel 419. Further, the portion of circular tubular area 472 partially surrounded by medial flange 419 will tend to stiffen medial flange 479 in a nonlinear manner when circular tubular area 472 contains a shear-thickening fluid tuning medium.

Figure 13:
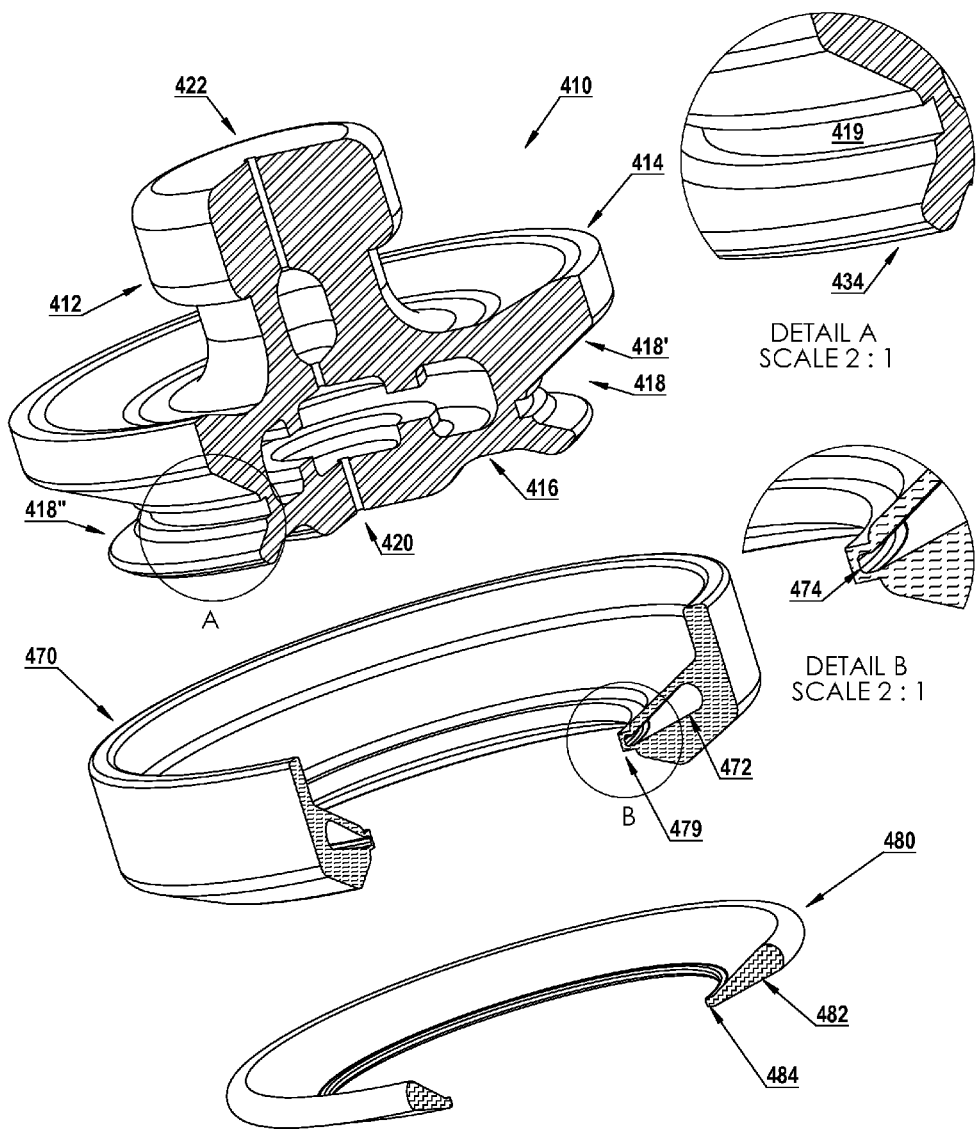
FIG. 13 is a schematic 3-dimensional exploded view of the alternate tunable check valve assembly embodiment of FIG. 12. Detail breakout views include the peripheral seal's medial flange and the flange body's corresponding flange channel. An instantaneous schematic view of the fluid medium in the peripheral seal's circular tubular area is shown separately.
Figure 14:
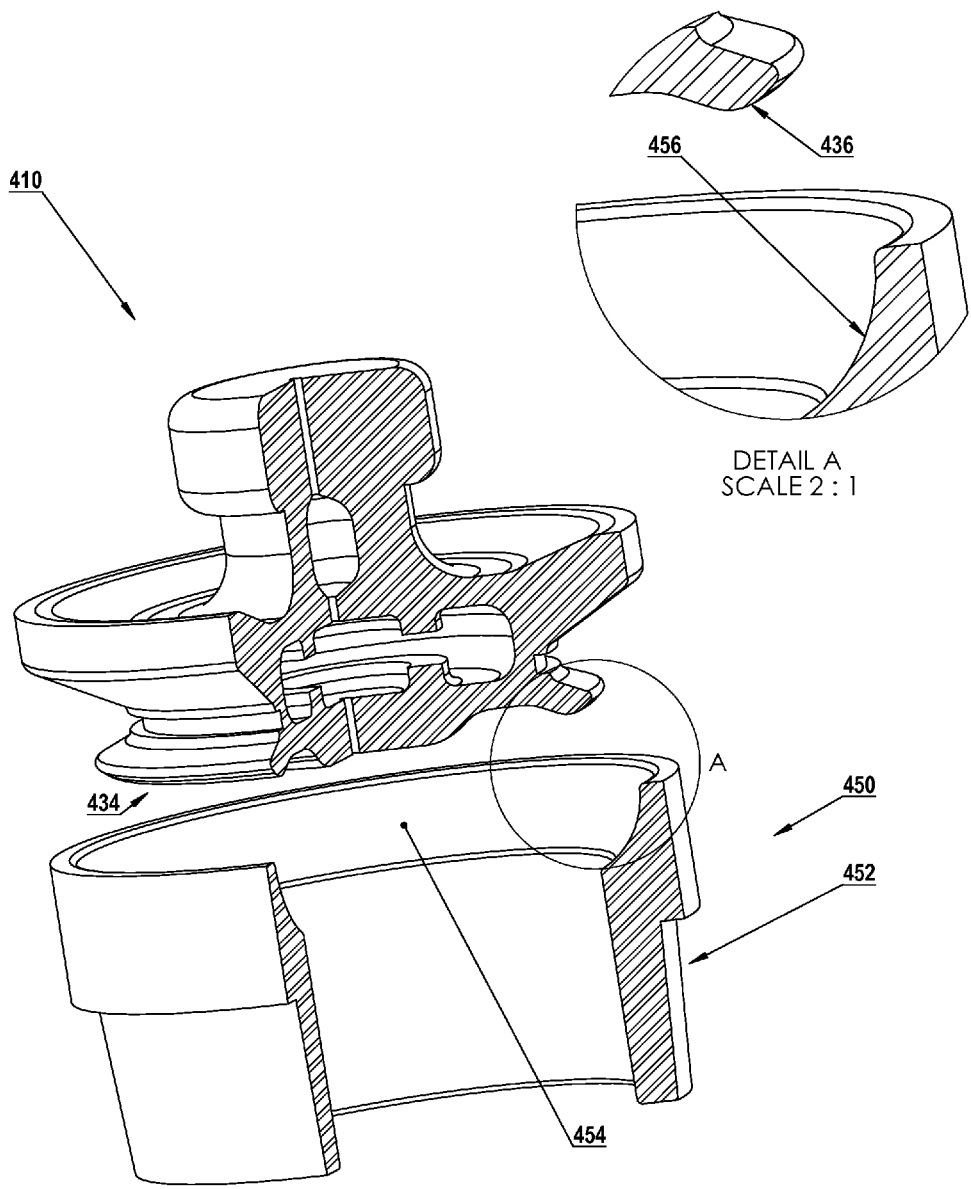
FIG. 14 illustrates a partial schematic 3-dimensional view of an alternate tunable check valve embodiment comprising the valve body of FIGS. 12 and 13, together with a tunable valve seat. A detail breakout view shows that the valve seat interface has correspondingly greater curvature than the mating surface. The mating surface has correspondingly less curvature than the valve seat interface to facilitate a rolling seal along a circular line between the valve body's valve seat interface and the tunable valve seat's mating surface.

FIG. 14 illustrates a partial schematic 3-dimensional view of an alternate tunable check valve embodiment comprising the valve body 410 of FIG. 13, together with a tunable valve seat 452. A detail breakout view shows that the valve seat interface has correspondingly greater curvature than the mating surface to facilitate a rolling valve seal along a substantially circular line, the seal having predetermined rebound cycle time and characteristic rebound frequency as described above.

Figure 15:
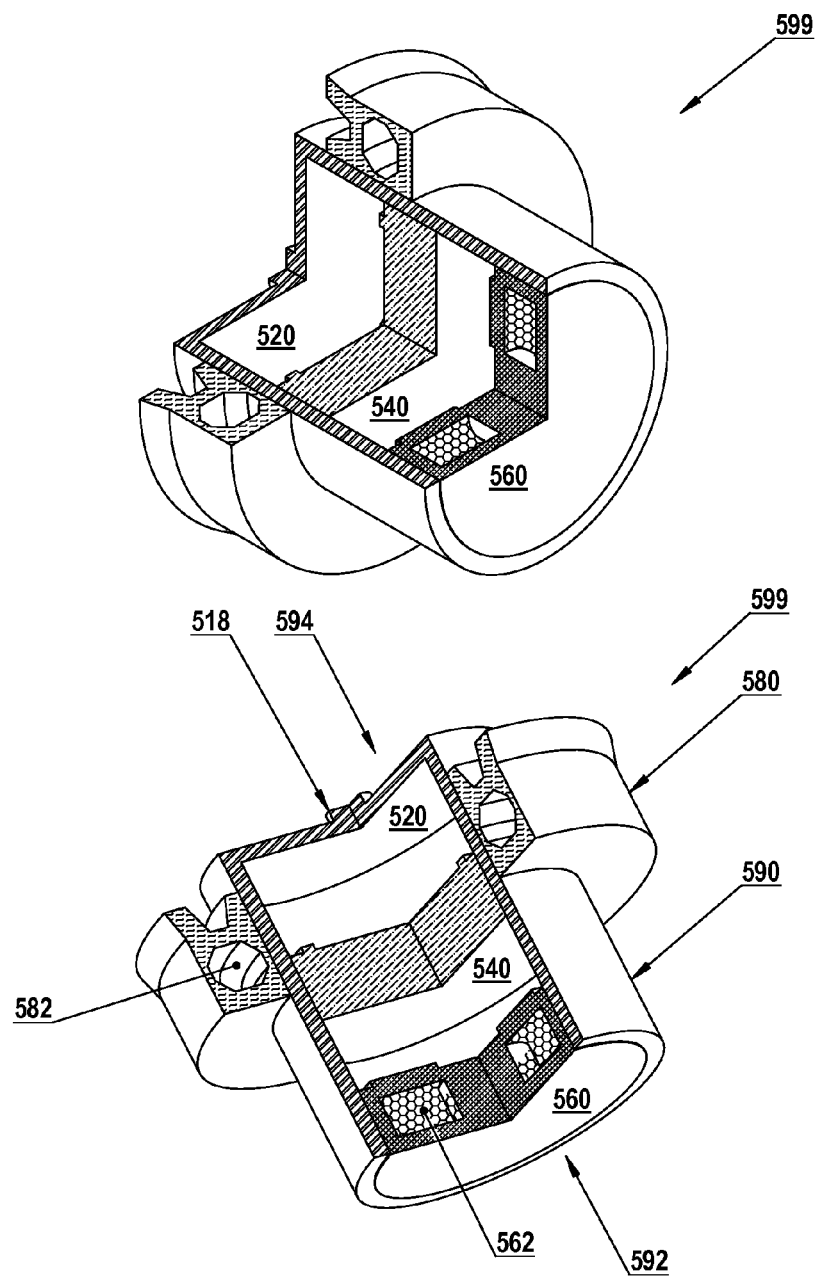
FIG. 15 illustrates a partial schematic 3-dimensional view of a tunable hydraulic stimulator embodiment comprising a driver element and a hammer element in a hollow cylindrical housing, one end of the housing being closed by a fluid interface, and the fluid interface comprising a MEMS accelerometer.
Figure 16:
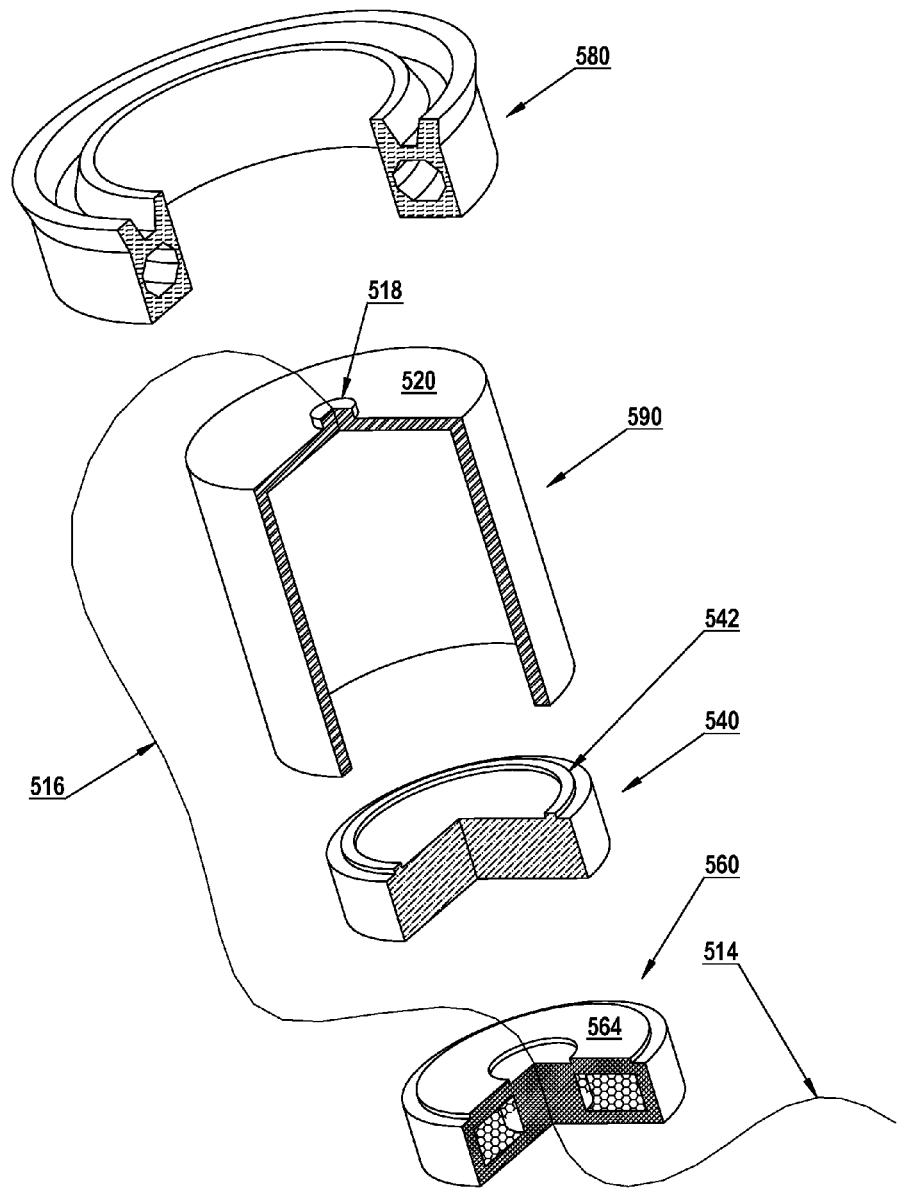
FIG. 16 illustrates a partial schematic 3-dimensional exploded view of the tunable hydraulic stimulator embodiment of FIG. 15, a first electrical cable being shown to schematically indicate a feedback path (for an accelerometer signal) from the accelerometer to the driver element. A second electrical cable is shown to schematically indicate an interconnection path for, e.g., communication with one or more additional stimulators and/or associated equipment.
Figure 17:
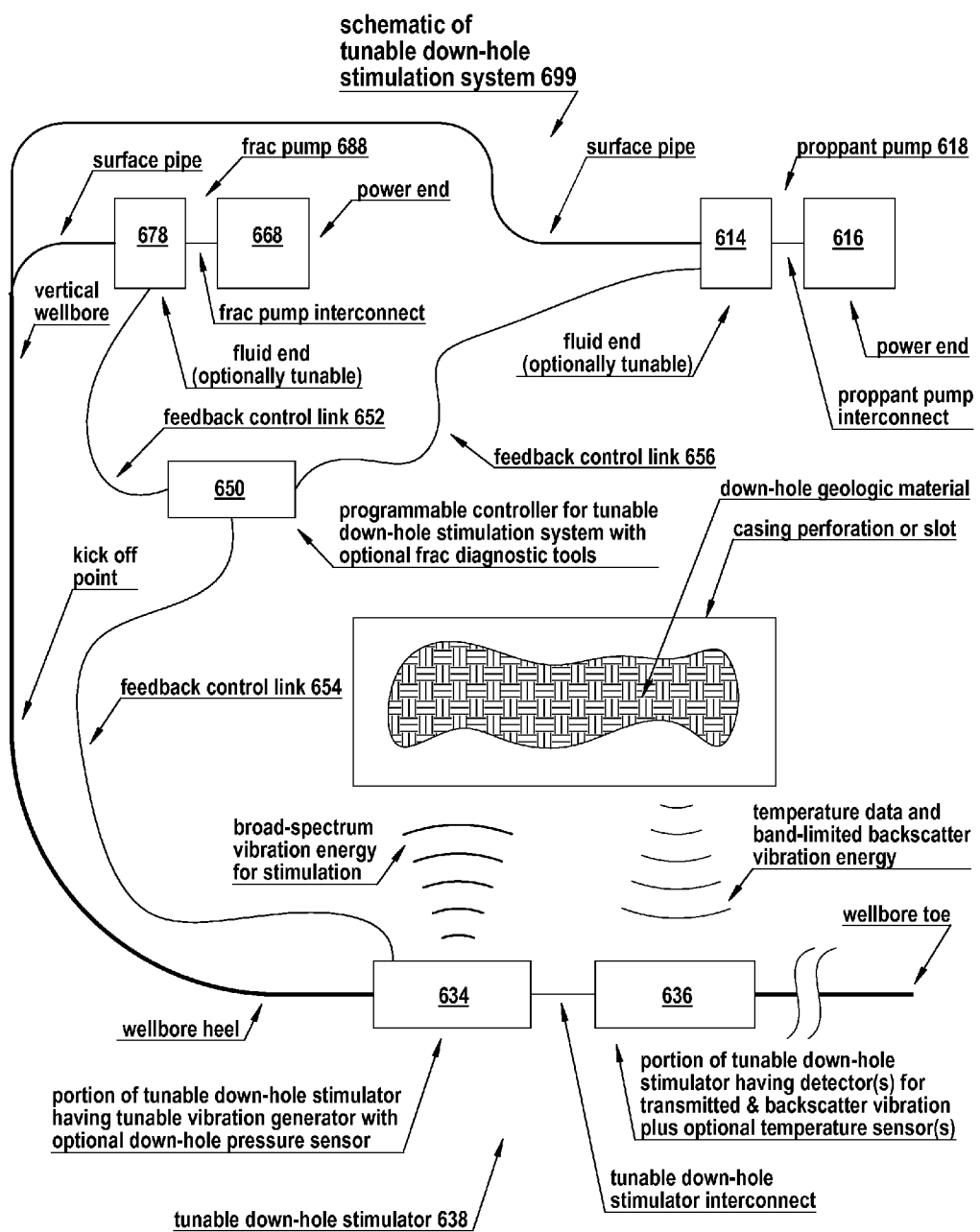
FIG. 17 schematically illustrates a 2-dimensional view of major components, subsystems, and interconnections of a tunable down-hole stimulation system, together with brief explanatory comments on component and subsystem functions. As aids to orientation, a schematic wellbore is shown, as are control link pathways for communication among pumps, tunable down-hole stimulator(s) and a tunable down-hole stimulation system controller. Schematic pathways are shown for stimulation vibration energy directed toward down-hole geologic material adjacent to the wellbore, and for backscatter vibration energy emanating from the geologic material.

FIGS. 15 and 16 illustrate partial schematic 3-dimensional views of a tunable hydraulic stimulator embodiment 599, FIG. 16 being an exploded view. Numerical labels may appear in only one view. A hollow cylindrical housing 590 has a longitudinal axis, a first end 594, and a second end 592. First end 594 is closed by fluid interface 520 for transmitting and receiving vibration. Fluid interface 520 comprises at least one accelerometer 518 for producing an accelerometer electrical signal (i.e., an accelerometer-generated feedback signal) representing vibration transmitted and received via fluid interface 520.

Driver element 560 (comprising a field emission structure which itself comprises electromagnet/controller 564/562) reversibly seals second end 592, and hammer (or movable mass) element 540 is longitudinally movable within housing 590 between driver element 560 and fluid interface 520. In some embodiments, hammer element 540 may itself be a field emission structure consisting of a permanent magnet (or consisting of a plurality of permanent magnets). Polarity of any such permanent magnets is not specified because it would be assigned in light of the electromagnet/controller 564/562. Alternatively, hammer element 540 may be analogous in part to the armature of a linear electric motor, as in a railgun. (See, e.g., the '205 and '877 patents noted above). Note that the above accelerometer-generated feedback electrical signal may be augmented by, or replaced by, sensorless control means (e.g., controlling operating parameters of electromagnet 564 such as magnetic field strength and polarity) in free piston embodiments of the tunable hydraulic stimulator. (See, e.g., U.S. Pat. No. 6,883,333 B2, incorporated by reference).

Thus, hammer element 540 is responsive to the magnetic field emitted by driver element 560 for striking, and rebounding from, fluid interface 520. The duration of each such striking and rebounding cycle (termed herein the "hammer rebound cycle time") has the dimension of seconds. And the inverse of this duration has the dimension of frequency. Hence, the term herein "characteristic rebound frequency" is the inverse of a hammer rebound cycle time, and the hammer rebound cycle time itself is inversely proportional to the bandwidth of transmitted vibration spectra resulting from each hammer strike and rebound from fluid interface 520.

Fluid interface 520 transmits vibration spectra generated by hammer impacts on fluid interface 520 as well as receiving backscatter vibration from geologic formations excited by stimulator 599. Fluid interface 520 comprises, for example, a MEMS accelerometer 518 for producing an accelerometer signal representing vibration transmitted and received by fluid interface 520. (See MicroElectro-Mechanical Systems in Harris, pp. 10-26, 10-27).

Hammer element 540 comprises a striking face 542 (see FIG. 16) which has a predetermined modulus of elasticity (e.g., that of mild steel, about 29,000,000 psi) which can interact with the modulus of elasticity of fluid interface 520 (again, e.g., that of mild steel). In a practical example, interaction of the two suggested moduli of elasticity predetermines a relatively short rebound cycle time for hammer element 540, which is associated with a corresponding relatively broad-spectrum of vibration to be transmitted by fluid interface 520. In other words, striking face 542 strikes fluid interface 520 and rebounds to produce a relatively short-duration, high-amplitude mechanical shock. (See, e.g., Harris p. 10.31).

Both FIGS. 15 and 16 schematically illustrate a tunable resilient circumferential seal 580 for sealing housing 590 within a wellbore, thus partially isolating vibration transmitted by fluid interface 520 within the wellbore. Seal 580 comprises at least one circular tubular area 582 which may contain at least one shear-thickening fluid 80 (see FIG. 5) which is useful in part for tuning purposes. And fluid 80 may comprise nanoparticles 82 for, e.g., facilitating heat scavenging.

FIG. 16 also schematically illustrates a first electrical cable 516 for carrying accelerometer electrical signals (schematically representing vibration data transmitted by and/or received by fluid interface 520) from accelerometer 518 to driver element 560. A second electrical cable 514 also connects to driver element 560 of each tunable hydraulic stimulator to schematically represent interconnection of two or more such stimulators (to form a tunable hydraulic stimulator array) and/or for connecting one or more down-hole tunable hydraulic stimulators to related equipment (e.g., a programmable controller as shown in FIG. 17) proximal in a wellbore and/or adjacent to the wellhead. Accelerometer electrical signals provide feedback on transmitted vibration and also on received backscatter vibration to driver element 560.

While accelerometer-mediated feedback may be desired for tailoring stimulation to specific geologic formations and/or to progress in producing desired degrees for fracture within a geologic formation, predetermined stimulation protocols may be used instead to simplify operations and/or lower costs.

In certain embodiments, frac diagnostic software and data to implement sensorless control via operating parameters (e.g., magnetic field strength and polarity) of electromagnet 564, or to implement feedback control incorporating accelerometer 518, are conveniently stored and executed in a microprocessor (located, e.g., in controller 562). (See, e.g., U.S. Pat. No. 8,386,040 B2, incorporated by reference). See FIGS. 5 and 6 of the '040 patent reference, for example, with their accompanying specification.

Note, however, that while certain of the electrodynamic control characteristics of a tunable hydraulic stimulator may be represented in earlier devices, the tunable hydraulic stimulator's reliance on mechanical shock (i.e., generated by hammer strike and rebound) to generate tuned vibration (i.e., vibration characterized by predetermined magnitude and/or frequency and/or PSD) imposes unique requirements indicated by the dynamic responsiveness of certain stimulator elements to other stimulator elements as described herein. Further, the power/data cable 514, or an analogous communication medium or control link, (see FIGS. 16 and 17) may extend to other hydraulic stimulators and/or to wellhead or other auxiliary equipment (see, e.g., FIG. 17) that may 1) power the hydraulic stimulator, 2) receive and transmit stimulation-related data, 3) coordinate stimulator operation (e.g. vibration phase, frequency, amplitude and/or PSD) with related equipment, and/or 4) modify driver-related frac diagnostic software programs affecting tunable hydraulic stimulator operations.

Note also that in addition to individual applications of a tunable hydraulic stimulator, two or more such stimulators may operate in a combined tunable hydraulic stimulator array during a given stage of fracking (e.g., in a temporarily isolated section or stage of horizontal wellbore). Section isolation in a wellbore may be accomplished with swell packers, which may function interchangeably in part as the tunable resilient circumferential seals described herein. A single tunable hydraulic stimulator or an interconnected tunable hydraulic stimulator array may be programmed in near-real time to alter stimulation parameters in response to changing conditions in geologic materials adjacent to a wellbore. A record of such changes, together with results, guides future changes to increase stimulation efficiency.

In summary, the responsiveness of certain elements of a tunable hydraulic stimulator to other elements and/or to parameter relationships facilitates operational advantages in various alternative stimulator embodiments. Examples involving such responsiveness and/or parameter relationships include, but are not limited to: 1) driver element 560 comprises a field emission structure comprising an electromagnet/controller 564/562 having cyclical magnetic polarity reversal characterized by a variable polarity reversal frequency; 2) longitudinal movement of hammer (or movable mass) element 540 is responsive to the driver cyclical magnetic polarity reversal; 3) longitudinal movement of hammer element 540 striking, and rebounding from, fluid interface 520 may be substantially in phase with the polarity reversal frequency to generate vibration transmitted by fluid interface 520; 4) the driver element polarity reversal frequency may be responsive to accelerometer 518's electrical signal (and thus responsive to vibration sensed by accelerometer 518; 5) longitudinal movement of hammer element 540 may be substantially in phase with the polarity reversal frequency; 6) longitudinal movement of hammer element 540 striking, and rebounding from, fluid interface 520 has a characteristic rebound frequency which is the inverse of the hammer rebound cycle time; 7) the hammer may rebound in phase with polarity reversal and; 8) the hammer rebound cycle time is a function of i) the cyclical magnetic polarity of driver element 560 and/or; ii) the moduli of elasticity of hammer element 540 and fluid interface 520.

FIG. 17 schematically illustrates a 2-dimensional view of major components and interconnections of a tunable down-hole stimulation system 699, together with brief explanatory labels and comments on component functions. As aids to orientation, a schematic wellbore is shown, including surface pipe connections with pumps. Hydraulic pathways are illustrated for transmitting broad-spectrum vibration to, and receiving band-limited backscatter vibration from, down-hole geologic material adjacent to the wellbore. The hydraulic pathways are shown passing to and from geologic material via, e.g., a preformed casing slot or an explosively-formed casing perforation.

The tunable down-hole stimulation system 699 schematically illustrated in FIG. 17 is relatively sophisticated, employing several structures, functions and interactions that may appear in different invention embodiments (but that need not appear in all invention embodiments) and are described in greater detail below. To improve clarity, certain structures and functions inherent in the system of FIG. 17 are schematically represented in FIGS. 15-16. For example, references to specific elements (e.g., hammer element 540 or fluid interface 520) should be understood with reference to FIGS. 15-16. Further, the illustration of tunable down-hole stimulator 638 in FIG. 17 should be understood as including a tunable vibration generator (labeled as such) which is analogous to the illustrated tunable hydraulic stimulator 599 in FIGS. 15-16. So while a portion of tunable down-hole stimulator 638 should be understood as schematically analogous to tunable hydraulic stimulator 599, it should also be recognized that stimulator 638 represents a different (expanded in part) subset of structures and functions not represented in stimulator 599.

A first example of a tunable down-hole stimulation system is one of the embodiments schematically illustrated in portions of FIGS. 15-17. The embodiment comprises at least one frac pump 688 for creating down-hole hydraulic pressure, together with at least one tunable down-hole stimulator 638. Each stimulator 638 comprises a tunable vibration generator (labeled in FIG. 17) for transmitting vibration hydraulically, as well as a programmable controller 650 for creating a plurality of control signals and transmitting at least one control signal to each said frac pump 688 and each said tunable down-hole stimulator 638. Additionally, each tunable down-hole stimulator 638 comprises at least one accelerometer 518 for sensing vibration and for transmitting an electrical signal derived therefrom. And the programmable controller 650 is responsive to accelerometer 518 via the electrical signal derived therefrom.

A second example of a tunable down-hole stimulation system is one of the embodiments schematically illustrated in portions of FIGS. 15-17. The embodiment comprises at least one frac pump 688 for creating down-hole hydraulic pressure, together with at least one proppant pump 618 connected in parallel with at least one frac pump 688 for adding exogenous proppant. The system further comprises at least one tunable down-hole stimulator 638, each stimulator 638 comprising a tunable vibration generator (labeled in FIG. 17) having a characteristic rebound frequency. A programmable controller 650 is included for creating a plurality of control signals and transmitting at least one control signal to each frac pump 688, each proppant pump 618, and each tunable down-hole stimulator 638. Each tunable down-hole stimulator 638 comprises at least one accelerometer 518 for detecting vibration and for transmitting an electrical signal derived therefrom, and each accelerometer 518 is responsive to the characteristic rebound frequency. Finally, the programmable controller 650 is responsive to accelerometer 518 via the electrical signal.

A third example of a tunable down-hole stimulation system is one of the embodiments schematically illustrated in portions of FIGS. 15-17. The embodiment comprises a wellbore comprising a vertical wellbore, a kickoff point, a heel, and a toe (all portions labeled in FIG. 17). At least one frac pump 688 creates down-hole hydraulic pressure in the wellbore, and at least one tunable down-hole stimulator 638 is located within the wellbore (and between the heel and toe as labeled in FIG. 17). Each stimulator comprises a tunable vibration generator (labeled in FIG. 17), and a programmable controller 650 creates a plurality of control signals and transmits at least one control signal to each frac pump 688 and each tunable down-hole stimulator 638. Each tunable down-hole stimulator 638 comprises at least one accelerometer 518 for sensing vibration and for transmitting an electrical signal derived therefrom, and the programmable controller 650 is responsive to accelerometer 518 via the electrical signal.

An alternative embodiment included in the tunable down-hole stimulation system 699 of FIG. 17, for example, comprises at least one frac pump 688 for creating down-hole hydraulic pressure. System 699 further comprises at least one down-hole tunable hydraulic stimulator 638 for generation and transmission of broad-spectrum vibration, and for detection of backscatter vibration, stimulator 638 being hydraulically pressurized by frac pump 688. A programmable controller 650 is linked to at least one frac pump 688 and at least one tunable hydraulic stimulator 638 for controlling down-hole hydraulic pressure and vibration generation as functions of backscatter vibration sensed by one or more detectors on at least one tunable hydraulic stimulator 638. Each tunable hydraulic stimulator 638 comprises a movable mass or hammer element 540 (see FIGS. 15-16) which is movable via a field emission structure in the form of an electromagnet/controller 562/564 to strike, and rebound from, a fluid interface 520 (see FIGS. 15-16) for generating broad-spectrum vibration (see FIG. 17). At least one tunable hydraulic stimulator 638 detects the backscatter vibration via an accelerometer 518 coupled to fluid interface 520 (see FIGS. 15-16). An electric signal derived from accelerometer 518 is carried via link 516, link 514 and at least one additional link 654 (labeled in FIG. 17) to programmable controller 650. The broad-spectrum vibration indicated in FIG. 17 is characterized by a vibration spectrum having a predetermined power spectral density, and programmable controller 650 (see FIG. 17) alters the predetermined power spectral density during the course of stimulation as a function of the backscatter vibration.

The alternative embodiment of the tunable stimulation system 699 described above may be further described as follows: tunable down-hole hydraulic stimulator 638 comprises a hollow cylindrical housing 590 having a longitudinal axis, a first end 594, and a second end 592, first end 594 being closed by fluid interface 520 for transmitting and receiving vibration, and fluid interface 520 comprising at least one accelerometer 518 for producing an accelerometer signal representing vibration transmitted and received by fluid interface 520. A driver element 560 reversibly seals second end 592, and driver element 560 comprises a field emission structure comprising an electromagnet/controller 562/564 having cyclical magnetic polarity reversal characterized by a variable polarity reversal frequency.

The alternative embodiment of the tunable stimulation system 699 may additionally comprise at least one temperature sensor (labeled in FIG. 17). Down-hole hydraulic pressure may be sensed (as labeled in FIG. 17) and transmitted as a pressure signal derived therefrom. Programmable controller 650 (through change in one or more of the control signals it produces) is responsive to the pressure signal when present. Pressure may analogously be controlled as a function-in-part of both temperature and backscatter vibration sensed at tunable down-hole stimulator 638. And predetermined power spectral density may similarly be altered as a function-in-part of both temperature and backscatter vibration sensed at tunable down-hole stimulator 638.

In the above embodiments, a field emission structure may be responsive to at least one control signal. Such responsiveness to at least one control signal is achieved, e.g., by emitting one or more electric and/or magnetic fields which are functions of at least one control signal as sensed by the field emission structure through change in one or more field emission structure electrical parameters. Thus, a tunable vibration generator may have a predetermined PSD which is dependent-in-part on one or more field emission structures that are themselves responsive to at least one control signal.

What is claimed is:

1. A method for tuning a down-hole stimulation system, the method comprising
    providing at least one frac pump maintaining a fluid environment in a wellbore, said fluid environment contacting geologic material adjacent to said wellbore;
    providing a tunable down-hole stimulator in said wellbore, said stimulator comprising a vibration generator responsive to a periodic control signal by transmitting to said geologic material, via said fluid environment, a vibration burst simultaneously comprising a plurality of vibration frequencies; and
    providing a programmable controller, said programmable controller transmitting each said periodic control signal to said tunable down-hole stimulator;
    wherein said vibration generator comprises an electromagnetic driver, a movable hammer, and a fluid interface, said movable hammer being responsive to said electromagnetic driver for periodically striking said fluid interface, and rebounding therefrom during an adjustable rebound cycle time, to transmit one said vibration burst to said geologic material via said fluid environment;
    wherein said electromagnetic driver is responsive to each said periodic control signal;
    wherein each said vibration burst has an adjustable power spectral density, each said adjustable power spectral density being responsive to one said adjustable rebound cycle time;
    wherein each said vibration burst excites induced geologic resonance vibration in said geologic material;
    wherein said fluid interface comprises at least one accelerometer for detecting each said vibration burst and detecting time-shifted backscatter vibration energy from said induced geologic resonance vibration, said at least one accelerometer transmitting an accelerometer signal derived from detected vibration;
    wherein each said adjustable rebound cycle time is responsive to one said accelerometer signal for tuning said down-hole stimulation system; and
    wherein shortening one said adjustable rebound cycle time up-shifts one said adjustable power spectral density.

2. A method for tuning a down-hole stimulation system, the method comprising
    providing at least one frac pump maintaining a fluid environment in a wellbore, said fluid environment contacting geologic material adjacent to said wellbore;
    providing a tunable down-hole stimulator in said wellbore, said stimulator comprising a vibration generator responsive to a periodic control signal by transmitting to said geologic material, via said fluid environment, a vibration burst simultaneously comprising a plurality of vibration frequencies; and
    providing a programmable controller, said programmable controller transmitting each said periodic control signal to said tunable down-hole stimulator;
    wherein said vibration generator comprises an electromagnetic driver, a movable hammer, and a fluid interface, said movable hammer being responsive to said electromagnetic driver for periodically striking said fluid interface, and rebounding therefrom during an adjustable rebound cycle time, to transmit one said vibration burst to said geologic material via said fluid environment;
    wherein said electromagnetic driver is responsive to each said periodic control signal;
    wherein each said vibration burst has an adjustable power spectral density, each said adjustable power spectral density being responsive to one said adjustable rebound cycle time;
    wherein each said vibration burst excites induced geologic resonance vibration in said geologic material;
    wherein said fluid interface comprises at least one accelerometer for detecting each said vibration burst and detecting time-shifted backscatter vibration energy from said induced geologic resonance vibration, said at least one accelerometer transmitting an accelerometer signal derived from detected vibration;
    wherein each said adjustable rebound cycle time is responsive to one said accelerometer signal for tuning said down-hole stimulation system; and wherein lengthening one said adjustable rebound cycle time down-shifts one said adjustable power spectral density.

3. A down-hole stimulation system comprising a frac pump maintaining a down-hole fluid environment in a wellbore, said fluid environment contacting geologic material adjacent to said wellbore;

a down-hole stimulator for transmitting, via said fluid environment and in response to a periodic control signal, a vibration burst having an adjustable power spectral density, each said vibration burst exciting induced geologic resonance vibration in said geologic material; and a programmable controller for transmitting each said periodic control signal to said down-hole stimulator;

wherein said down-hole stimulator comprises a hollow cylindrical housing having a longitudinal axis, a first end, and a second end, said first end being closed by a fluid interface for transmitting and receiving vibration via said fluid environment, said fluid interface comprising at least one accelerometer for producing an accelerometer feedback signal representing vibration transmitted and received by said fluid interface;

a driver element reversibly sealing said second end; and a hammer element longitudinally movable within said housing between said driver element and said fluid interface, said hammer element being responsive to said driver element for periodically striking said fluid interface, and rebounding therefrom during an adjustable rebound cycle time, to transmit one said vibration burst comprising a plurality of transmitted vibration frequencies to said geologic material via said fluid environment;

wherein said driver element comprises an electromagnet/controller having cyclical magnetic polarity reversal characterized by a variable polarity reversal frequency;

wherein said vibration transmitted and received by said fluid interface includes both transmitted vibration energy and time-shifted backscatter vibration energy from said induced geologic resonance vibration;

wherein longitudinal movement of said hammer element is responsive to said cyclical magnetic polarity reversal;

wherein longitudinal movement of said hammer element striking, and rebounding from, said fluid interface is in phase with said variable polarity reversal frequency;

wherein each said adjustable power spectral density is responsive to one said adjustable rebound cycle time; and wherein shortening one said adjustable rebound cycle time up-shifts one said adjustable power spectral density.

4. A down-hole stimulation system comprising a frac pump maintaining a down-hole fluid environment in a wellbore, said fluid environment contacting geologic material adjacent to said wellbore;

a down-hole stimulator for transmitting, via said fluid environment and in response to a periodic control signal, a vibration burst having an adjustable power spectral density, each said vibration burst exciting induced geologic resonance vibration in said geologic material; and a programmable controller for transmitting each said periodic control signal to said down-hole stimulator;

wherein said down-hole stimulator comprises a hollow cylindrical housing having a longitudinal axis, a first end, and a second end, said first end being closed by a fluid interface for transmitting and receiving vibration via said fluid environment, said fluid interface comprising at least one accelerometer for producing an accelerometer feedback signal representing vibration transmitted and received by said fluid interface;

a driver element reversibly sealing said second end; and a hammer element longitudinally movable within said housing between said driver element and said fluid interface, said hammer element being responsive to said driver element for periodically striking said fluid interface, and rebounding therefrom during an adjustable rebound cycle time, to transmit one said vibration burst comprising a plurality of transmitted vibration frequencies to said geologic material via said fluid environment;

wherein said driver element comprises an electromagnet/controller having cyclical magnetic polarity reversal characterized by a variable polarity reversal frequency;

wherein said vibration transmitted and received by said fluid interface includes both transmitted vibration energy and time-shifted backscatter vibration energy from said induced geologic resonance vibration;

wherein longitudinal movement of said hammer element is responsive to said cyclical magnetic polarity reversal;

wherein longitudinal movement of said hammer element striking, and rebounding from, said fluid interface is in phase with said variable polarity reversal frequency;

wherein each said adjustable power spectral density is responsive to one said adjustable rebound cycle time; and wherein lengthening one said adjustable rebound cycle time down-shifts one said adjustable power spectral density.

* * * * *